US012797673B2

(12) United States Patent
Konopacz et al.

(10) Patent No.: US 12,797,673 B2
(45) Date of Patent: Nov. 17, 2026

(54) BED EXERCISE SYSTEMS AND METHODS

(71) Applicant: Sage Products LLC, Cary, IL (US)

(72) Inventors: Kaitlin Konopacz, Lake Zurich, IL (US); Abhishek Patel, North Barrington, IL (US); Stephanie Cress, Cary, IL (US); Ron Cagle, Cary, IL (US); Catherine Saad, Cary, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 18/259,507

(22) PCT Filed: Jul. 20, 2022

(86) PCT No.: PCT/US2022/037718
§ 371 (c)(1),
(2) Date: Jun. 27, 2023

(87) PCT Pub. No.: WO2023/003954
PCT Pub. Date: Jan. 26, 2023

(65) Prior Publication Data

US 2024/0139048 A1 May 2, 2024

Related U.S. Application Data

(60) Provisional application No. 63/389,928, filed on Jul. 17, 2022, provisional application No. 63/345,861,
(Continued)

(51) Int. Cl.
*A63B 21/16* (2006.01)
*A61G 7/05* (2006.01)
(Continued)

(52) U.S. Cl.
CPC ............ *A63B 21/1672* (2015.10); *A61G 7/05* (2013.01); *A63B 21/0414* (2013.01);
(Continued)

(58) Field of Classification Search
CPC ...... A61G 7/05; A61G 13/009; A61G 7/0503; A63B 2208/0238; A63B 21/1672;
(Continued)

(56) References Cited

U.S. PATENT DOCUMENTS 798,114 A * 8/1905 Rosenthal .......... A63B 21/0552 482/130
1,075,309 A * 10/1913 Sullivan ............. A63B 21/0552 601/36
(Continued)

FOREIGN PATENT DOCUMENTS

KR 960 000 683 1/1996
KR 960 000 683 Y1 1/1996
(Continued)

OTHER PUBLICATIONS

International Search Report and Written Opinion issued in International Patent Application No. PCT/US2022/037718, dated Dec. 9, 2022 (30 pages).
(Continued)

*Primary Examiner* — Megan Anderson
*Assistant Examiner* — Catrina A Letterman
(74) *Attorney, Agent, or Firm* — McDonnell Boehnen Hulbert & Berghoff LLP

(57) ABSTRACT

In an example, a bed exercise system is described. The bed exercise system includes a foot pad, a first elastic connector having a first end coupled to a first lateral side of the footpad and a second end, and a second elastic connector having a first end coupled to a second lateral side of the foot pad and a second end. The bed exercise system also includes an anchor coupled to the second end of the first elastic connector and the second end of the second elastic connector. The anchor is configured to fasten, at a fixed position relative to a bed, the second end of the first elastic connector
(Continued)

and the second end of the second elastic connector while (i) the foot pad is moved between a first position and a second position relative to a bed, and (ii) a tension on the first elastic connector and a tension on the second elastic connector increases as the foot pad moves from the first position to the second position.

20 Claims, 60 Drawing Sheets

Related U.S. Application Data filed on May 25, 2022, provisional application No. 63/257,535, filed on Oct. 19, 2021, provisional application No. 63/242,272, filed on Sep. 9, 2021, provisional application No. 63/223,841, filed on Jul. 20, 2021.

(51) Int. Cl.
*A63B 21/00* (2006.01)
*A63B 21/04* (2006.01)
*A63B 21/055* (2006.01)

(52) U.S. Cl.
CPC ...... *A63B 21/0557* (2013.01); *A63B 21/4034* (2015.10); *A63B 2208/0252* (2013.01); *A63B 2210/50* (2013.01)

(58) Field of Classification Search
CPC ........ A63B 2210/04; A63B 2208/0252; A63B 21/0442; A63B 21/0552; A63B 21/16; A63B 21/04; A63B 21/055; A63B 21/0414; A63B 21/0557; A63B 21/4034; A63B 2210/50; A63B 21/00065; A63B 21/4015; Y10S 482/904
See application file for complete search history.

(56) References Cited

U.S. PATENT DOCUMENTS 1,490,363 A * 4/1924 Couplin ............. A63B 21/4015 482/131
1,952,750 A 3/1934 Gailey
2,057,811 A * 10/1936 Armstrong ........... A61G 7/0533 482/904
2,305,548 A * 12/1942 Nichols .............. A63B 21/1672 482/131
2,340,666 A 2/1944 Johanson
2,601,686 A * 7/1952 Roessler ................ A47C 21/00 482/904
2,952,855 A * 9/1960 Zuti ..................... A61G 7/0755 5/651
3,077,613 A * 2/1963 Mayer .................. A61G 7/0533 212/292
3,195,151 A * 7/1965 Boyer .................. A47C 19/022 5/651
3,310,817 A * 3/1967 Harding ............... A61G 7/0533 5/662
3,455,295 A * 7/1969 Kellogg ............... A63B 22/001 482/904
3,523,310 A 8/1970 Shead
3,524,643 A 8/1970 Hazelitt
3,826,490 A * 7/1974 Mossman .............. A63B 21/16 482/904
4,169,591 A * 10/1979 Douglas ............... A63B 22/001 5/651
4,463,947 A 8/1984 Kloenne
4,665,899 A 5/1987 Farris et al.
4,765,005 A 8/1988 Hippel
5,125,649 A 6/1992 Fuller
5,153,959 A 10/1992 Fitzsimmons
5,236,333 A 8/1993 Barba, Jr.
5,279,530 A 1/1994 Hess
5,355,539 A * 10/1994 Boettger .................. A61G 7/05 5/503.1
5,480,369 A 1/1996 Dudley
5,499,958 A 3/1996 Hess
5,673,447 A 10/1997 White et al.
5,674,163 A 10/1997 Sennett
5,674,168 A 10/1997 Wilkinson
5,690,594 A 11/1997 Mankovitz
5,743,838 A 4/1998 Willis
6,224,521 B1 5/2001 Foucault
6,425,844 B1 7/2002 Azar
6,544,152 B2 4/2003 Rosati
6,726,606 B2 4/2004 Jacobsen
6,749,548 B2 6/2004 Hoffman
6,840,894 B2 1/2005 Lerner
6,878,102 B1 4/2005 Commisso
7,004,893 B1 2/2006 Waters
7,104,935 B2 9/2006 Matsuoka
7,192,410 B1 3/2007 Rodgers
7,597,656 B2 10/2009 Trees
7,883,453 B1 2/2011 Cooper
8,033,966 B2 10/2011 Ayoub
8,142,336 B1 3/2012 Yates
8,403,817 B2 3/2013 Ferguson et al.
8,479,326 B1 7/2013 Roberts et al.
8,641,652 B2 2/2014 Gazayerli
8,721,509 B1 5/2014 Berdut-Teruel
9,125,785 B2 9/2015 Trees
9,282,829 B2 3/2016 Caruso et al.
9,538,852 B2 1/2017 Levy et al.
9,687,401 B2 6/2017 Alford et al.
9,775,764 B1 10/2017 Rill
9,868,013 B1 1/2018 Leverenz et al.
10,166,432 B2 1/2019 Kabasso
10,596,406 B2 3/2020 Avila
10,842,696 B1 11/2020 Wolpe
10,874,567 B2 12/2020 Zerhusen et al.
11,318,341 B2 5/2022 Marti
2002/0193210 A1 12/2002 Turner
2003/0027698 A1 2/2003 Makoto
2006/0183609 A1 8/2006 Flynn
2007/0023587 A1* 2/2007 Eggleston ............ A61G 12/008 248/98
2008/0119338 A1 5/2008 Prsala
2009/0192022 A1 7/2009 Kulka
2013/0074270 A1 3/2013 Caruso et al.
2015/0165256 A1* 6/2015 Salamon ............ A63B 21/4029 482/129
2015/0290061 A1 10/2015 Stafford et al.
2017/0035638 A1 2/2017 Koenig
2017/0232289 A1 8/2017 Pouchet
2018/0271436 A1* 9/2018 Malone .............. A63B 23/0494
2018/0290010 A1 10/2018 Huang
2019/0054342 A1* 2/2019 Christy .............. A63B 69/0028
2019/0314668 A1 10/2019 Bourke et al.
2020/0086164 A1 3/2020 Marti
2020/0197743 A1 6/2020 Biele
2021/0016133 A1 1/2021 Wu
2021/0046349 A1* 2/2021 Kabasso ............ A63B 21/0552
2021/0106479 A1 4/2021 Zerhusen et al.
2021/0170225 A1 6/2021 Jacobs
2021/0370127 A1 12/2021 Konopacz et al.

FOREIGN PATENT DOCUMENTS

WO WO 2019/191066 10/2019
WO 2021/247429 A1 12/2021
WO WO 2021/247429 12/2021

OTHER PUBLICATIONS

International Search Report and Written Opinion issued in International Patent Application No. PCT/US2021/034960 dated Nov. 5, 2021 (19 pages).

(56) References Cited

OTHER PUBLICATIONS

International Search Report and Written Opinion issued in International Patent Application No. PCT/US2023/033224, dated Jan. 17, 2024 (13 pages).
International Search Report mailed on Dec. 9, 2022, issued in connection with International Application No. PCT/US2022/037718, filed on Jul. 20, 2022, 6 pages.
Written Opinion mailed on Dec. 9, 2022, issued in connection with International Application No. PCT/US2022/037718, filed on Jul. 20, 2022, 20 pages.

* cited by examiner

BED EXERCISE SYSTEMS AND METHODS

CROSS-REFERENCE TO RELATED APPLICATIONS

This application is the US national phase under 35 U.S.C. § 371 of International Application No. PCT/US2022/037718, filed Jul. 20, 2022, which claims the benefit of U.S. Provisional Application No. 63/389,928, filed Jul. 17, 2022, U.S. Provisional Application No. 63/345,861, filed May 25, 2022, U.S. Provisional Application No. 63/257,535, filed Oct. 19, 2021, U.S. Provisional Application No. 63/242,272, filed Sep. 9, 2021, and U.S. Provisional Application No. 63/223,841, filed Jul. 20, 2021, the contents of which are hereby incorporated by reference in their entirety.

FIELD

The present disclosure generally relates to exercise systems and methods and, in particular, exercise systems and methods for use in a bed.

BACKGROUND

In some instances, medical professionals may prescribe a patient bed rest. A period of bed rest can lead to deterioration of muscle strength (i.e., muscle atrophy). This, in turn, can lead to a patient having difficulties supporting their full body weight when later attempting to stand and/or move.

SUMMARY

In an example, a bed exercise system is described. The bed exercise system includes a foot pad, a first elastic connector having a first end coupled to a first lateral side of the foot pad and a second end, and a second elastic connector having a first end coupled to a second lateral side of the foot pad and a second end. The bed exercise system also includes an anchor coupled to the second end of the first elastic connector and the second end of the second elastic connector. The anchor is configured to fasten, at a fixed position relative to a bed, the second end of the first elastic connector and the second end of the second elastic connector while (i) the foot pad is moved between a first position and a second position relative to a bed, and (ii) a tension on the first elastic connector and a tension on the second elastic connector increases as the foot pad moves from the first position to the second position.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Figure 1A:
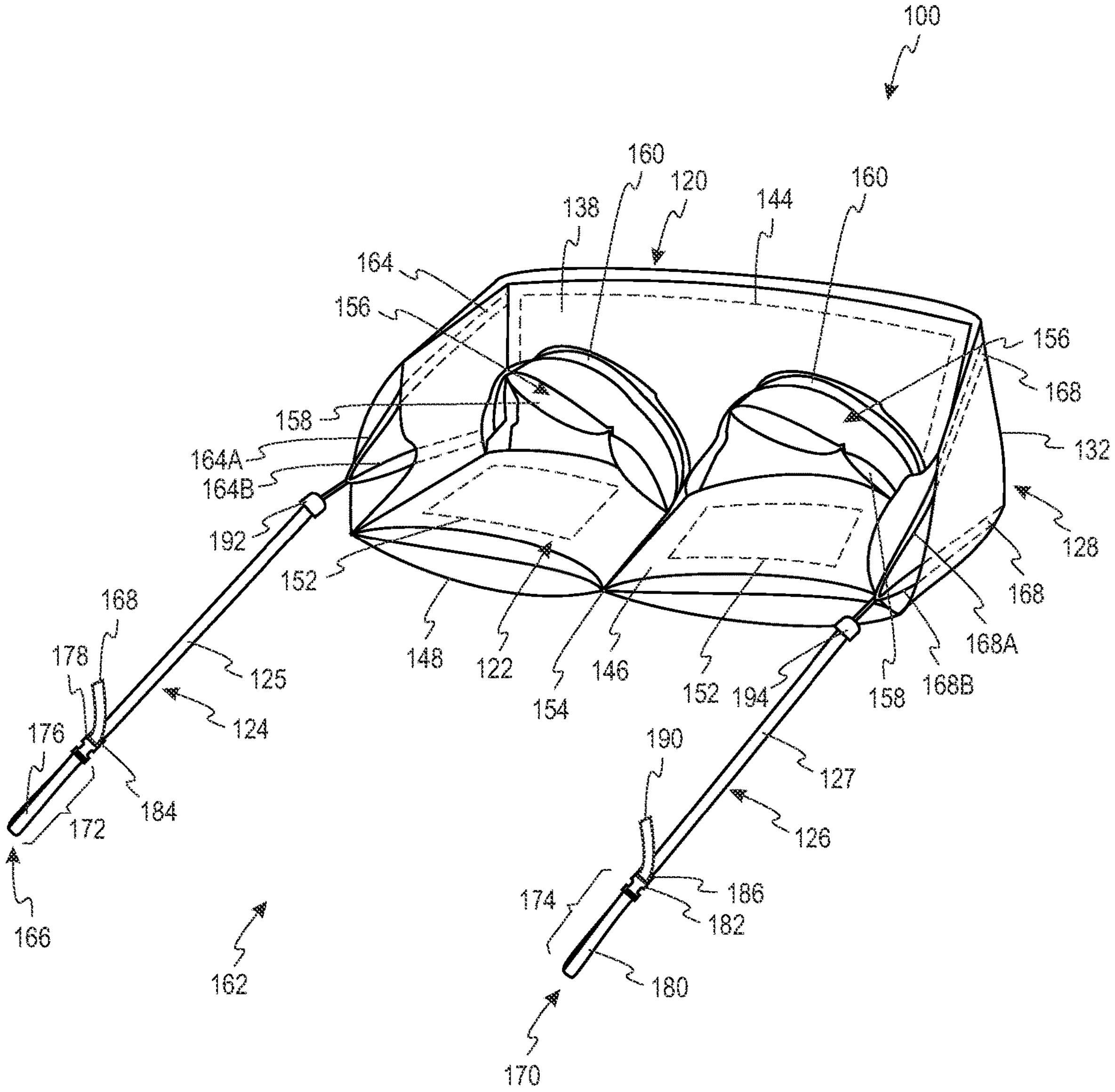
FIG. 1A illustrates a perspective view of a bed exercise system, according to an example.
Figure 1B:
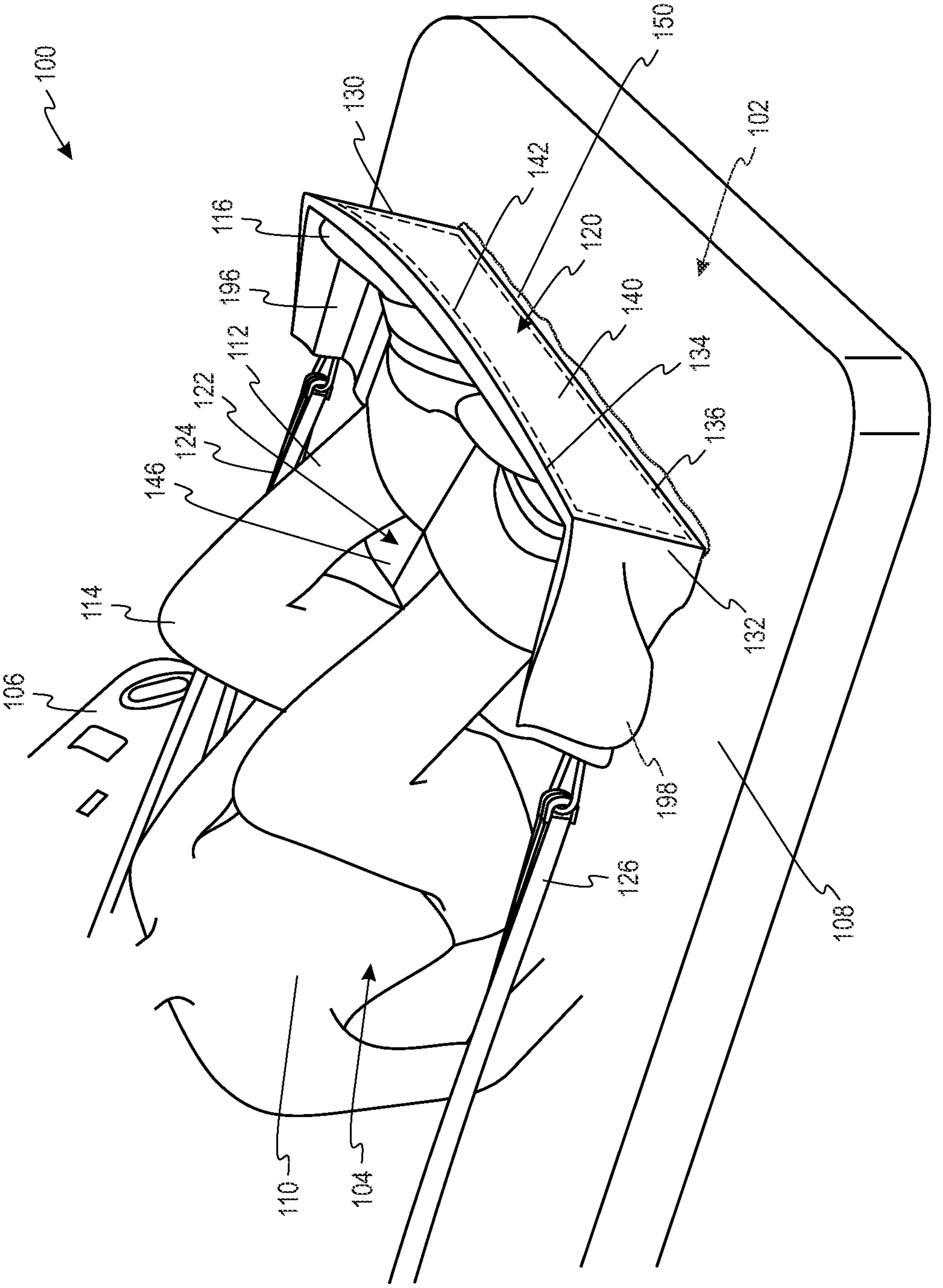
FIG. 1B illustrates another perspective view of the bed exercise system shown in FIG. 1, according to an example.

Referring now to FIGS. 1A-1B, a bed exercise system 100 is illustrated according to an example embodiment. More specifically, FIG. 1A depicts a perspective view of the bed exercise system 100, and FIG. 1B depicts a perspective view of the bed exercise system 100 coupled to a bed 102 and an operator 104, according to an example.

As shown in FIG. 1B, the bed 102 includes a bed frame 106 and a mattress 108. Additionally, as shown in FIG. 1B, the operator 104 has a torso 110, two legs 112, two knees 114, and two feet 116. As used herein, the term "proximal" means nearer to the torso 110 of the operator 104 and the term "distal" means farther from the torso 110 of the operator 104 when the operator 104 is operating the bed exercise system 100. Additionally, as used herein, the term "lower" means nearer to a ground on which the bed 102 is supported and the term "upper" means farther from the ground on which the bed 102 is supported when the operator 104 is operating the bed exercise system 100.

As shown in FIGS. 1A-1B, the bed exercise system 100 includes a foot pad 120, a leg support member 122, and a plurality of elastic connectors 124, 126. In general, the foot pad 120 is configured to support one foot or both feet 116 of the operator 104 at a distal end 128 of the bed exercise system 100. The foot pad 120 includes a first lateral side 130, a second lateral side 132 opposite the first lateral side 130, an upper side 134, and a lower side 136. Additionally, the foot pad 120 includes a proximal surface 138 facing the operator 104, and a distal surface 140 opposite of the proximal surface 138. In FIGS. 1A-1B, the proximal surface 138 and the distal surface 140 extend between the first lateral side 130, the second lateral side 132, the upper side 134, and the lower side 136 to define an internal cavity in the foot pad 120.

Additionally, as shown in FIGS. 1A-1B, the foot pad 120 includes a rigid support member 142 and a cushion member 144. In FIGS. 1A-1B, the rigid support member 142 and the cushion member 144 are in the internal cavity of the foot pad 120. More specifically, the cushion member 144 is located proximal of the rigid support member 142 in the internal cavity of the foot pad 120. In this arrangement, the rigid support member 142 can provide the foot pad 120 with sufficient rigidity for supporting one or both of the feet 116 of the operator 104, and the cushion member 144 can assist in improving (or maximizing) comfort of the operator 104 by providing a relatively soft structure at the proximal surface 138 for engaging the soles of the feet 116 of the operator 104. Additionally, for instance, the cushion member 144 can assist in reducing a concentration of pressure on the feet 116 during operation of the bed exercise system 100.

As examples, the rigid support member 142 can be made from a metal and/or a plastic material. In some examples, the material from which the rigid support member 142 is made can be selected based on one or more factors such as, for instance, a weight of the material, a rigidity of the material, a cost of the material, and/or a thickness of the material. For instance, a material of the rigid support member 142 can be selected to achieve a rigidity that is greater than a threshold rigidity, a weight that is less than a threshold weight, a cost that is less than a threshold cost, and/or a thickness that is less than a threshold thickness. By selecting a relatively lightweight and/or low cost material, the foot pad 120 may be a disposable portion of the bed exercise system 100. Additionally, by selecting a relatively thin material, the foot pad 120 can be beneficially stored in a relatively compact, space-efficient manner when not in use.

Also, as examples, the cushion member 144 can be made from a foam material, feathers, a fiber material, and/or air. For instance, in one implementation, the cushion member 144 can be made from a polyurethane foam material. In some examples, the material from which the cushion member 144 is made can be selected based on one or more factors such as, for instance, a weight of the material, a compressibility of the material, a cost of the material, and/or a thickness of the material. These factors may also contribute to the disposability of the foot pad 120 and/or the space-efficiency of the foot pad 120 for storing of the bed exercise system 100 when not in use.

In an example, the foot pad 120 can have a height (e.g., a dimension between the upper side 134 and the lower side 136) between approximately 4 inches and approximately 15 inches, and a width (e.g., a dimension between the first lateral side 130 and the second lateral side 132) that is between approximately 9 inches and approximately 36 inches. In FIGS. 1A-1B, the foot pad 120 has a cross-sectional shape that is generally rectangular. However, in other examples, the foot pad 120 can have a different cross-sectional shape.

As shown in FIGS. 1A-1B, the leg support member 122 extends proximally from the lower side 136 of the foot pad 120. Additionally, in FIGS. 1A-1B, the leg support member 122 further extends between the first lateral side 130 and the second lateral side 132 of the foot pad 120. In general, the leg support member 122 is suitable for supporting the ankle(s) and the leg(s) 112 of the operator 104 during operation of the bed exercise system 100.

Within examples, the leg support member 122 can include an upper exterior surface 146 for engaging with the ankle(s) and the leg(s) 112 of the operator, and a lower exterior surface 148 for engaging with the mattress 108 of the bed 102. The lower exterior surface 148 can be made from a relatively low-friction material. As described herein, this can help the leg support member 122 and the foot pad 120 move between a first, retracted position and a second, extended position during operation of the bed exercise system 100.

Additionally, as shown in FIG. 1B, the leg support member 122 can include a flap portion 150 that extends distally and below the lower side 136 of the foot pad 120. The flap portion 150 can also be made from a relatively low-friction material. Thus, by extending below the foot pad 120, the flap portion 150 of the leg support member 122 can also assist in moving the leg support member 122 and the foot pad 120 between the first, retracted position and the second, extended position.

The upper exterior surface 146 and the lower exterior surface 148 can define a cavity. Additionally, the leg support member 122 can include a leg cushion 152 in the cavity. As such, the leg support member 122 can assist in improving operator comfort by providing cushioning between the ankle(s) and leg(s) 112 of the operator 104 and the mattress 108 of the bed 102.

In FIGS. 1A-1B, the leg support member 122 can include a seam 154 that divides the cavity into a first chamber and a second chamber, and the leg cushion 152 can be in the first chamber and the second chamber. This can help to maintain a relatively even distribution of the leg cushion 152 in the leg support member 122 and, thus, assist in enhancing a balance and stability of the leg support member 122 during operation of the bed exercise system 100.

As examples, the leg cushion 152 can be made from a foam material, feathers, a fiber material, and/or air. For instance, in one implementation, the leg cushion 152 can be made from a polyurethane foam material. In some examples, the material from which the leg cushion 152 is made can be selected based on one or more factors such as, for instance, a weight of the material, a compressibility of the material, a cost of the material, and/or a thickness of the material. These factors may also contribute to the disposability of the leg support member 122 and/or the space-efficiency of the leg support member 122 for storing of the bed exercise system 100 when not in use.

In some examples, the foot pad 120 can be foldable relative to the leg support member 122 at an interface between the foot pad 120 and the leg support member 122. For instance, in FIGS. 1A-1B, the foot pad 120 is foldable relative to the leg support member 122 at the lower side 136 of the foot pad 120. By folding the foot pad 120 and the leg support member 122, the bed exercise system 100 can be collapsed into a more compact, space-efficient size. This can help to improve (or maximize) efficient storage of one or more of the bed exercise systems 100 at a particular location. For example, there may be limited storage space at a healthcare facility (e.g., a hospital, a rehabilitation center, and/or a nursing home) and, thus, the foldability can help to use that limited storage space in an efficient manner.

As shown in FIGS. 1A-1B, the bed exercise system 100 can also include a plurality of ankle straps 156 coupled to the leg support member 122. Each ankle strap 156 is configured to (i) retain a respective foot 116 of the operator 104 in a position at which the sole of the foot 116 engages the foot pad 120 and/or (ii) retain a respective heel and lower leg 112 of the operator 104 in engagement with the leg support member 122. As such, the ankle straps 156 can help to support the legs 112 and feet 116 of the operator 104 and, thus, provide the operator 104 with greater control during operation of the bed exercise system 100.

Within examples, each ankle strap 156 can include an ankle cushion 158 and an adjustment belt 160. The ankle cushion 158 can help to improve (or maximize) the comfort of the operator 104 by, for instance, more evenly distributing pressure over the ankles and/or feet 116 of the operator 104. The adjustment belts 160 are configured to tighten and loosen the ankle straps 156. This can facilitate adjusting the size of a respective aperture between each ankle strap 156 and the leg support member 122 through which the ankles and/or feet 116 of the operator 104 are positioned in use. As such, the ankle straps 156 can be adjusted (e.g., via the adjustment belts 160) to accommodate a plurality of operators 104 having differently sized and/or shaped ankles and/or feet 116.

In FIGS. 1A-1B, the bed exercise system 100 includes two ankle straps 156. However, in another example, the bed exercise system 100 can include a single ankle strap 156, which can be located at a more central location between the first lateral side 130 and the second lateral side 132 to facilitate exercise for a single leg at one time. Thus, in general, the bed exercise system 100 can also include one or more ankle straps 156 coupled to the leg support member 122.

In FIGS. 1A-1B, the elastic connectors 124, 126 extend from the foot pad 120 to a proximal end 162 of the bed exercise system 100. As shown in FIGS. 1A-1B, the elastic connectors 124, 126 include a first elastic connector 124 and a second elastic connector 126. The first elastic connector 124 has a first end 164 coupled to the first lateral side 130 of the foot pad 120 and a second end 166 configured to couple to the bed 102. The second elastic connector 126 has a first end 168 coupled to the second lateral side 132 of the foot pad 120 and a second end 170 configured to couple to the bed 102.

As shown in FIG. 1A, the first end 164 of the first elastic connector 124 can include a first segment 164A coupled to a top portion (e.g., at location nearer the upper side 134 than the lower side 136) of the foot pad 120 and a second segment 164B coupled to a bottom portion (e.g., at location nearer the lower side 136 than the upper side 134) of the foot pad 120. Similarly, the first end 168 of the second elastic connector 126 can include a first segment 168A coupled to the top portion of the foot pad 120 and a second segment 168B coupled to the bottom portion of the foot pad 120. In this arrangement, the first elastic connector 124 and the second elastic connector 126 can more evenly distribute forces exerted, by the first elastic connector 124 and the second elastic connector 126, on the foot pad 120. This, in turn, can help to improve balance and usability of the bed exercise system 100.

As shown in FIG. 1A, the second end 166 of the first elastic connector 124 can include a first anchor 172 configured to couple to the bed 102, and the second end 170 of the second elastic connector 126 can include a second anchor 174 configured to couple to the bed 102. For example, in FIG. 1A, the first anchor 172 includes a first loop 176 and a first releasable fastener 178, and the second anchor 174 includes a second loop 180 and a second releasable fastener 182. The first releasable fastener 178 is suitable to allow the first anchor 172 to be coupled to and decoupled from a main portion 125 of the first elastic connector 124, and the second releasable fastener 182 is suitable to allow the second anchor 174 to be coupled to and decoupled from a main portion 127 of the second elastic connector 126. For instance, the first releasable fastener 178 and the second releasable fastener 182 can each be a respective buckle. A process for coupling the first elastic connector 124 and the second elastic connector 126 is further described herein with respect to FIGS. 3-4.

When the second end 166 of the first elastic connector 124 and the second end 170 of the second elastic connector 126 are coupled to the bed 102, the foot pad 120 is movable between the first, retracted position and the second, extended position relative to the bed 102. The first, retracted position is proximal of the second, extended position. Additionally, when the foot pad 120 is in the first, retracted position, the first elastic connector 124 and the second elastic connector 126 are in a relatively relaxed state (i.e., a relatively low tension state) such that the foot pad 120 applies a first or low level of resistance against the feet 116 and the legs 112 of the operator 104.

To move the foot pad 120 from the first, retracted position to the second, extended position, the operator 104 can extend his or her legs 112 and feet 116 to apply a force on the foot pad 120. As the foot pad 120 moves from the first, retracted position to the second, extended position, the tension on the first elastic connector 124 and the second elastic connector increases. In this way, the foot pad 120 applies progressively increasing levels of resistance against the feet 116 and the legs of the operator 104 as the foot pad 120 moves from the first, retracted position to the second, extended position.

After the foot pad 120 is in the second, extended position, the operator 104 can retract his or her legs 112 and feet 116 to move the foot pad 120 back from the second, extended position to the first, retracted position. As the foot pad 120 moves from the second, extended position to the first, retracted position, the tension on the first elastic connector 124 and the second elastic connector 126 decreases (and, thus, the resistance applied by the foot pad 120 against the feet 116 and the legs 112 of the operator 104 decreases).

By operating the bed exercise system 100 to move the foot pad 120 between the first, retracted position and the second, retracted position, various muscles of the operator 104 contract against the resistance applied by the foot pad 120 on the feet 116 and the legs 112 of the operator 104. For example, the operator 104 uses his or her quadriceps, gluteus maximus, adductor magnus, and soleus muscles during each repetition ("rep") (i.e., during each cycle of moving the foot pad 120 to and from second, extended position). Additionally, the operator 104 may use various secondary muscles during each rep such as, for instance, the hamstrings and gastrocnemius to help stabilize the foot pad 120.

Accordingly, by exercising these various muscles throughout the lower body of the operator 104, the bed exercise system 100 can help to reduce (or prevent) muscle atrophy and/or deterioration while the operator 104 is confined to the bed 102 (e.g., on bed rest). This in turn may help the operator 104 to reduce (or minimize) rehabilitation and/or recovery time after an injury and/or a medical procedure. Additionally, the bed exercise system 100 can help to reduce the risk of (or prevent) injuries to the operator 104 while standing and/or walking after a period of confinement to the bed 102.

Within examples, the first elastic connector 124 and the second elastic connector 126 have an elastic modulus that is suitable to allow the first elastic connector 124 and the second elastic connector 126 to (i) be stretched from the relaxed or low tension state in the first, retracted position to a higher tensioned state in the second, extended position, and then (ii) return to the first, retracted position without performance-impacting (or any) inelastic deformation of the first elastic connector 124 and/or the second elastic connector 126. As one example, the first elastic connector 124 and the second elastic connector 126 can include one or more braided nylon bands.

In some examples, the first elastic connector 124 can include a first adjustment mechanism 184 that is configured to adjust a length of the first elastic connector 124, and the second elastic connector 126 can include a second adjustment mechanism 186 that is configured to adjust a length of the second elastic connector 126. For instance, in FIG. 1A, the buckles that provide the first releasable fastener 178 and the second releasable fastener 182 can additionally or alternatively include a frame and one or more bars that are suitable for adjusting the lengths of the first elastic connector 124 and the second elastic connector 126 (e.g., the buckles can be snap-buckles).

In FIG. 1A, a first free end 188 of the main portion 125 of the first elastic connector 124 is threaded through the first adjustment mechanism 184 (e.g., a first frame and one or more bars), and a second free end 190 of the main portion 127 of the second releasable fastener 182 is threaded through the second adjustment mechanism 186 (e.g., a second frame and one or more bars). In this arrangement, the first free end 188 of the first elastic connector 124 and the second free end 190 of the second elastic connector 126 can be moved to extend away and retract towards the first adjustment mechanism 184 and the second adjustment mechanism 186 to increase and decrease, respectively, the lengths of the first elastic connector 124 and the second elastic connector 126.

The first adjustment mechanism 184 and the second adjustment mechanism 186 can thus provide for adjusting the lengths of the first elastic connector 124 and the second elastic connector 126 to accommodate a plurality of operators 104 having differently sized legs 112. Additionally, for example, the first adjustment mechanism 184 and the second adjustment mechanism 186 can provide for adjusting the lengths of the first elastic connector 124 and the second elastic connector 126 to increase and/or decrease the tension on the first elastic connector 124 and the second elastic connector 126. This may beneficially provide for adjusting the level of resistance of the bed exercise system 100 to accommodate various operators 104 having different muscle strengths and/or levels of fitness.

As noted above, in some examples, the bed exercise system 100 can include disposable portion and a reusable portion. In an implementation of such examples, the disposable portion can include the foot pad 120 and the leg support member 122, and the reusable portion can include at least a portion of the first elastic connector 124 and the second elastic connector 126. For instance, in FIG. 1A, the first elastic connector 124 can include a third releasable fastener 192, and the second elastic connector 126 can include a fourth releasable fastener 194 that are configured to decouple the main portion 125 of the first elastic connector 124 and the main portion 127 of the second elastic connector 126 from the foot pad 120. As an example, the third releasable fastener 192 and the fourth releasable fastener 194 can include a carabineer and/or a buckle. In this way, the first elastic connector 124 and the second elastic connector 126 can be releasably coupled to the foot pad 120. By decoupling the first elastic connector 124 and the second elastic connector 126, the foot pad 120 and the leg support member 122 can be disposed of while retaining the first elastic connector 124 and the second elastic connector 126 for use with another foot pad 120 and another leg support member 122.

As shown in FIGS. 1A-1B, the bed exercise system 100 can also include a first sleeve 196 and a second sleeve 198. The first sleeve 196 is coupled to the first lateral side 130 of the foot pad 120 and encloses a distal portion of the first elastic connector 124 (e.g., the first end 164 of the first elastic connector 124). The second sleeve 198 is coupled to the second lateral side 132 of the foot pad 120 and encloses a distal portion of the second elastic connector 126 (e.g., the first end 168 of the second elastic connector 126). By covering the distal portions of the first elastic connector 124 and the second elastic connector 126, the first sleeve 196 and the second sleeve 198 can reduce a risk (or prevent) entanglement between the operator 104 and the first elastic connector 124 and the second elastic connector 126.

Additionally, as shown in FIGS. 1A-1B, the first sleeve 196 and the second sleeve 198 each extend between the foot pad 120 and a leg support member 122. This can help to control a range of movement of the foot pad 120 relative to the leg support member 122 during operation of the bed exercise system 100. For instance, the first sleeve 196 and the second sleeve 198 can limit an extent of rotation of the foot pad 120 in a distal direction relative to the leg support member 122 to help stabilize and support the feet 116 of the operator 104 while moving the foot pad 120 between the first, retracted position and the second, extended position.

In some examples, the foot pad 120, the leg support member 122, the first sleeve 196, the second sleeve 198, the first elastic connector 124, and the second elastic connector 126 can be configured such that the operator 104 can perform a calf extension exercise. For instance, the foot pad 120 can move the foot pad 120 from an initial position to a rotated position by flexing his or her ankles to rotate the foot pad 120 distally relative to the leg support member 122 (i.e., to rotate the foot pad 120 about the interface between the foot pad 120 and the leg support member 122). In the rotated position, the first elastic connector 124 and the second elastic connector 126 can apply a resistance to the feet 116 of the operator 104. Accordingly, within examples, the bed exercise system 100 can be used to perform a leg press exercise and/or a calf extension exercise.

As described, the first elastic connector 124 and the second elastic connector 126 can include the first adjustment mechanism 184 and the second adjustment mechanism 186, respectively, to adjust the lengths (and thus tension) of the first elastic connector 124 and the second elastic connector 126. Within examples, the first elastic connector 124 and the second elastic connector 126 can additionally or alternatively include other mechanisms to adjust the tension of the first elastic connector 124 and the second elastic connector 126.

Figure 2:
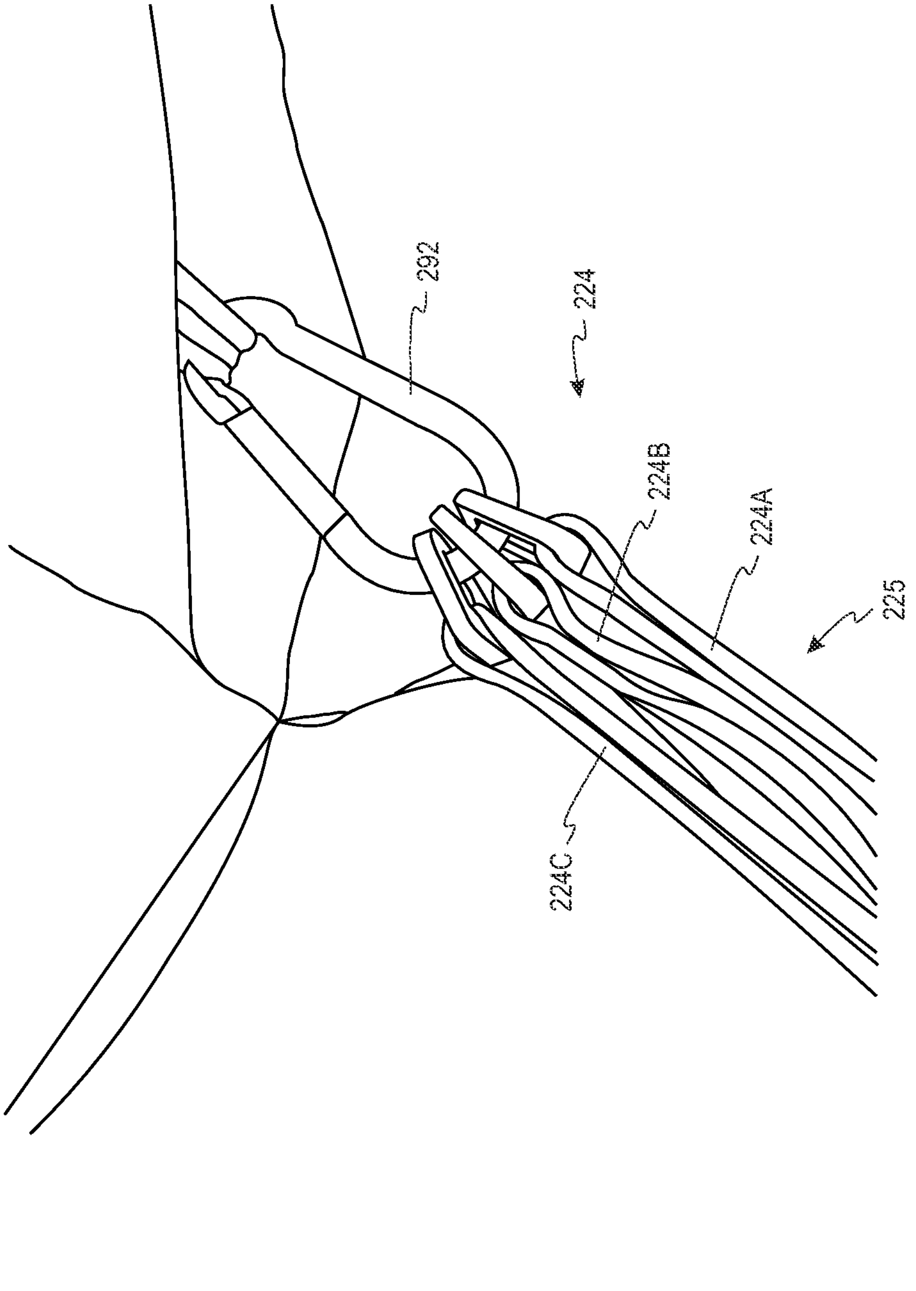
FIG. 2 illustrates a perspective view of a portion of an elastic connector, according to an example.

FIG. 2 depicts a main portion 225 of an elastic connector 224 according to another example embodiment. The elastic connector 224 can be the first elastic connector 124 and/or the second elastic connector 126 in FIGS. 1A-1B. In FIG. 2, the main portion 225 of the elastic connector 224 includes a plurality of bands 224A, 224B, 224C coupled to a releasable fastener 292. In this example, each of the bands 224A, 224B, 224C has a respective tension, and the tension of the elastic connector 224 is a combination of the respective tensions of the bands 224A, 224B, 224C. To adjust the tension of the elastic connector 224, one or more of the bands 224A, 224B, 224C can be decoupled from the releasable fastener 292. Thus, in FIG. 2, because the elastic connector 224 includes three bands 224A, 224B, 224C, the tension of the elastic connector 224 can be selectively adjusted between three different levels based on whether one, two, or all three of the bands 224A, 224B, 224C are coupled to the releasable fastener 292.

In some examples, the bands 224A, 224B, 224C can each have the same elastic modulus. In other examples, one of the bands 224A, 224B, 224C can have a different elastic modulus than another of the bands 224A, 224B, 224C. Additionally, although FIG. 2 depicts the elastic connector 224 having three bands 224A, 224B, 224C, the elastic connector 224 can have a different quantity of bands 224A, 224B, 224C (e.g., one band, two bands, four bands, five bands, etc.) in other examples.

Figure 3:
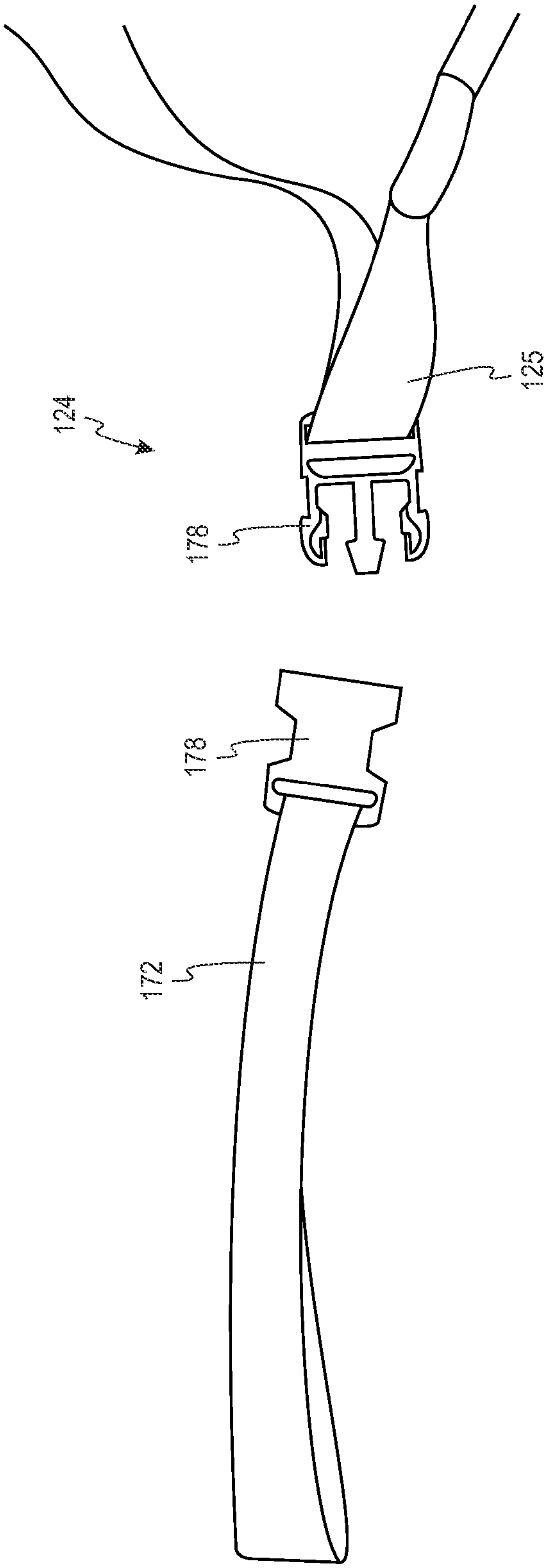
FIG. 3 illustrates a perspective view of a portion of an elastic connector, according to an example.

In operation, the bed exercise system 100 can be coupled to the bed 102. For instance, the first releasable fastener 178 can be actuated to decouple the first anchor 172 from the main portion 125 of the first elastic connector 124, and the second releasable fastener 182 can be actuated to decouple the second anchor 174 from the main portion 127 of the second elastic connector 126. As an example, FIG. 3 depicts the first anchor 172 decoupled from the main portion 125 according to an example embodiment.

Figure 4:
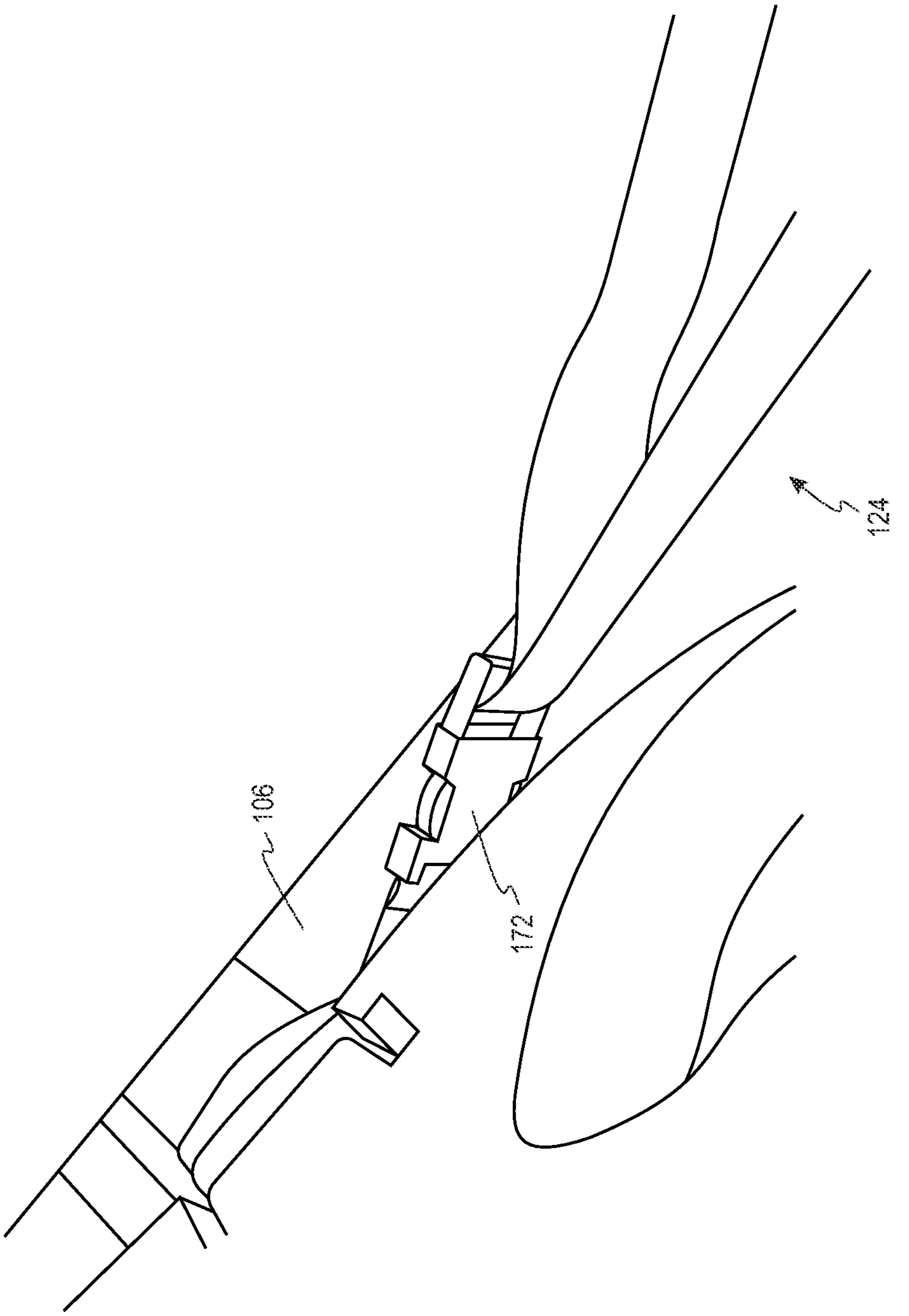
FIG. 4 illustrates a perspective view of the elastic connector shown in FIG. 3 coupled to a bed frame, according to an example.

After decoupling the first anchor 172 from the main portion 125 of the first elastic connector 124 and the second anchor 174 from the main portion 127 of the second elastic connector 126, the first anchor 172 and the second anchor 174 can then be wrapped around respective portions of the bed frame 106 and loose ends of the first anchor 172 and the second anchor 174 can be pulled through the first loop 176 of the first anchor 172 and the second loop 180 of the second anchor 174. The loose end of the first anchor 172 can then be recoupled, via the first releasable fastener 178, to the main portion 125 of the first elastic connector 124, and the loose end of the second anchor 174 can be recoupled, via the second releasable fastener 182, to the main portion 127 of the second elastic connector 126. As an example, FIG. 4 depicts the first elastic connector 124 coupled to the bed frame 106, according to one example.

Figure 5:
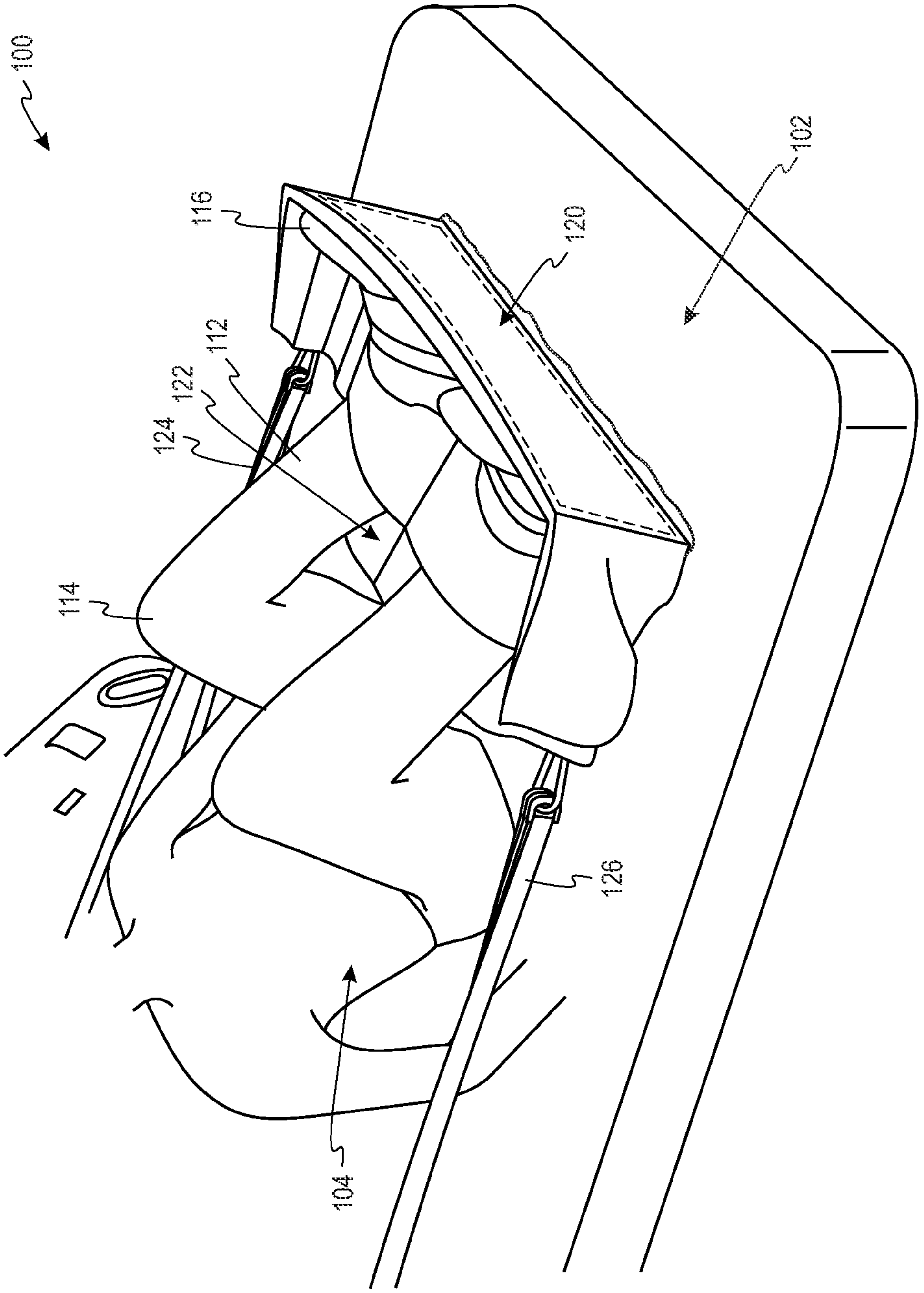
FIG. 5 illustrates a perspective view of the bed exercise system shown of FIG. 1 in a first position, according to an example.

After coupling the bed exercise system 100 to the bed 102, the bed exercise system 100 can be coupled to the operator 104. For example, the operator 104 can insert his or her feet 116 through the ankle straps 156 and then use the adjustment belts 160 to secure the feet 116 to the foot pad 120 and the leg support member 122. FIG. 5 depicts the bed exercise system 100 coupled to the bed 102 and the operator 104.

In particular, FIG. 5 depicts the bed exercise system 100 with the foot pad 120 in the first, retracted position. In one implementation, when the foot pad 120 is in the first, retracted position, the legs 112 of the operator 104 are bent at the knees 114 with an angle between approximately 60 degrees and approximately 90 degrees. In some instances, the operator 104 can adjust the length and/or quantity of bands 224A-224C of the first elastic connector 124 and/or the second elastic connector 126 to achieve a desired tension and/or length of the first elastic connector 124 and/or the second elastic connector 126 (e.g., via the first adjustment mechanism 184, the second adjustment mechanism 186, and/or releasable fastener 292) as described above.

Figure 6:
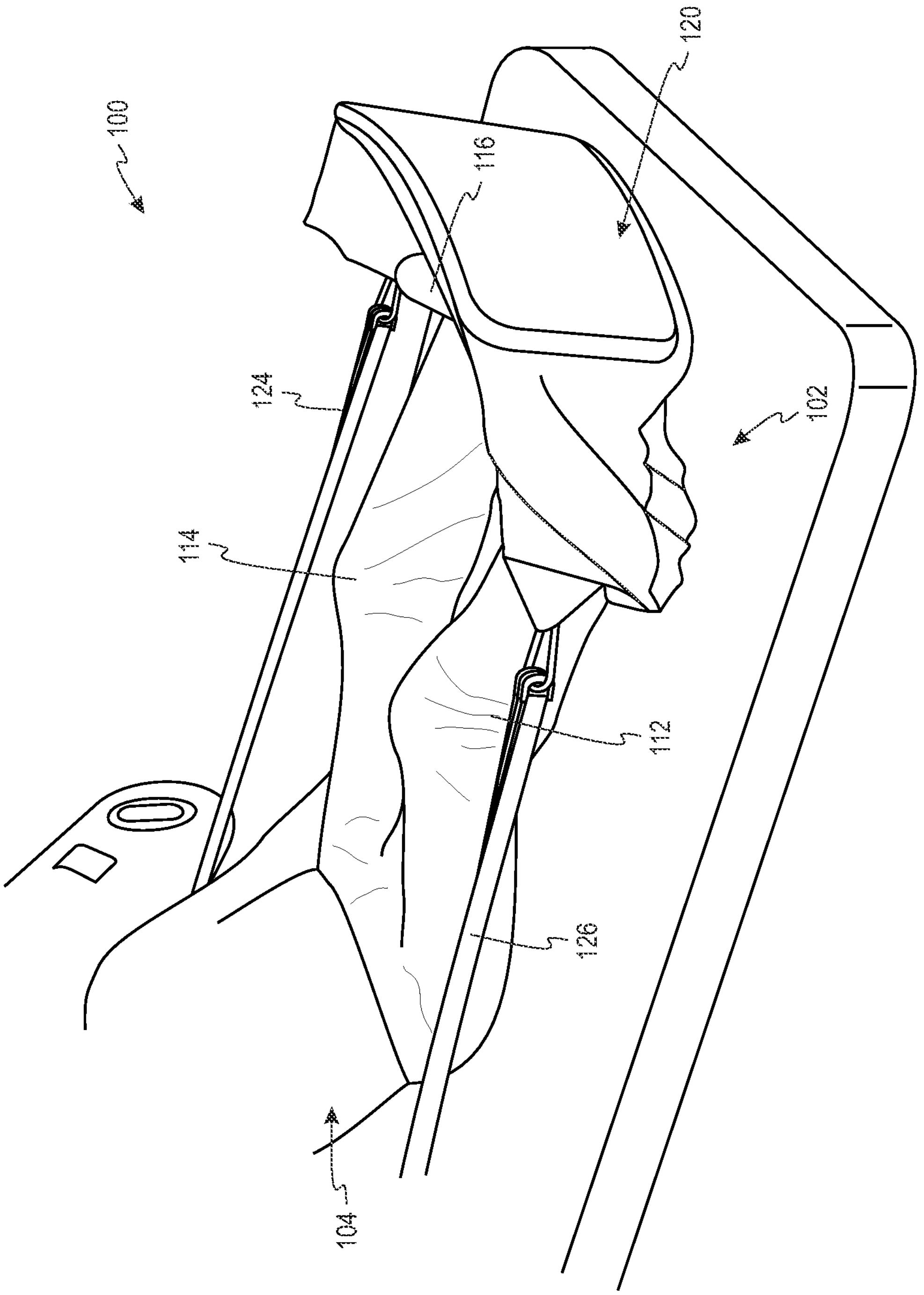
FIG. 6 illustrates a perspective view of the bed exercise system shown of FIG. 1 in a second position, according to an example.

Within examples, the operator 104 can then move the foot pad 120 from the first, retracted position shown in FIG. 5 to the second, extended position shown in FIG. 6. In one example, the second, extended position is approximately 12 inches to approximately 18 inches distal of the first, retracted position. The operator 104 may then move the foot pad 120 back from the second, extended position to the first, retracted position to complete a rep of a leg press exercise. The operator 104 can repeat this process to perform a workout, which helps to reduce (or prevent) muscle deterioration and/or muscle atrophy.

Additionally or alternatively, as described above, the operator 104 can rotate the foot pad 120 relative to the leg support member 122 to perform one or more reps of a calf extension exercise. For example, as described above, the operator 104 can rotate the foot pad, relative to the leg support member, from the initial portion to the rotated position to increase the tension on the first elastic connector 124 and the second elastic connector 126.

In some examples, after the operator 104 completes a workout (e.g., a plurality of reps) using the bed exercise system 100, the reusable portion of the bed exercise system 100 can be decoupled from the disposable portion of the bed exercise system 100. For instance, in an example implementation, the third releasable fastener 192 can be actuated to decouple the main portion 125 of the first elastic connector 124 from the foot pad 120 (and the first end 164 of the first elastic connector 124). Similarly, the fourth releasable fastener 194 can be actuated to decouple the main portion 127 of the second elastic connector 126 from the foot pad 120 (and the first end 168 of the second elastic connector 126). As such, in this example, the disposable portion of the bed exercise system 100 can include the foot pad 120, the leg support member 122, the first end 164 of the first elastic connector 124, and/or the first end 168 of the second elastic connector 126. Whereas, the reusable portion of the bed exercise system 100 can include the main portion 125 and the first anchor 172 of the first elastic connector 124, and the main portion 127 and the second anchor 174 of the second elastic connector 126.

After the reusable portion of the bed exercise system 100 is decoupled from the disposable portion of the bed exercise system 100, the disposable portion can be discarded and the reusable portion can be coupled to another disposable portion (e.g., a new, unused disposable portion) including, for example, another foot pad 120 and another leg support member 122. For instance, the reusable portion can be coupled to another disposable portion by coupling (e.g., via the third releasable fastener 192 and the fourth releasable fastener 194) the main portion 125 of the first elastic connector 124 and the main portion 127 of the second elastic connector 126 to another first end 164 and another second end 166, respectively, assembled with the other foot pad 120 and the other leg support member 122 of the other disposable portion. Though the bed exercise system 100, and the components thereof, are intended for single use and then disposal, the bed exercise system 100 and any of the components thereof may be refurbished for reuse. Also, reusable portions can be made ready for use with another operator 104 as a partially or wholly refurbished system and/or a resold bed exercise system 100. This can help to reduce (or minimize) waste and/or improve storage efficiency of a plurality of bed exercise systems 100. Refurbishment of the device may include steps such as inspecting the device, removing foreign particles, stains, or odors by washing one or more surfaces of the device, repairing tears or damage to the device, repairing or supplementing the stitching, such as at the seams, replacing any elements or components, replacing missing items from a kit, etc. Refurbishing may include decontaminating the system and/or any of the components such as by sterilization means, such as the use of gamma radiation, electron-beam radiation, X-ray radiation, Ethylene oxide (EtO), steam, such as through the use of an autoclave, or any combination thereof. And, refurbishing may include repackaging the system and elements thereof.

As described above, the elastic connectors 124, 126 are configured to couple to the bed 102. In some examples, as described above, the elastic connectors 124, 126 can be coupled to the bed frame 106 by the first anchor 172 and the second anchor 174. In other examples, the elastic connectors 124, 126 can additionally or alternatively be configured to couple to the mattress 108. For instance, the main portion 125 of the first elastic connector 124 and the main portion 127 of the second elastic connector 126 can be configured to couple to a mattress anchor that can couple the bed exercise system 100 to the mattress 108. As beds 102 may have a wide variety of different forms and shape due to different manufacturers and/or models, the mattress anchor can help to make the bed exercise system 100 more universally compatible with equipment in healthcare systems.

Figure 7A:
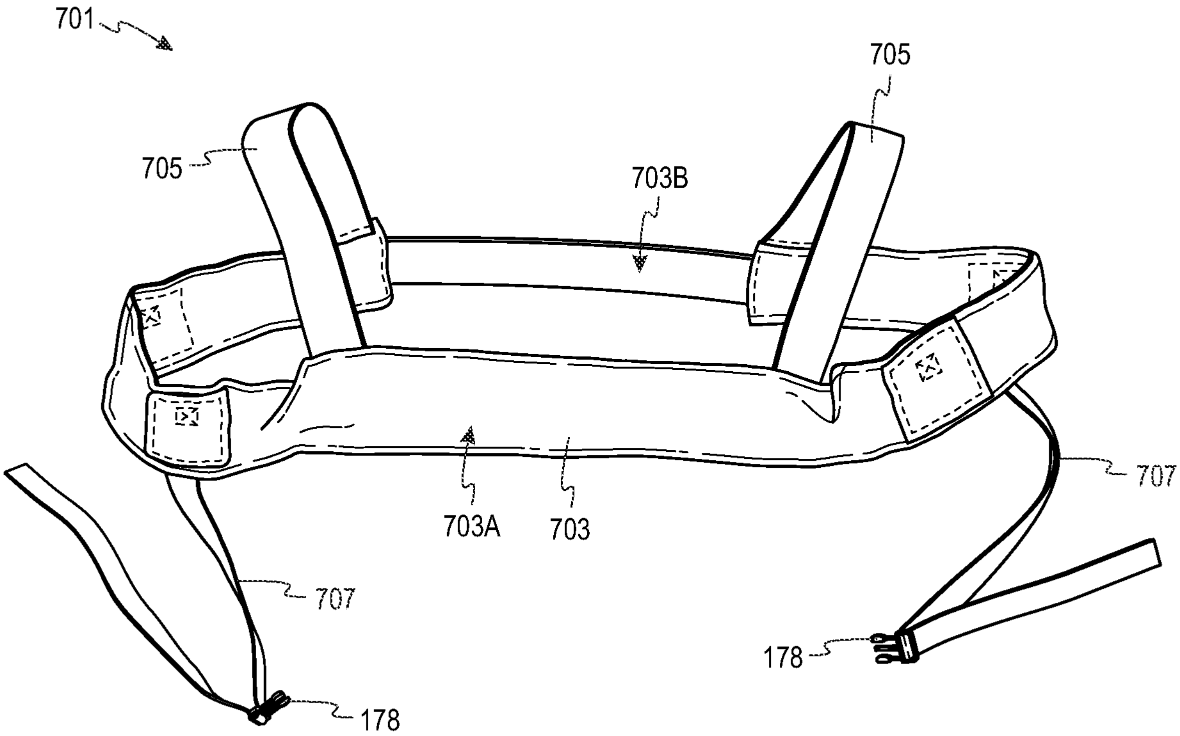
FIG. 7A illustrates a perspective view of a mattress anchor, according to an example.
Figure 7B:
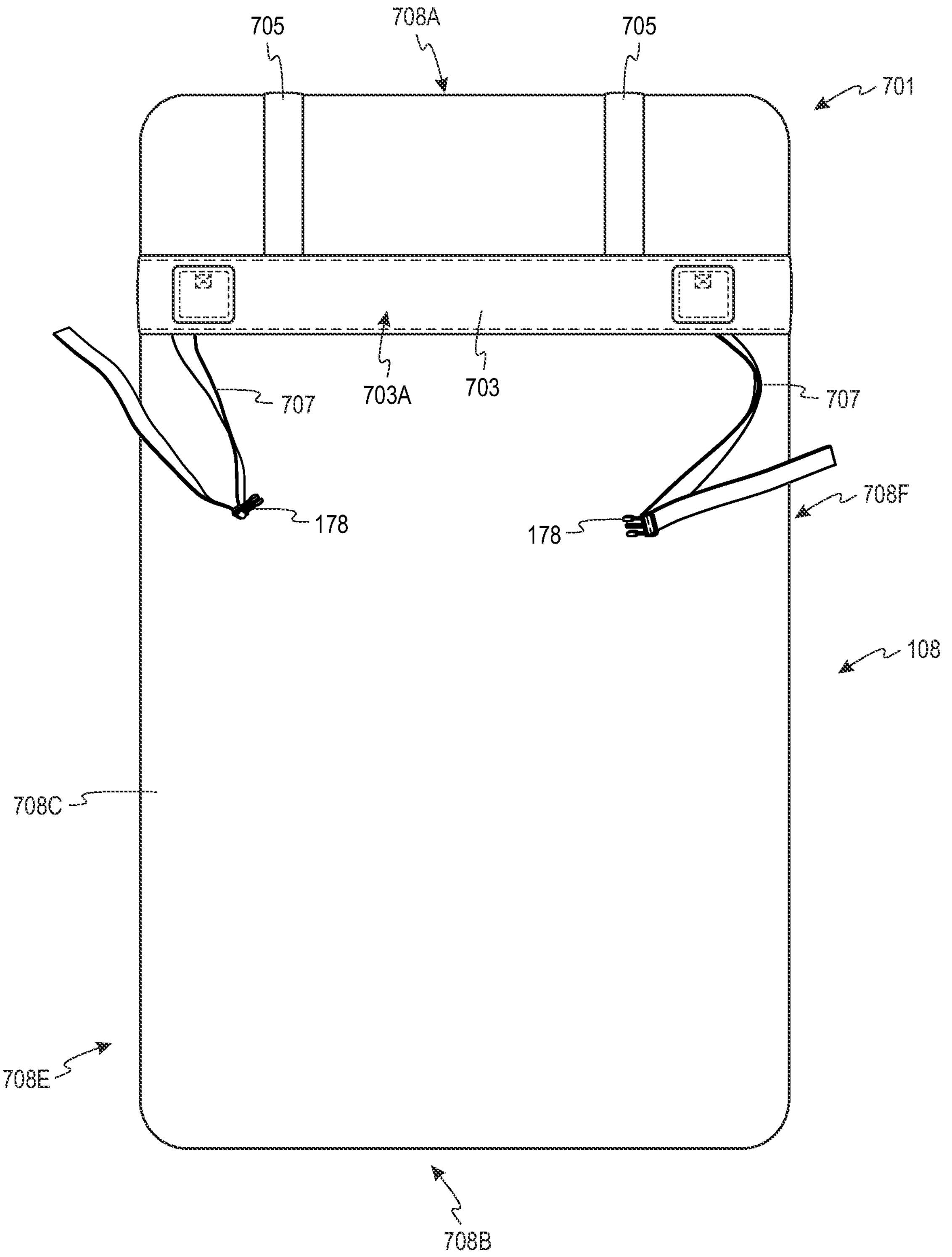
FIG. 7B illustrates an upper surface the mattress anchor of FIG. 7A coupled to a mattress, according to an example.
Figure 7C:
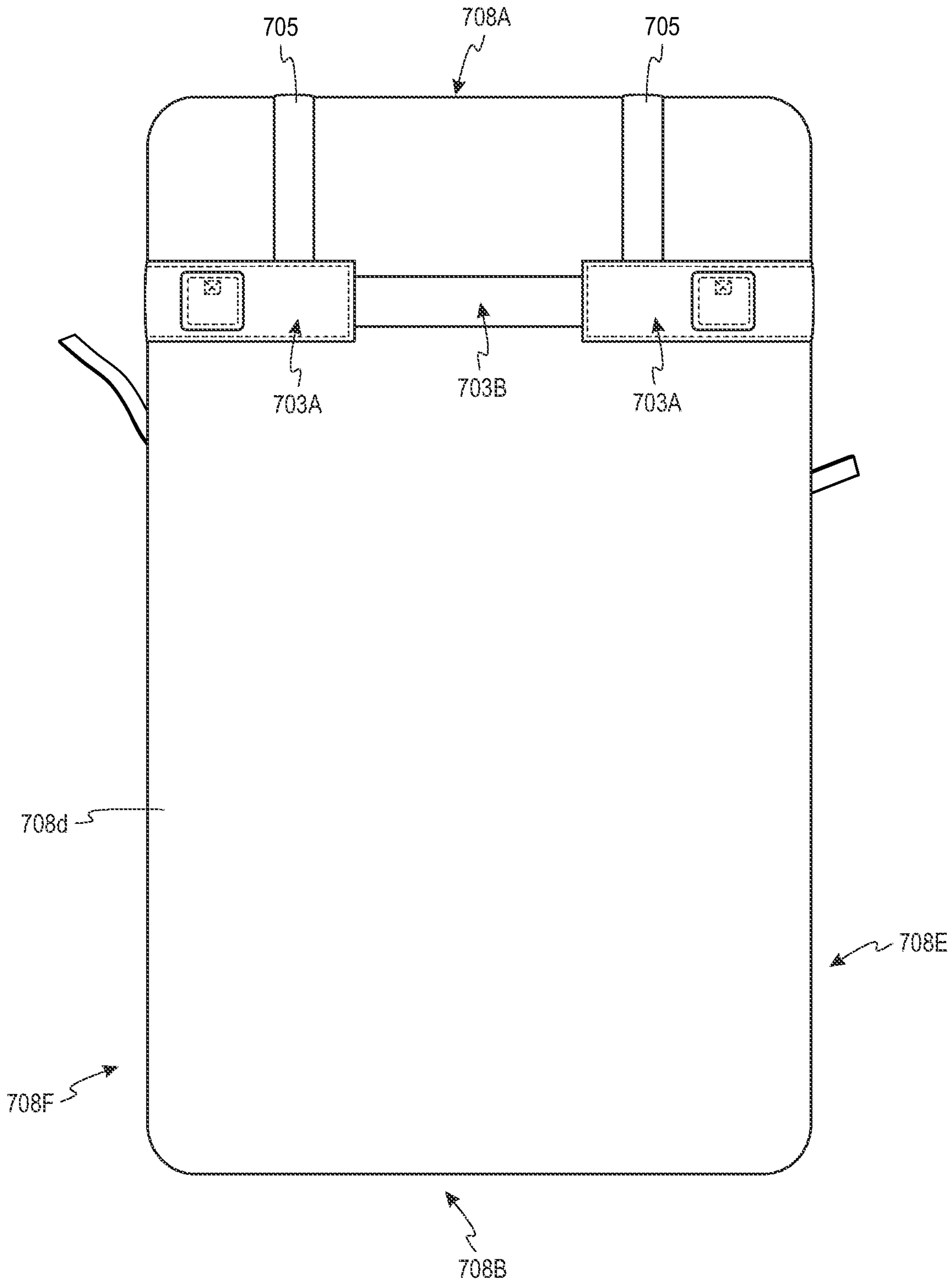
FIG. 7C illustrates a lower surface the mattress anchor of FIG. 7A coupled to the mattress, according to an example.

Referring now to FIGS. 7A-7C, a mattress anchor 701 is shown according to an example. In particular, FIG. 7A shows a perspective view of the mattress anchor 701 and FIGS. 7B-7C show the mattress anchor 701 coupled to the mattress 108.

In FIGS. 7B-7C, the mattress 108 includes a head end 708A, a foot end 708B, an upper surface 708C, a lower surface 708D opposite the upper surface 708C, a first lateral surface 708E, and a second lateral surface 708F. In this example, the head end 708A is configured to be located nearer to an operator's head and the foot end 708B is configured to be located nearer the operator's feet (e.g., the feet 116) when the operator is supported on the upper surface 708C of the mattress 108 and the mattress 108 is supported on a bed frame (e.g., the bed frame 106). In this arrangement, the mattress 108 has a length extending between the head end 708A and the foot end 708B, a width extending between the first lateral surface 708E and the second lateral surface 708F, a thickness extending between the upper surface 708C and the lower surface 708D, and a circumference extending around the upper surface 708C, the lower surface 708D, the first lateral surface 708E, and the second lateral surface 708F.

As shown in FIGS. 7A-7C, the mattress anchor 701 includes a mattress band 703, a plurality of end straps 705, and a plurality of connectors 707. The connectors 707 can be configured to couple to the main portions 125, 127 of the elastic connectors 124, 126 in a manner similar to that described above with respect to the anchors 172, 174. For instance, the connectors 707 can include a portion of the buckle 178 for coupling with the elastic connectors 124, 126, as shown in FIGS. 1A and 3. In other examples, the connectors 707 can be additionally or alternatively coupled to the elastic connectors 124, 126 by, for instance, one or more hooks, carabineer clips, gate clips, slots, and/or buttons.

In FIGS. 7A-7B, the mattress band 703 can be in the form of a loop that is configured to extend around the circumference (e.g., the width and the thickness) of the mattress 108. In some examples, the mattress band 703 can include an elastic material such that the mattress band 703 can have a circumferential size that can be adjusted to extend around mattresses having a plurality of different circumference sizes. As different mattresses may have different circumferential sizes, the elasticity of the mattress band 703 can help to more universally couple the bed exercise system 100 with a wide variety of mattresses types. However, the mattress band 703 can be entirely inelastic in other examples.

The end straps 705 can each extend from a first point on the mattress band 703 to a second point on the mattress band 703 such that the end straps 705 can engage the head end 708A of the mattress 108 when the mattress anchor 701 is coupled to the mattress 108. In particular, the end straps 705 can be configured such that the end straps 705 extend from a first portion of the mattress band 703 engaging the upper surface 708C of the mattress 108 to a second portion of the mattress band 703 engaging the lower surface 708D. In this arrangement, the end straps 705 can be configured to provide a stop against distal movement of the mattress anchor 701 and, thus, the proximal end (e.g., the proximal end 162) of the bed exercise system 100.

In FIGS. 7A-7C, the mattress band 703 includes an inelastic section 703A and an elastic section 703B. The elastic section 703B is configured to have an adjustable size, whereas the inelastic section 703A is configured to have a fixed, static size. In the example shown in FIGS. 7A-7C, the end straps 705 each extend between a first point on the inelastic section 703A and a second point on the inelastic section 703A. This can beneficially help to reduce stretching of the mattress anchor 701 in the distal direction while the operator is operating the foot pad 120 (which, in turn, applies a distally directed force on the mattress anchor 701 via the elastic connectors 124, 126).

In FIGS. 7A-7C, the mattress band 703 includes a single elastic section 703B that extends between opposing ends of the inelastic section 703A. However, in another example, the mattress band 703 can include a first elastic section 703B that is configured to be located on the lower surface 708D of the mattress 108 and a second elastic section 703B that is configured to be located on the upper surface 708C of the mattress 108.

Additionally, the mattress anchor 701 includes two end straps 705 in FIGS. 7A-7C. This can help to mitigate the mattress anchor 701 stretching by providing support against distal movement on both lateral sides of the head end 708A (e.g., near the first lateral surface 708E and the second lateral surface 708F of the mattress 108). However, in other examples, the mattress anchor 701 can include a lesser or a greater quantity of end straps 705.

In use, the mattress anchor 701 can be coupled to the mattress 108 by first positioning the mattress band 703 adjacent to the head end 708A of the mattress 108. Next, the mattress band 773A can be moved proximally over the head end 708A of the mattress 108 such that (i) the mattress band 703 extends around the circumference of the mattress 108 and (ii) the end straps 705 extends from the upper surface 708C of the mattress 108 to the lower surface 708D of the mattress 108. In some examples, moving the mattress band 703 over the head end 708A of the mattress 108 can include stretching, via the elastic section 703B, the mattress band 703 to increase the circumference of the mattress band 703 to be approximately the same size as the circumference of the mattress 108. As a result, the mattress band 703 can apply a compressive force to the mattress 108 can assist in resisting movement of the mattress band 703 relative to the mattress 108 when the mattress band 703 is coupled to the mattress 108. Also, in examples, the mattress band 703 can continue to move distally relative to the mattress 108 until the end straps 705 engage the head end 708A of the mattress 108 to limit further distal movement.

In one implementation of the process, the connectors 707 can be coupled to the first elastic connector 124 and the second elastic connector 126 after coupling the mattress anchor 701 to the mattress 108. In another implementation of the process, the connectors 707 can be coupled to the first elastic connector 124 and the second elastic connector 126 prior to coupling the mattress anchor 701 to the mattress 108.

Figure 8A:
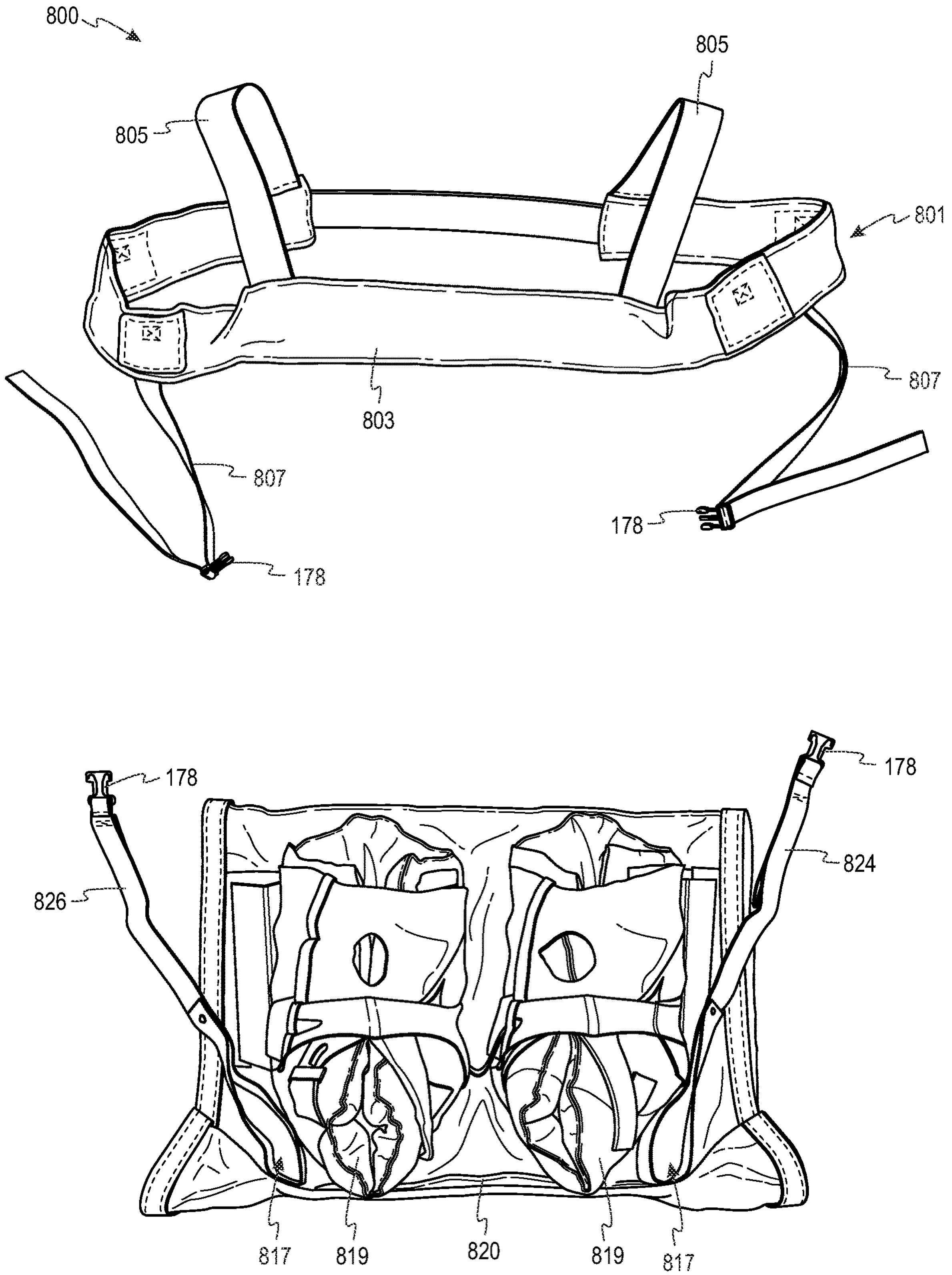
FIG. 8A illustrates a bed exercise system in a partially disassembled state, according to an example.

Referring now to FIGS. 8A-11B, a bed exercise system 800 is shown according to another example. FIG. 8A shows the bed exercise system 800 in a partially disassembled state. FIG. 8B shows the bed exercise system 800 in assembled state in which the bed exercise system 800 is coupled to a mattress 108 of a bed 102 at a proximal end of the bed exercise system 800 and coupled to the feet of an operator at a distal end of the bed exercise system 800.

Figure 8B:
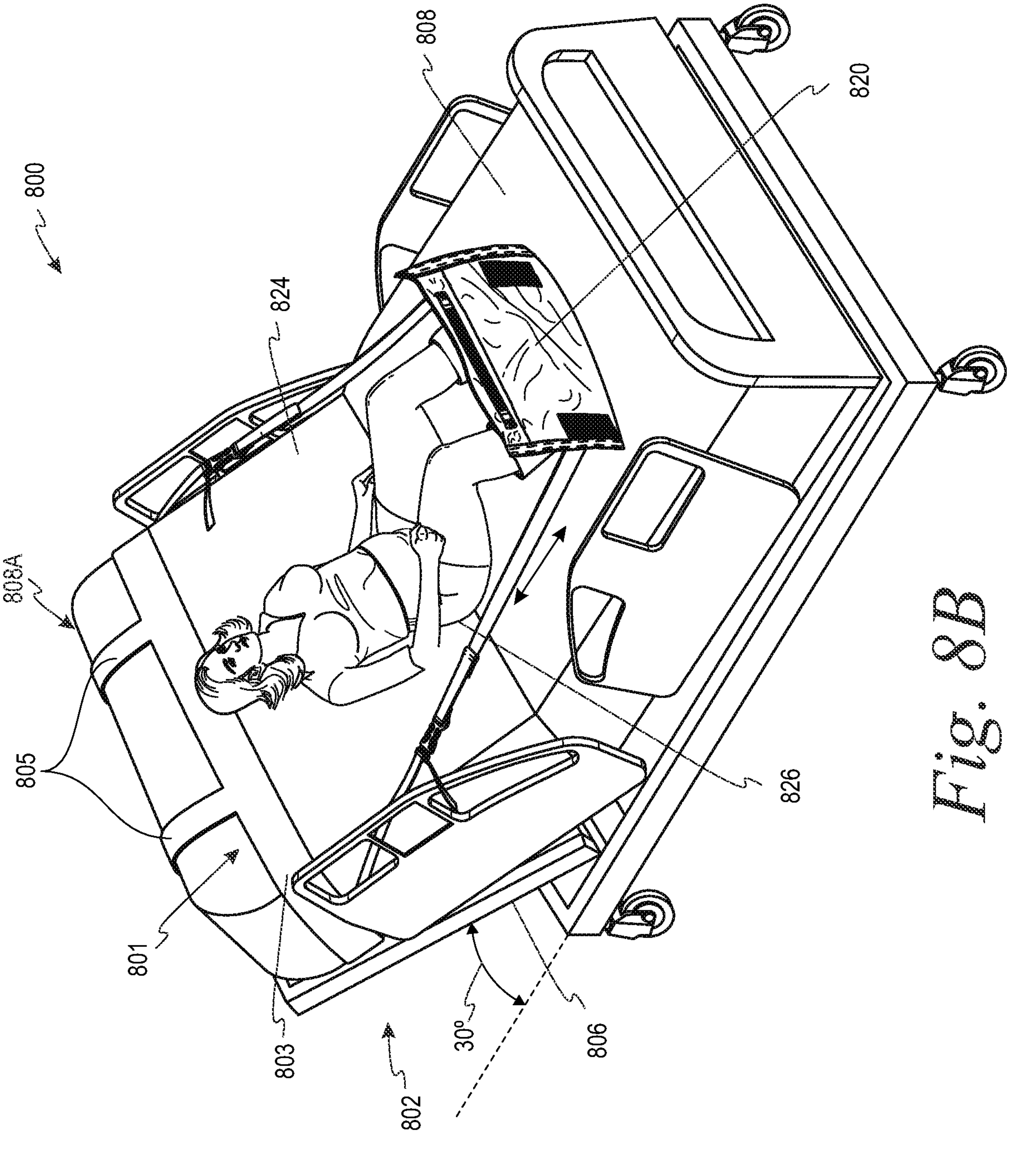
FIG. 8B illustrates the bed exercise system of FIG. 8A coupled to a bed and an operator, according to an example.

As shown in FIGS. 8A-8B, the bed exercise system 800 includes a mattress anchor 801, a foot pad 820, a first elastic connector 824, and a second elastic connector 826. The mattress anchor 801 can be substantially similar or identical to the mattress anchor 701 described above with respect to FIGS. 7A-7C. As such, the mattress anchor 801 can include a mattress band 803, one or more end straps 805, and a plurality of connectors 807 as described above. In FIG. 8B, the mattress anchor 801 is coupled to a head end 808A of a mattress 808 as described above with respect to FIGS. 7A-7C.

The first elastic connector 824 and the second elastic connector 826 couple the mattress anchor 801 to the foot pad 820. In some examples, the first elastic connector 824 and the second elastic connector 826 can be configured as shown in FIGS. 1A-6; however, FIG. 9 shows another example configuration for the first elastic connector 824 and the second elastic connector 826.

Figure 9:
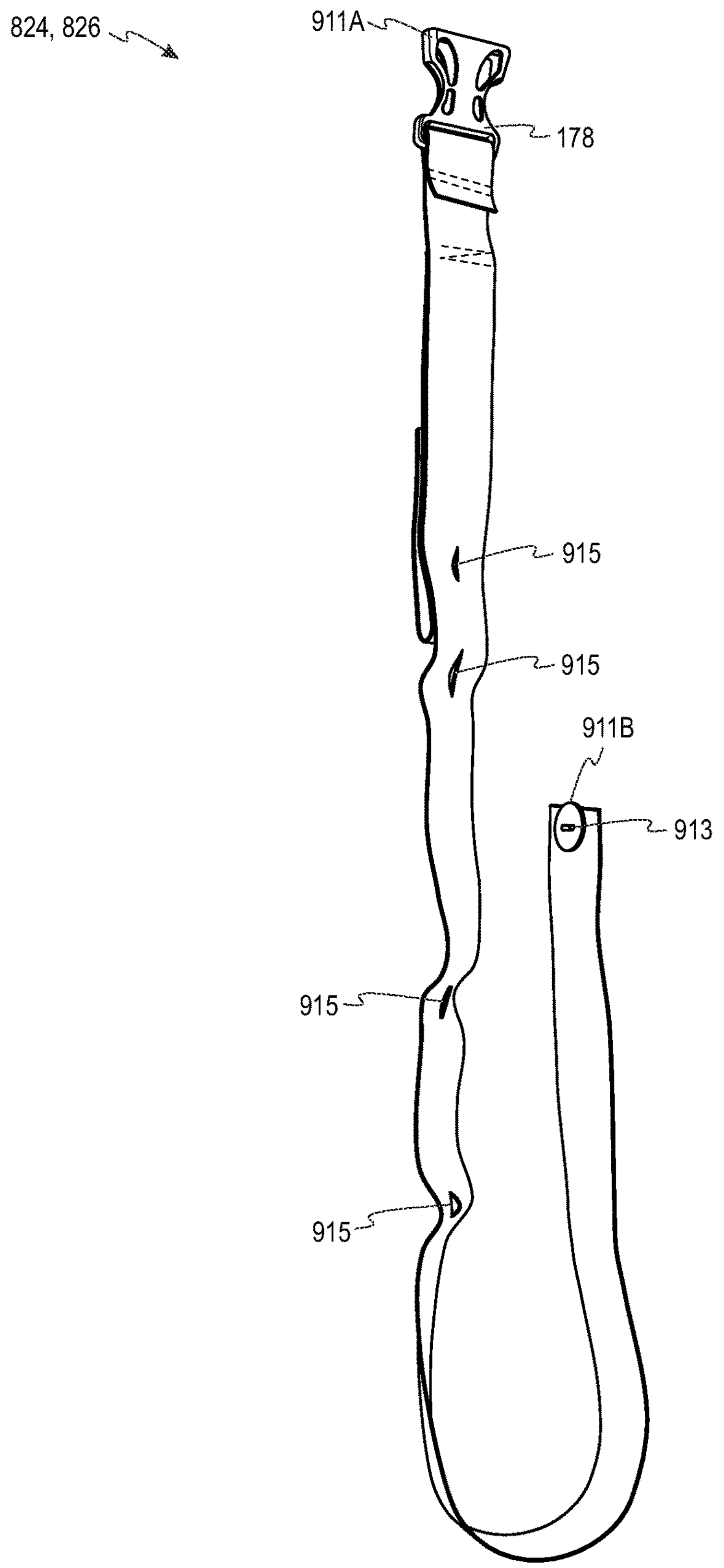
FIG. 9 illustrates an elastic connector of the bed exercise system of FIGS. 8A-8B, according to an example.

As shown in FIG. 9, the first and second elastic connectors 824, 826 can be elongated strips formed of a resilient material extending between a first end 911A and a second end 911B. The first end 911A of the first and second elastic connectors 824, 826 is configured for detachably coupling to the connectors 807 of the mattress anchor 801. For example, the first end 911A can include a portion of a buckle (e.g., the buckle 178) for coupling with a corresponding portion of the buckle on the connectors 807 of the mattress anchor 801. However, as discussed above, other structures can be used for detachably coupling the first and second elastic connectors 824, 826 to the connectors 807 of the mattress anchor 801.

The second end 911B of the first and second elastic connectors 824, 826 are configured to couple to the foot pad 820. For example, the second end 911B can include a button 913 that is configured to couple to an aperture 915, which is sized to receive the button 913, on the first and second elastic connectors 824, 826. In operation, the second end 911B of the first and second elastic connectors 824, 826 is passed through a retention loop 817 (shown in FIGS. 8A and 10A-10B) of the foot pad 820. With the first and second elastic connectors 824, 826 extending through the retention loop 817 on the foot pad 820, the button 913 is coupled to one of the apertures 915 to detachably couple the elastic connectors 824, 826 to the foot pad 820 as shown in FIG. 8A.

In FIG. 9, the first and second elastic connectors 824, 826 can each include a plurality of the apertures 915 such that a length of the first and second elastic connectors 824 can be adjusted by coupling the button 913 to one aperture 915 selected from among the plurality of apertures 915. As noted above, adjusting the length of the first and second elastic connectors 824, 826 can help to accommodate a plurality of operators having differently sized legs and/or to adjust the tension on the first elastic connector 824 and the second elastic connector 826. This may beneficially provide for adjusting the level of resistance of the bed exercise system 800 to accommodate various operators having different muscle strengths and/or levels of fitness.

In other examples, the first and second elastic connectors 824, 826 can have a fixed, non-adjustable length. For instance, the first and second elastic connectors 824, 826 can have a single aperture 915 as opposed to the plurality of apertures 915, as shown in FIG. 9. Additionally, although the first and second elastic connectors 824, 826 are coupled to the foot pad 820 by the button 913, the aperture 915, and the retention loop 817, the first and second elastic connectors 824, 826 can be coupled to the foot pad 820 and/or made adjustable by one or more additional or alternative coupling mechanisms (e.g., one or more snap fasteners, hook-and-loop fasteners, clips, and/or clasps).

As shown in FIGS. 8A, 8B, 10D, 12A, and 12B, the foot pad 820 is configured to couple with a pair of boots 819 worn on the feet of the operator. As an example, the boots 819 can be heel protector boots. Heel protector boots are configured to support the heels of the operator above the mattress 808 to help mitigate injuries to the feet such as, for example, foot drop and/or pressure ulcers. For instance, the heel protector boots can be configured to maintain the feet in a neutral position to protect a peroneal nerve. Example features of the heel protector boots are further described below with respect to FIG. 11.

In the illustrated example, the foot pad 820 can omit a rigid support member (e.g., the rigid support member 142) as the boots 819 can have sufficient bulk to support the feet of the operator against the foot pad 820. However, as described below with respect to FIGS. 13A-16, a foot pad for use with the boots 819 can include the rigid support member in other examples (e.g., in an example in which the bed exercise system 100, 800 is configured to be used with the boots 811 and without the boots 811).

Also, in the example shown in FIGS. 8A-8B, the foot pad 820 can omit the cushion member 144 described above. For instance, the boots 811 can include sufficient cushioning to enhance patient comfort. Also, in an implementation in which the foot pad 820 omits the rigid support member, the foot pad 820 can be sufficiently comfortable without the padding provided by the cushion member 144. Omitting the rigid support member 142 and/or the cushion member 144 can beneficially help to reduce a size of the bed exercise system 800 when in storage prior to or after use.

FIGS. 10A-10D show the foot pad 820 of FIG. 8A according to an example.

Figure 10A:
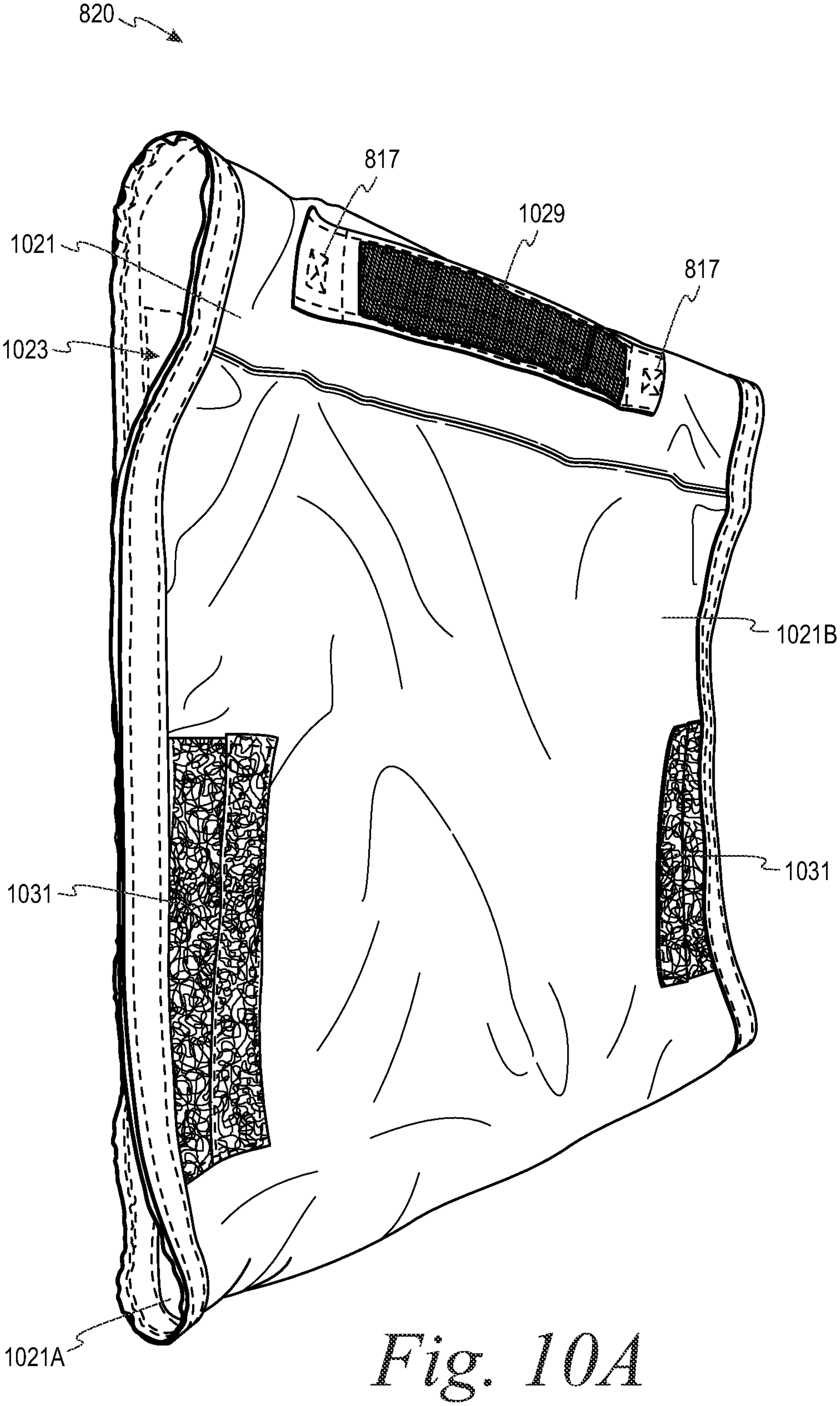
FIG. 10A illustrates a perspective view of a foot pad of the bed exercise system of FIGS. 8A-8B, according to an example.
Figure 10B:
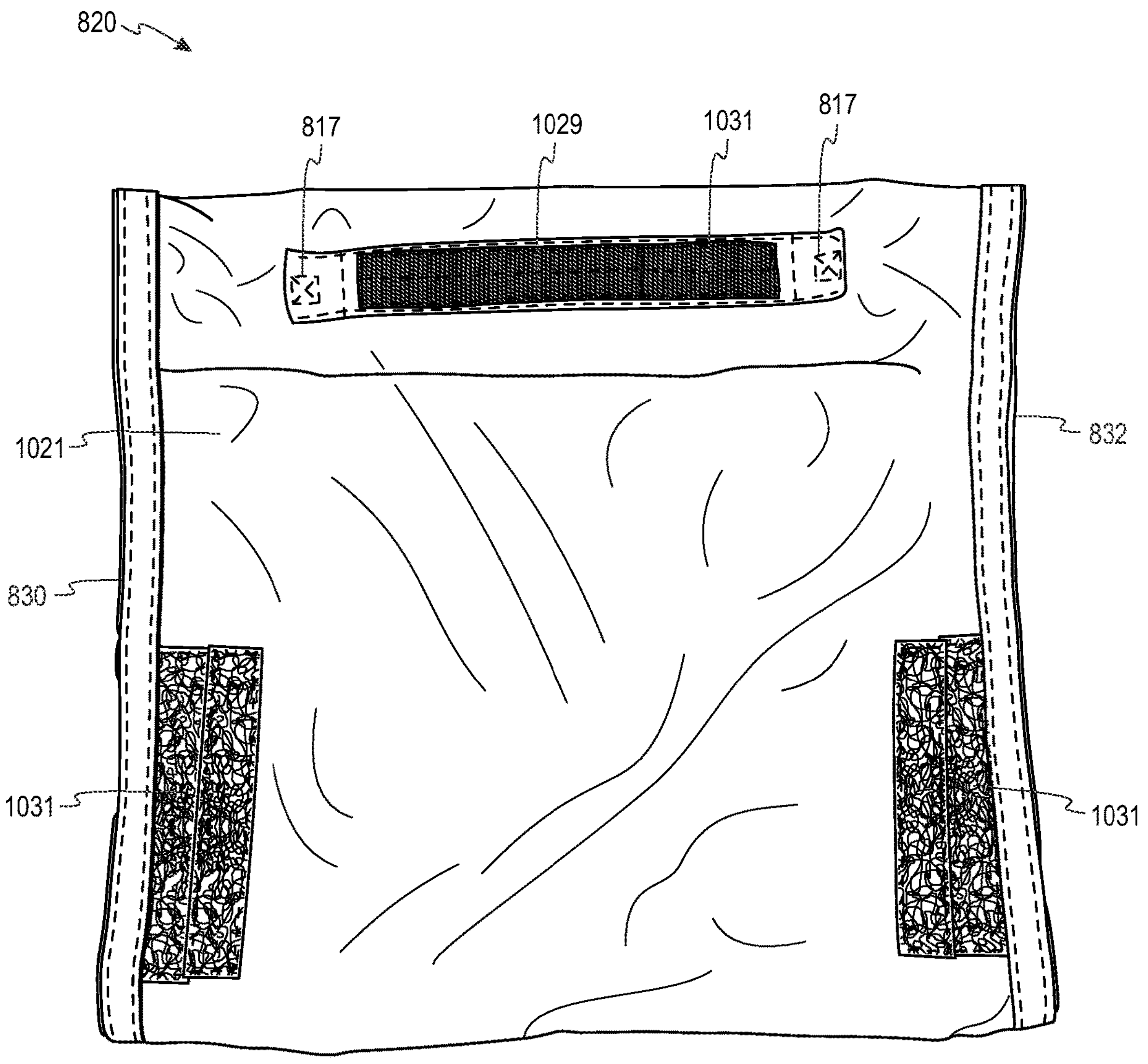
FIG. 10B illustrates a top view of a foot pad of the bed exercise system of FIGS. 8A-8B, according to an example.
Figure 10C:
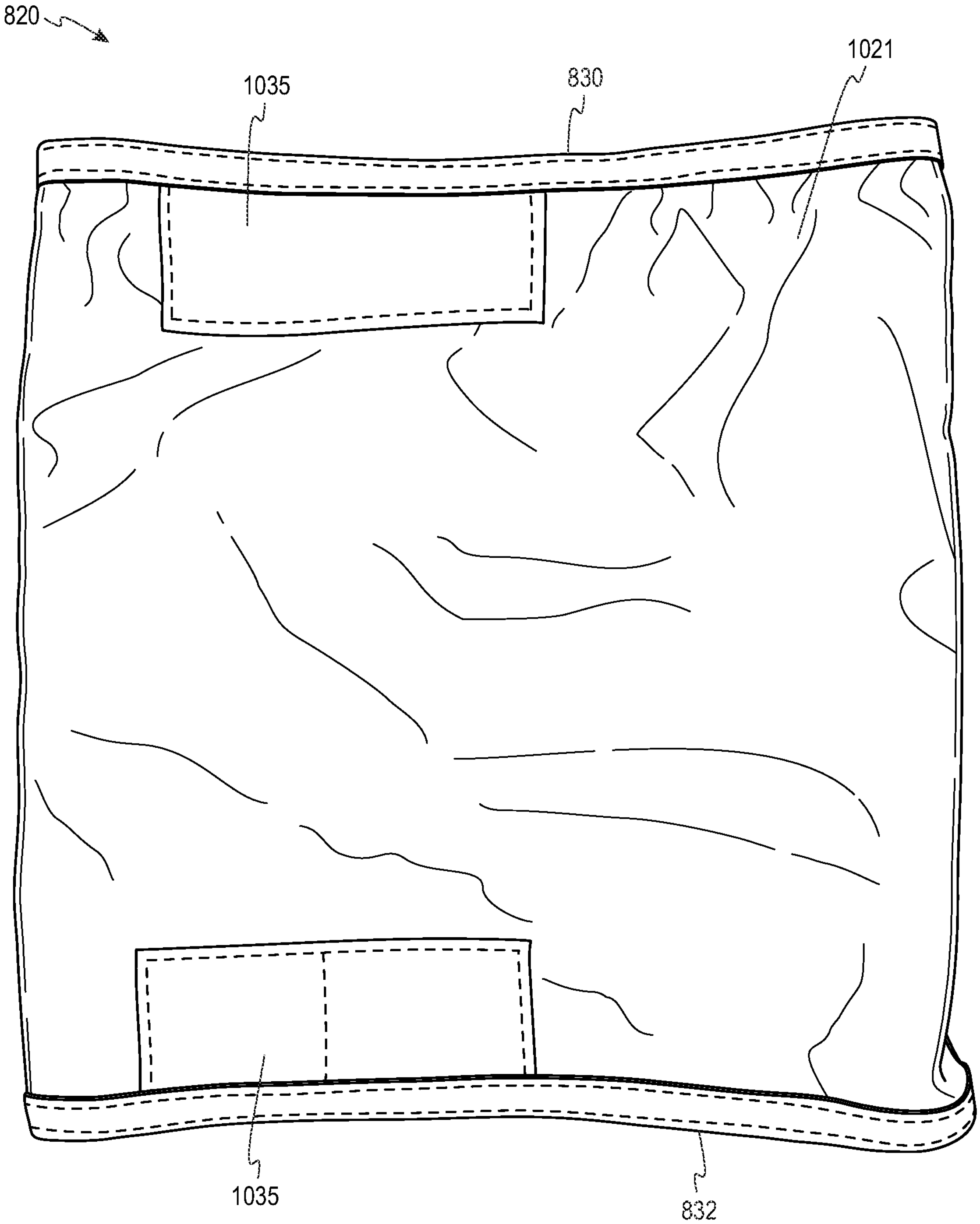
FIG. 10C illustrates a bottom view of a foot pad of the bed exercise system of FIGS. 8A-8B, according to an example.

In particular, FIG. 10A shows a perspective view of the foot pad 820, FIG. 10B shows a plan view of a top of the foot pad 820, and FIG. 10C shows a plan view of a bottom of the foot pad 820, according to an example. In general, the bottom of the foot pad 820 is configured to engage an upper surface of the mattress 808 and the top of the foot pad 820 is configured couple with the boots 819, as described below, and the first and second elastic connectors 824, 826, as described above.

As shown in FIGS. 10A-10D, the foot pad 820 is in the form of a tube 1021. In the form of the tube 1021, the foot pad 820 have an interior surface 1021A that defines a bore 1023 through the foot pad 820, and an exterior surface 1021B opposite the interior surface 1021A. The tube 1021 is formed of a flexible material. As an example, the flexible material of the tube 1021 can include a material having a coefficient of friction between approximately 0.20 and 0.25. For instance, the flexible material can be denier nylon of approximately 70 D or lower, a polyester, and/or a tight-weave cotton. More generally, the tube 1021 can be formed of a material having a flexibility that allows the tube 1021 to collapse on itself such that the interior surface 1021A is folded over on itself. As described in further detail below, this can provide for a first portion of the interior surface 1021A sliding over and in engagement with a second portion of the interior surface 1021A when the operator moves the foot pad 820 in the proximal direction and the distal direction relative to the mattress anchor 801 coupled to the mattress 808.

As shown in FIG. 10B, the top of the foot pad 820 can include a strip 1029 of material extending in a direction parallel to a width of the foot pad 820 (e.g., parallel to a direction between a first lateral side 830 and a second lateral side 832 of the foot pad 820). As shown in FIG. 10B, the retention loops 817 for coupling to the first and second elastic connectors 824, 826 can be located at opposing ends of the strip 1029. In this arrangement, a force applied to the foot pad 820 by the first and second elastic connectors 1024, 1026 (e.g., during a rep) is also applied to the strip 1029. The strip 1029 can thus help to distribute the force over a greater surface area of the foot pad 1020 (than if the strip 1029 was omitted).

In FIG. 10B, the strip 1029 is positioned on the foot pad 1020 such that the first and second elastic connectors 824, 826 couple to the foot pad 820 closer to balls of the operator's feet than the heel or the toes of the operator's feet when the boots 819 are coupled to the foot pad 820. This can help to support the operator's feet in a position that assists in pointing the operator's toes upward, which may beneficially improve the operator's form during operation of the bed exercise system 800.

As shown in FIGS. 10A-10B, the foot pad 820 can also include a plurality of boot-connector sections 1031 positioned on the exterior surface 1021B and top of the tube 1021. As shown in FIG. 11, the boots 819 can include a footpad-connector section 1133 on a bottom of the boots 819 that is configured to releasably couple to the boot-connector sections 1031 of the foot pad 820. In FIGS. 10A-12B, the boot-connector sections 1031 can include hook-and-loop fastener sections that can detachably couple to corresponding hook-and-loop fasteners sections of the footpad-connector sections 1133 on the bottom of the boots 819 to detachably secure the boots 819 to the foot pad 820.

In FIGS. 10A-10B, the boot-connector sections 1031 can include a first section located adjacent to the first lateral side 830, a second section located adjacent to the second lateral side 832, and/or a third section located at the strip 1029. This can help to couple each boot 819 to the foot pad 820 at a plurality of points of contact and, thus, more securely couple the boots 819 to the foot pad 820. However, the boot-connector sections 1031 can include a lesser or a greater quantity of sections in other examples.

As shown in FIG. 10C, the bottom of the foot pad 820 can include one or more high friction portions 1035 configured to inhibit the foot pad 820 from sliding on the upper surface of the mattress 808. The one or more high friction portions 1035 are formed of a material that resists sliding along the surface of the mattress 808. As an example, the one or more high friction portions 1035 can be a material having a coefficient of friction that is greater than 1.0. For instance, the material of the high friction portions 1035 can be a urethane-coated nylon and/or polyester coated with an adhesive. Additionally, within examples, the high friction portions 1035 of the exterior surface 1021B of the tube 1021 can have a first coefficient of friction, the interior surface 1021A of the tube 1021 can have a second coefficient of friction, and the first coefficient of friction can be greater than the second coefficient of friction Although the exterior surface 1021B of the tube 1021 includes high friction portions 1035 in FIG. 10C, an entirety of the exterior surface 1021B can be made from a high friction material in another example. Additionally, although the tube 1021 includes two high friction portions 1035 in FIG. 10C, the tube 1021 can include a lesser quantity or a greater quantity of high friction portions 1035 in other examples.

In FIG. 10C, the high friction portions 1035 are located adjacent to the first lateral side 830 and the second lateral side 832. This can help to stabilize the foot pad 820 during operation of the bed exercise system 800. However, the high friction portions 1035 can be provided in additional or alternative locations on the exterior surface 1021B of the tube 1021 in other examples.

As noted above, the foot pad 820 is in the form of the tube 1021. With the one or more high friction portions 1035 resisting sliding of the foot pad 820 relative to the mattress 808, the interior surface 1021A slides over itself as the foot pad 820 is moved relative to the mattress 808. To facilitate the foot pad 820 moving relative to the mattress 808 while the high friction portions 1035 resist movement, the interior surface 1021A can be formed from a material having a relatively low coefficient of friction. As examples, the interior surface 1021A can include at least one material selected from a group of materials including Nylon, polyester, or tight weave cotton.

Figure 12A:
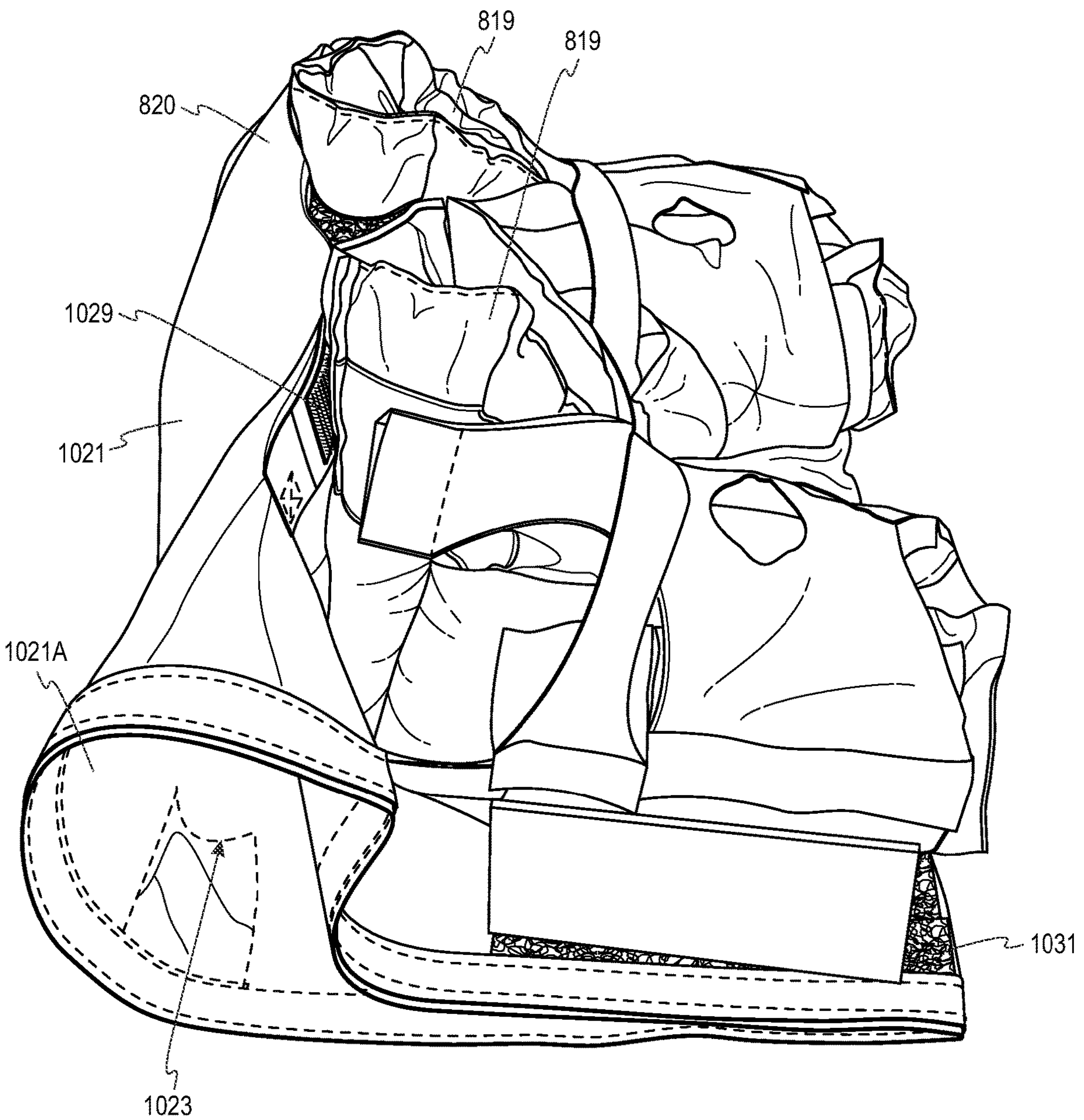
FIG. 12A illustrates the heel protectors and foot pad of FIGS. 10A-11 in a first position, according to an example.
Figure 12B:
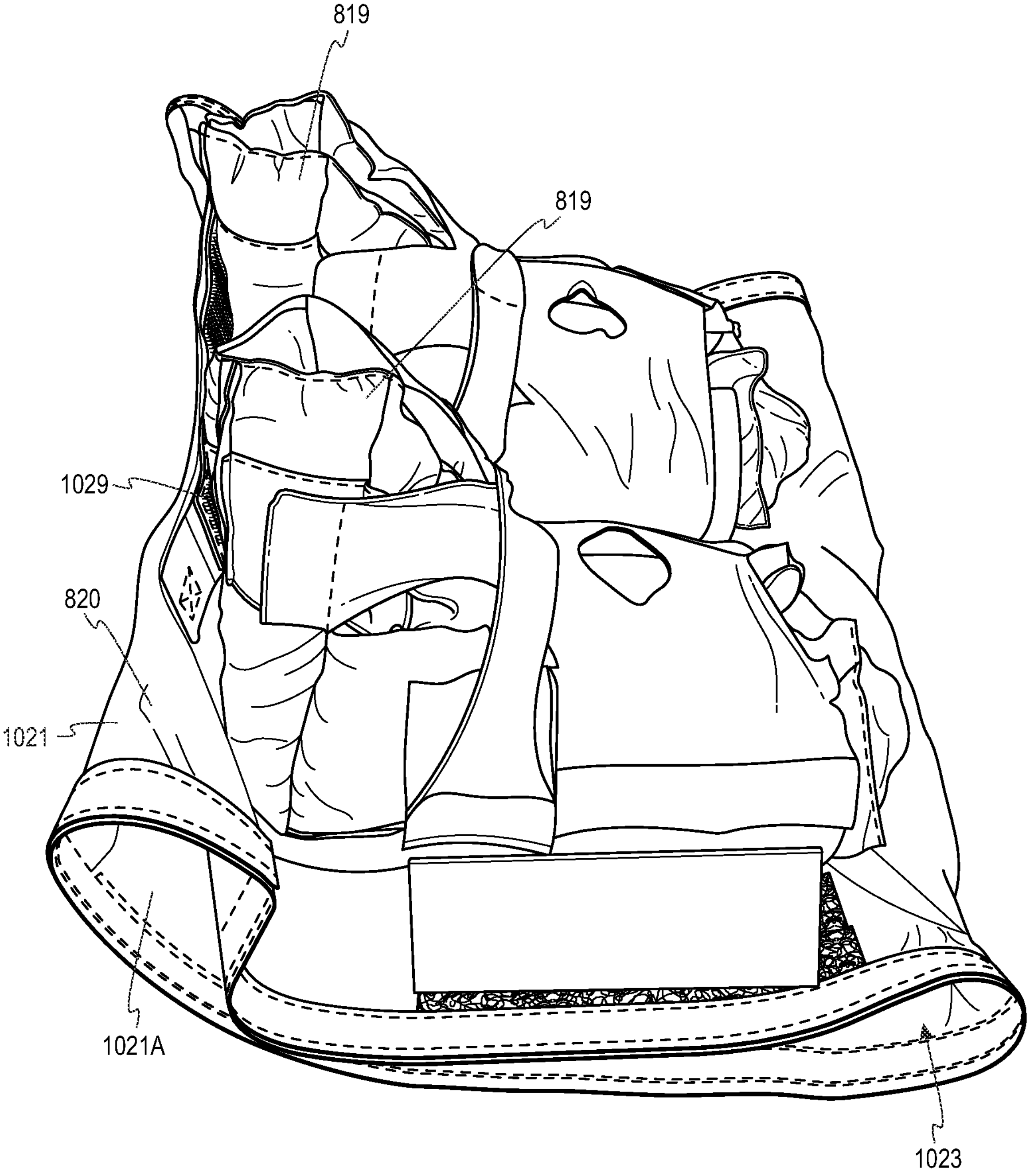
FIG. 12B illustrates the heel protectors and foot pad of FIGS. 10A-11 in a second position, according to an example.

In operation, the foot pad 820 is placed on the mattress 808 with the high friction portions 1035 on the bottom of the foot pad 820 so as to contact the upper surface of the mattress 808. The foot pad 820 is oriented such that the strip 1029 extends in a direction substantially perpendicular to the length of the bed 802. The boot-connector sections 1031 of the foot pad 820 are detachably coupled to the footpad-connector sections 1133 of the boots 819 such that the strip 1029 is positioned approximately level with the balls of the operator's feet, as shown in FIGS. 12A-12B. Positioning the strip 1029 along the balls of the operator's feet aid in maintaining correct foot positioning with the toes pointed upwards.

Figure 10D:
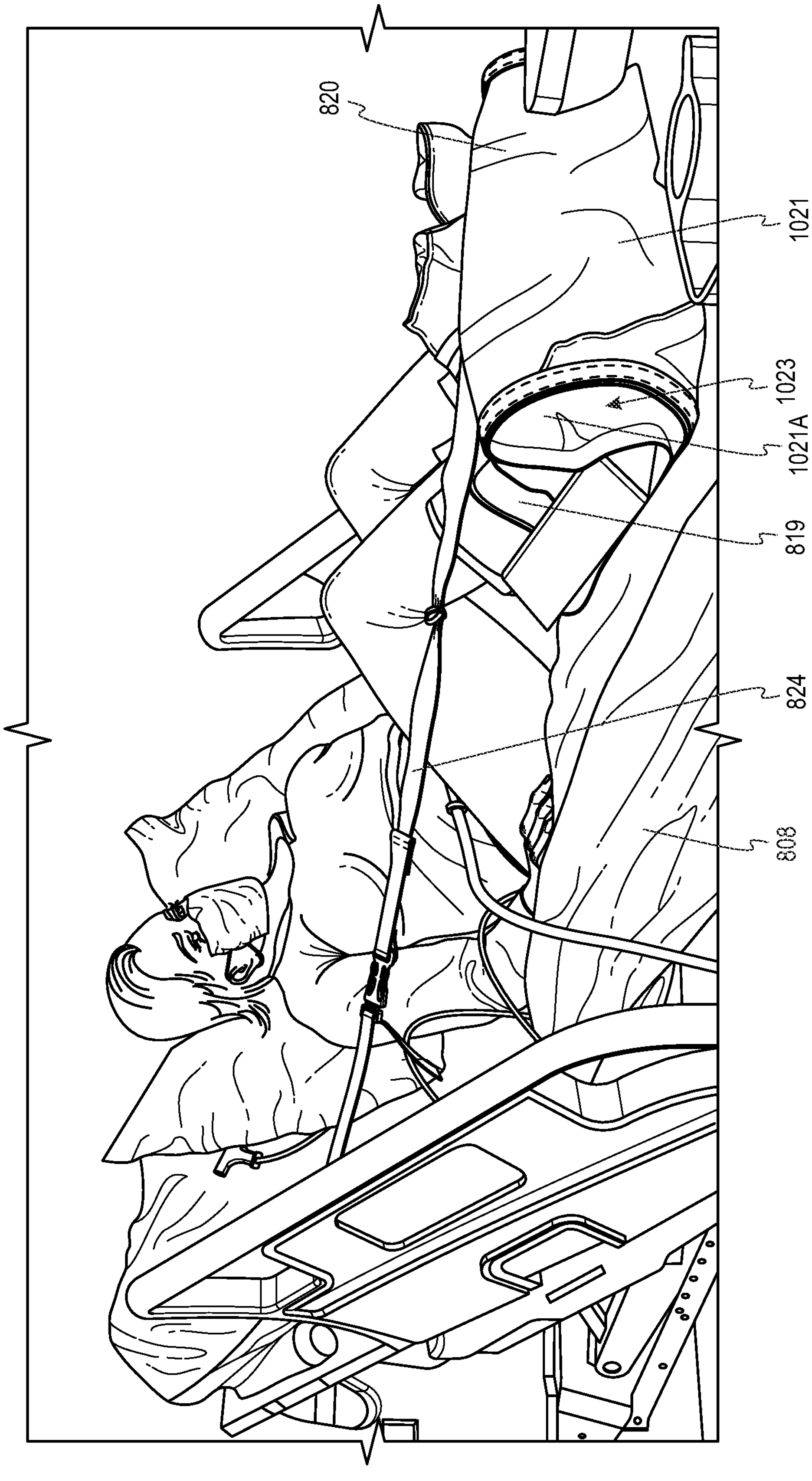
FIG. 10D illustrates a perspective view of a foot pad in use in a bed exercise system of 8A-8B, according to an example.
Figure 11:
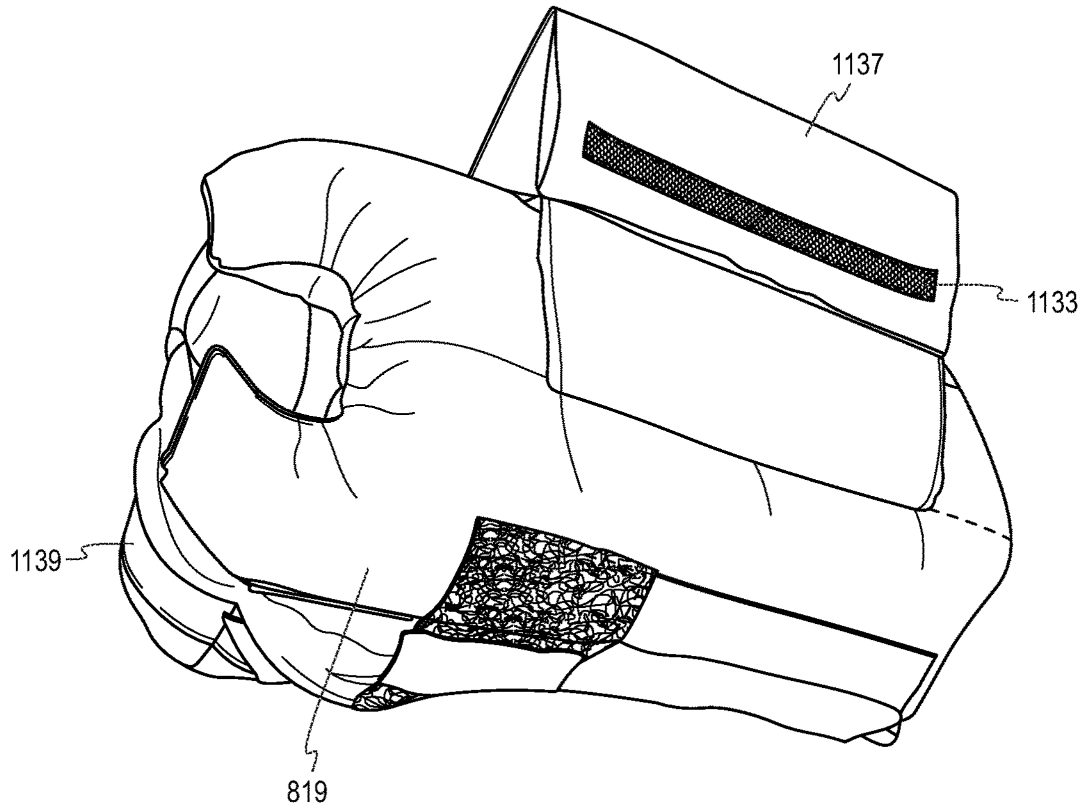
FIG. 11 illustrates a bottom perspective view of a pair of heel protectors of the bed exercise system of FIGS. 8A-8B, according to an example.
Figure 11:
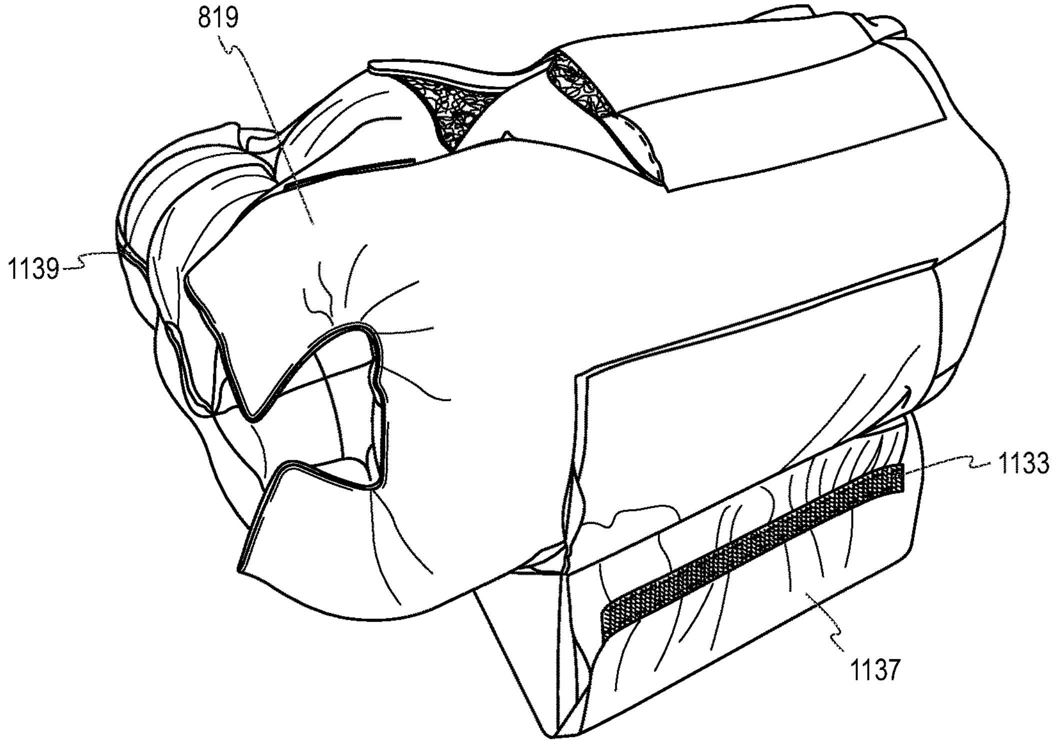

FIG. 10D shows the foot pad 820 in operation. As shown, the foot pad 820 is connected to the boots 819 proximate the balls of the operator's feet. The foot pad 820 is in a retracted position with the tube 1021 having loose or slack material located distal from the operator's feet.

The boots 819 are further shown in FIGS. 11-12B. As shown in FIGS. 11-12B, the boots 819 can be padded structures that cover the operator's feet and ankles. The boots 819 can include wedges 1137 increasing the size of the bottom surface thereof. As noted above, the boots 819 are substantially similar to heel protectors worn by individual to reduce the risk of pressure injuries forming on the heels during extended bed rest. However, the boots 819 can also include the footpad-connector sections 1133 on the bottom surface (such as, for example, on the wedges 1137) thereof configured to detachably couple the boots 819 to the foot pad 820.

To operate the bed exercise system 800, the operator begins with the foot pad 820 in a first, retracted position, as shown in FIGS. 10D and 12A. In the first, retracted position, the top side of the tube 1021 is slid towards to head end of the bed 802 such that there is slack material on the distal end of the tube 1021. As the operator extends their legs, the interior surface 1021A of the tube 1021 slides along itself, such that the top side of the tube 1021 rolls towards the foot end of the bed 802 while the bottom side is held in place by the high friction portions 1035. This movement causes the first and second elastic connectors 824, 826 to be resiliently extended as described above, increasing the tension in the first and second elastic connectors 824, 826 so as to provide a resisting force to the user.

When the legs are in the second, extended position, as shown in FIG. 12B, the tube 1021 includes the slack material on the proximal end of the tube 1021. This slack material enables the user to bend their legs, moving the foot pad 820 back to the first, retracted position. This process can be repeated to perform a plurality of reps, as described above.

As shown in FIG. 8B, the bed exercise system 800 is usable in an adjustable bed 802. In one example, the above described exercise is performed with the bed 802 positioned with the top half of the bed 802 angled upward by an angle of 15 degrees to 45 degrees relative to a bottom half of the bed 802. In another example, the angle is approximately 30 degrees.

Figure 13A:
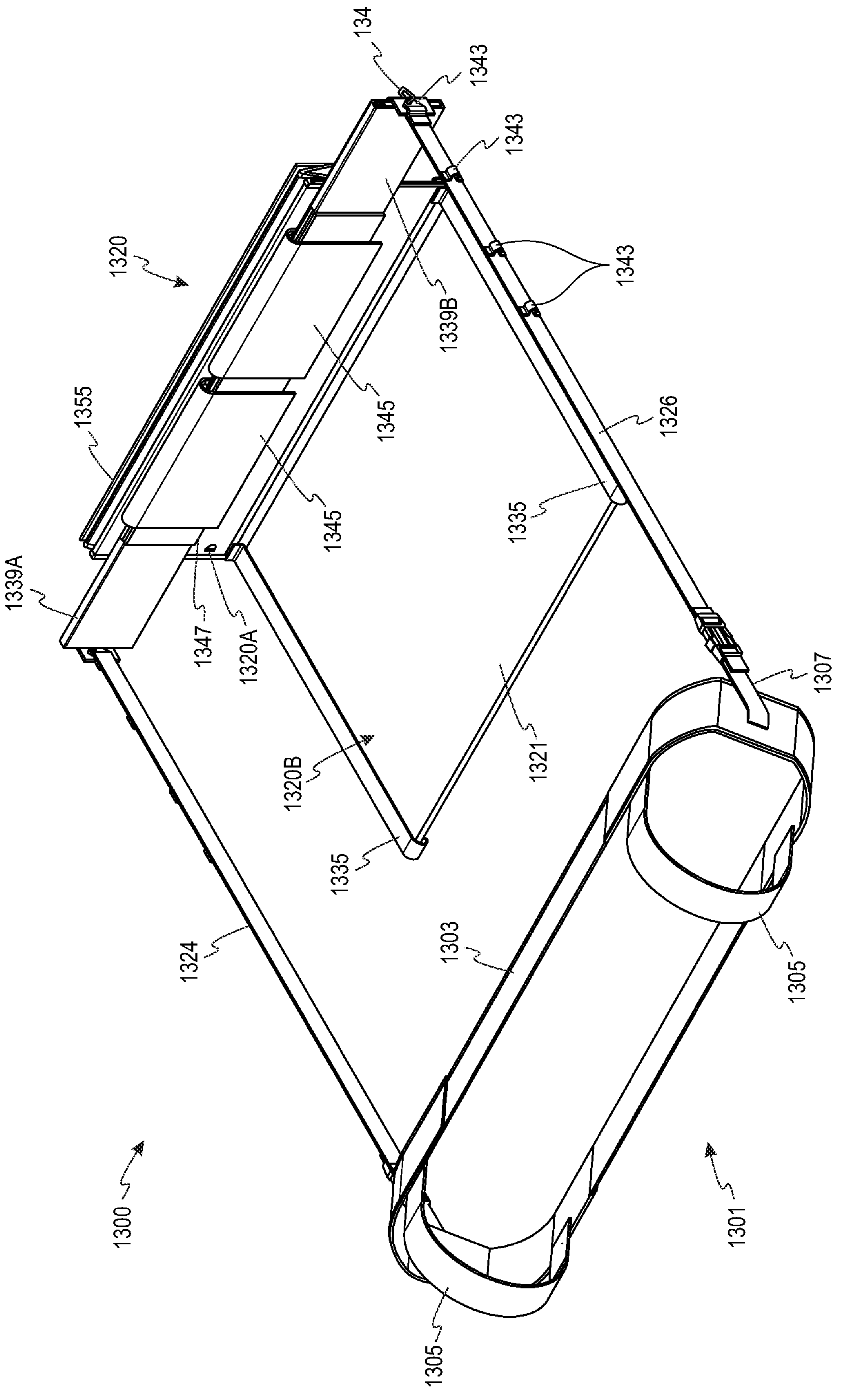
FIG. 13A illustrates a first perspective view of a bed exercise system, according to another example.

Referring now to FIGS. 13A-16, a bed exercise system 1300 is shown according to another example. FIG. 13A depicts a first perspective view of the bed exercise system 1300 and FIG. 13B depicts a second perspective view of the bed exercise system 1300.

Figure 13B:
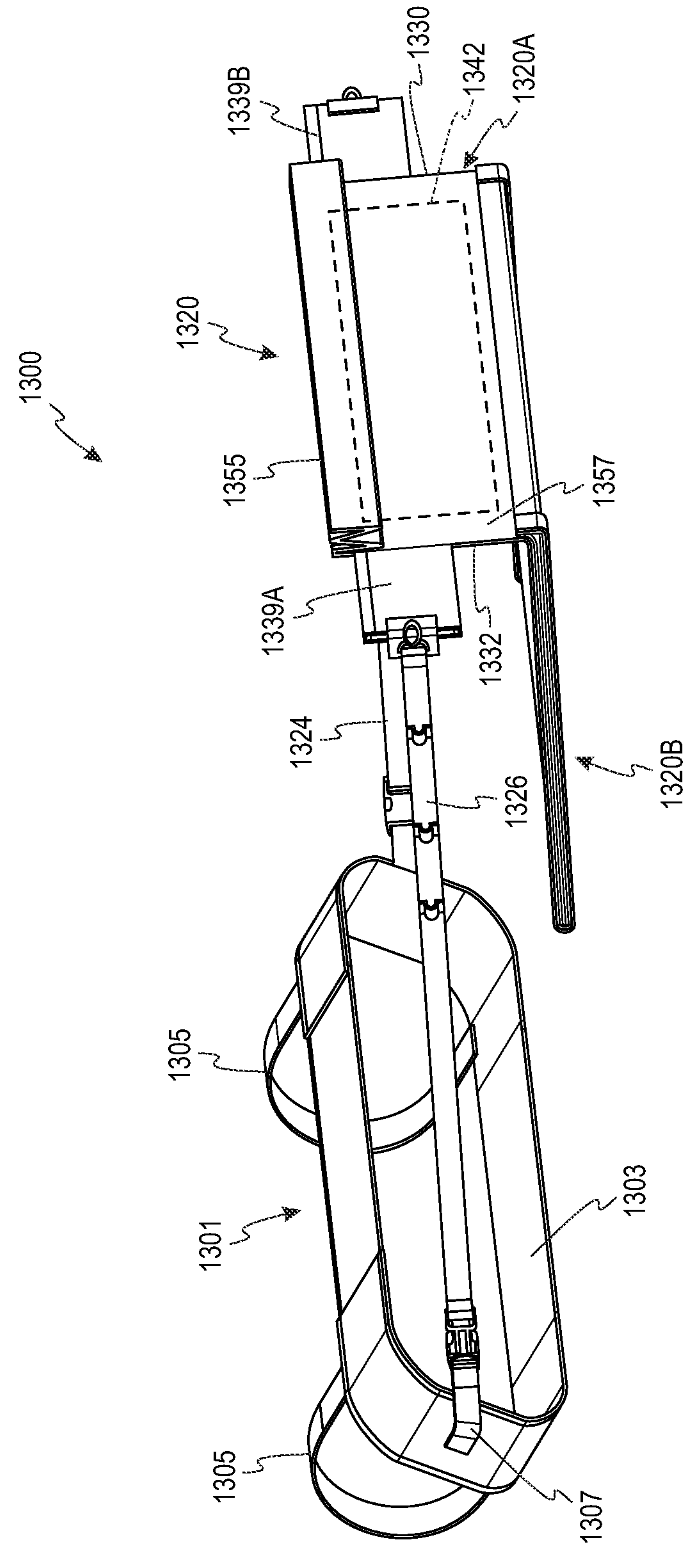
FIG. 13B illustrates a second perspective view of the bed exercise system shown in FIG. 13A, according to an example.

As shown in FIGS. 13A-13B, the bed exercise system 1300 includes a mattress anchor 1301, a foot pad 1320, a first elastic connector 1324, and a second elastic connector 1326. The bed exercise system 1300 is substantially similar or identical to the bed exercise systems 100, 800 in several respects, but includes certain modifications that can, among other things, provide for coupling the bed exercise system 1300 to the operator's feet without boots (e.g., the boots 819) and with the boots. This can help to provide a plurality of mechanisms for coupling the operator's feet to the bed exercise system 1300.

As shown in FIGS. 13A-13B, the mattress anchor 1301 is substantially similar or identical to the mattress anchor 701, 801 described above. As such, the mattress anchor 1301 is configured to couple to a mattress of a bed (e.g., the mattress 108 of the bed 102 described above). For instance, as described above, the mattress anchor 1301 can include a mattress band 1303 that is configured to extend around a width and a thickness of the mattress. Additionally, the mattress anchor 1301 can include a plurality of end straps 1305 that are configured to extend across a head end of the mattress from (i) a first side of the mattress band 1303 on a patient-facing surface of the mattress (e.g., the upper surface 708C of the mattress 108 in FIG. 7B) to (ii) a second side of the mattress band 1303 on a bed-facing surface of the mattress (e.g., the lower surface 708D of the mattress 108 in FIG. 7C). The mattress anchor 1301 can also include a plurality of connectors 1307 that are configured to couple to the first and second elastic connectors 1324, 1326 as describe above (e.g., via the buckle 178 shown in FIGS. 3 and 7A).

Figure 14A:
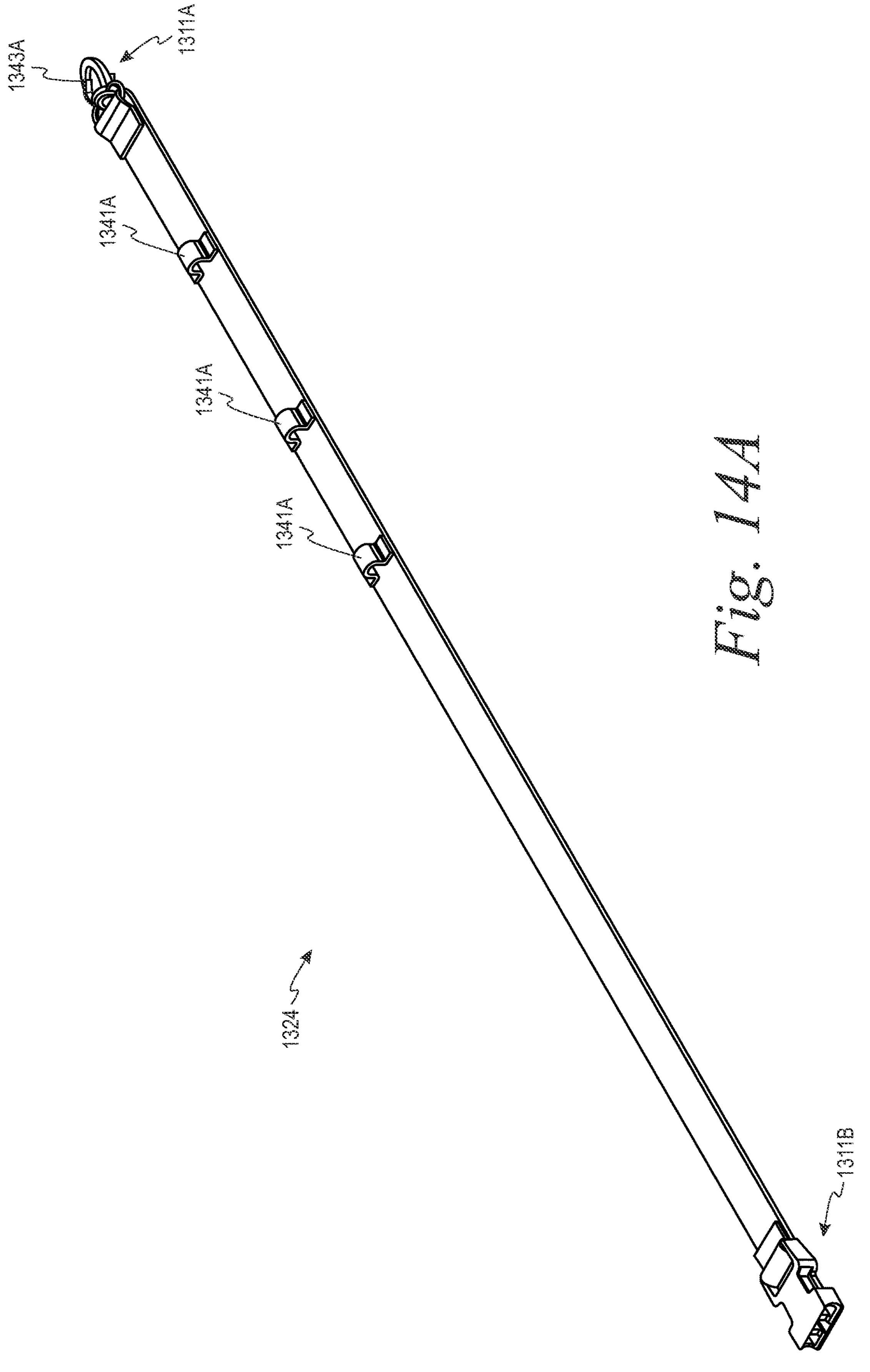
FIG. 14A illustrates a first elastic connector of the bed exercise system shown in FIGS. 13A-13B, according to an example.
Figure 14B:
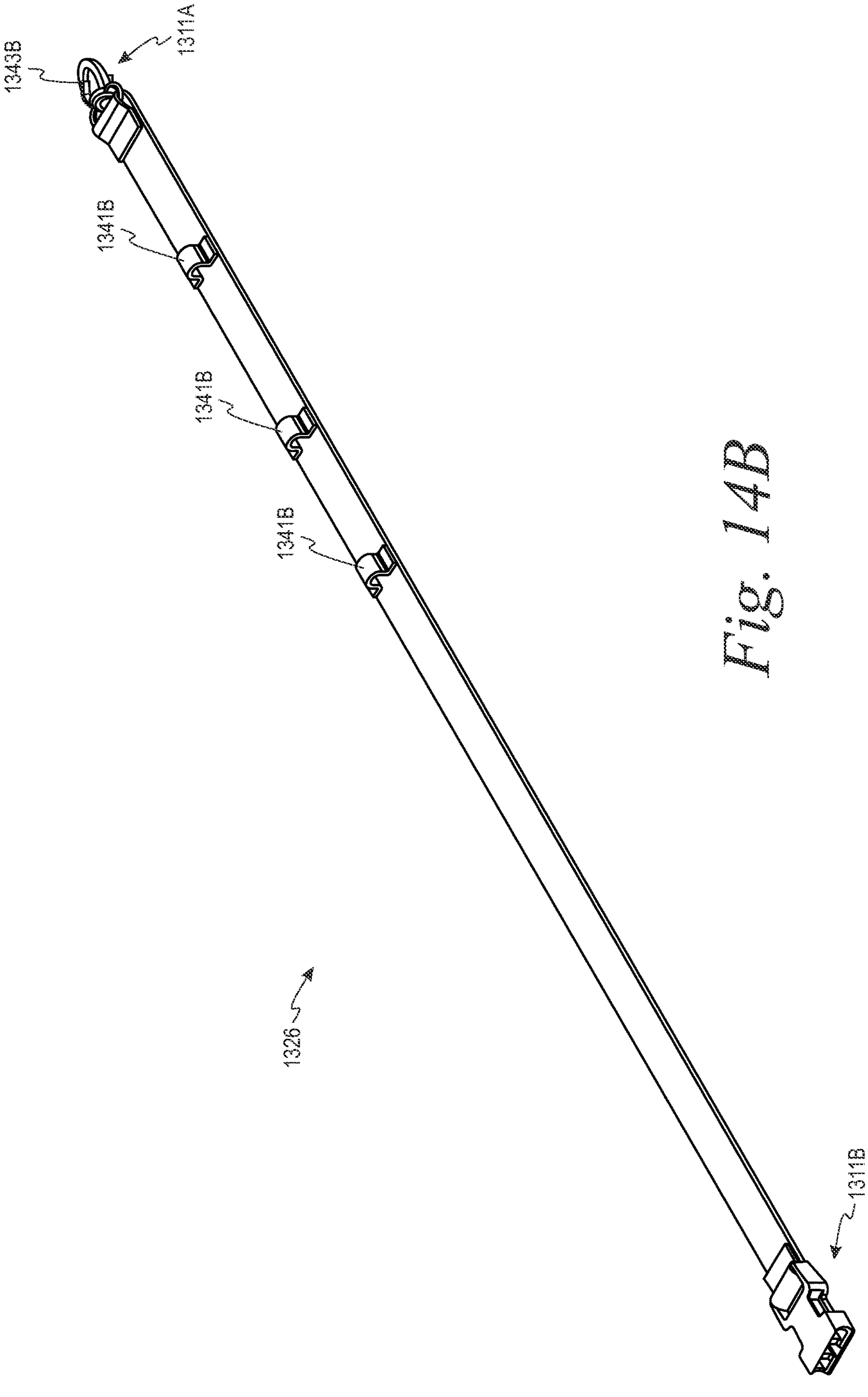
FIG. 14B illustrates a first elastic connector of the bed exercise system shown in FIGS. 13A-13B, according to an example.

In general, the first and second elastic connectors 1324 and 1326 are configured to couple to (i) the foot pad 1320 on opposing lateral sides of the foot pad 1320, and (ii) a patient structure such as, for example, the mattress (or, in other examples, a bed frame). For example, FIGS. 14A-14B show the first and second elastic connectors 1324A, 1324B according to an example. In FIG. 14A, the first elastic connector 1324 has a first end 1311A that can couple to a first lateral side of the foot pad 1320 and a second end 1311B that can couple to the patient support structure (e.g., via the mattress anchor 1301). Similarly, in FIG. 14B, the second elastic connector 1326 has a first end 1311A that can couple to a second lateral side of the foot pad 1320 and a second end 1311B that can couple to the patient support structure. As noted above, the patient support structure is the mattress in this example, but the patient support structure can be another structure such as, for instance, a bed frame in another example (e.g., using the first anchor 172 and the second anchor 174 described above).

In FIGS. 13A-13B, for example, the foot pad 1320 includes a first lateral extension 1339A that is releasably coupled to the first elastic connector 1324 and a second lateral extension 1339B that is releasably coupled to the second elastic connector 1326. In one example, the first and second elastic connectors 1324, 1326 can be configured to have a static, fixed length. In other examples, the first and second elastic connectors 1324, 1326 can be configured to have an adjustable length, as described above.

In FIGS. 13A-13B and FIGS. 14A-14B, for example, the first elastic connector 1324 includes a first adjustment mechanism configured to adjust a length of the first elastic connector 1324, and the second elastic connector 1326 includes a second adjustment mechanism configured to adjust a length of the second elastic connector 1326. For example, in FIG. 13, the first adjustment mechanism includes a plurality of first loops 1341A on the first elastic connector 1324 and a first clip 1343A that is configured to couple to a selected one of the plurality of first loops 1341A. Similarly, the second adjustment mechanism includes a plurality of second loops 1341B on the second elastic connector 1326 and a second clip 1343B that is configured to couple to a selected one of the plurality of second loops 1341B.

The first and second clips 1343A, 1343B can be coupled to a retention structure (e.g., a loop or a ring) on the first lateral extension 1339A and the second lateral extension 1339B, respectively. As such, the first clip 1343A is closer to the foot pad 1320 than the plurality of first loops 1341A when the first clip 1343A is decoupled from all of the plurality of first loops 1341A and the first clip 1343A is coupled to the foot pad 1320, and the second clip 1343B is closer to the foot pad 1320 than the plurality of second loops 1341B when the second clip 1343B is decoupled from all of the plurality of second loops 1341B and the second clip 1343B is coupled to the foot pad 1320. In this arrangement, the first and second clips 1343A, 1343B can be selectively coupled to a respective one of the first and second loops 1341A, 1341B to adjust the length of the first and second elastic connectors 1324, 1326.

As described above, the first elastic connector 1324 and the second elastic connector 1326 can be releasably coupled to the foot pad 1320 (e.g., via the first and second clips 1343A, 1343B). This can help to more efficiently disassemble, repair, and/or store the bed exercise system 800. However, in another example, the first elastic connector 1324 and the second elastic connector 1326 can be non-releasably coupled to the foot pad 1320 (e.g., via stitching and/or adhesive).

As described above, when the second end 1311B of the first elastic connector 1324 and the second end 1311B of the second elastic connector 1326 are coupled to the patient support structure (e.g., the mattress): (i) the foot pad 1320 is movable between a first position and a second position relative to the patient support structure, and (ii) a tension on the first elastic connector 1324 and a tension on the second elastic connector 1326 increases as the foot pad 1320 moves from the first position to the second position.

As shown in FIGS. 13A-13B, the foot pad 1320 can include a first portion 1320A and a second portion 1320B. As described in detail below, the first portion 1320A of the foot pad 1320 includes at least one foot retention structure that is configured to couple to the operator's feet. The second portion 1320B of the foot pad 1320 extends from a lower side of the first portion 1320A of the foot pad 1320, and is configured to move the first portion 1302A of the foot pad 1320 and the operator's feet over the mattress.

For example, the second portion 1320B of the foot pad 1320 can include a tube 1321 that is substantially similar or identical to the tube 1021 described above with respect to FIGS. 10A-10D. As such, the tube 1321 can include an interior surface and an exterior surface. As described above, the tube 1321 can be configured such that a first portion of the interior surface can contact a second portion of the tube 1321 when the foot pad 1320 is moved between the first, retracted position and the second, extended position. Additionally, as described above, the exterior surface of the tube 1321 can include one or more high friction portions 1335 as described above. In FIGS. 13A-13B, the high friction portions 1335 are on opposing lateral sides of the second portion 1320B of the foot pad 1320.

As noted above, the first portion 1320A of the foot pad 1320 can include at least one foot retention structure that is configured to couple to the operator's feet with boots and/or without boots. The foot pad 1320 can include a rigid support member 1342 (shown in FIG. 13B), which can be similar to the rigid support member 142 described above. For example, the rigid support member 1342 can be located in an internal cavity of the foot pad 1320. Additionally, for example, the rigid support member 1342 can be configured to have sufficient rigidity for supporting one or both of the feet of the operator 104 when coupling the feet to the foot pad 1320 without the boots. As examples, the rigid support member 142 can be made from a metal and/or a plastic material.

As shown in FIG. 13A, the at least one foot retention structure can include a plurality of pockets 1345 on a front side 1347 of the first portion 1320A of the foot pad 1320. Each pocket 1345 has a closed end facing an upper side of the foot pad 1320 and an open end facing a lower side of the foot pad 1320 such that the pocket 1345 is configured to receive at least a forefoot region of a respective foot without a boot attached to the foot. In some examples, each pocket 1345 can be further configured to receive a midfoot region of the respective foot as well. This can help to more securely couple the foot pad 1320 to the foot as opposed to an example in which the pocket 1245 only receives the forefoot region of the foot.

In one example, each pocket 1345 has a width in a dimension between a first lateral side 1330 of the foot pad 1320 and a second lateral side 1332 of the foot pad 1320, and the width of each pocket 1345 is approximately eight inches. This can help to accommodate a range of foot sizes that are may be expected for different operators. Additionally, this width can help to provide additional space to allow the operator to position their feet at an appropriate distance relative to each other. Although a width of approximately eight inches can be beneficial for at least the reasons explained above, the pockets 1345 can have widths of different dimensions in other examples (e.g., approximately 6 inches, approximately 7 inches, approximately 9 inches, and/or approximately 10 inches.

Figure 15A:
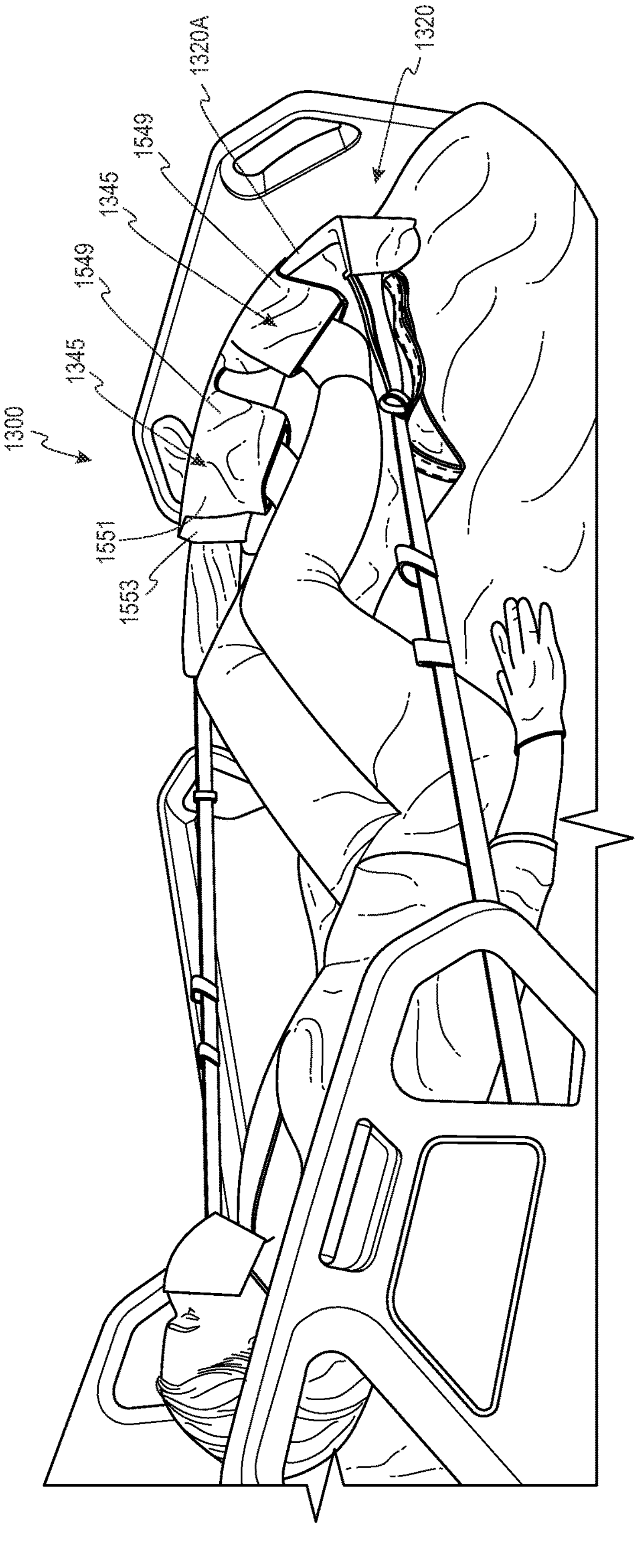
FIG. 15A illustrates a first perspective view of the bed exercise system of FIGS. 13A-13B coupled to feet of an operator without boots, according to another example.
Figure 15B:
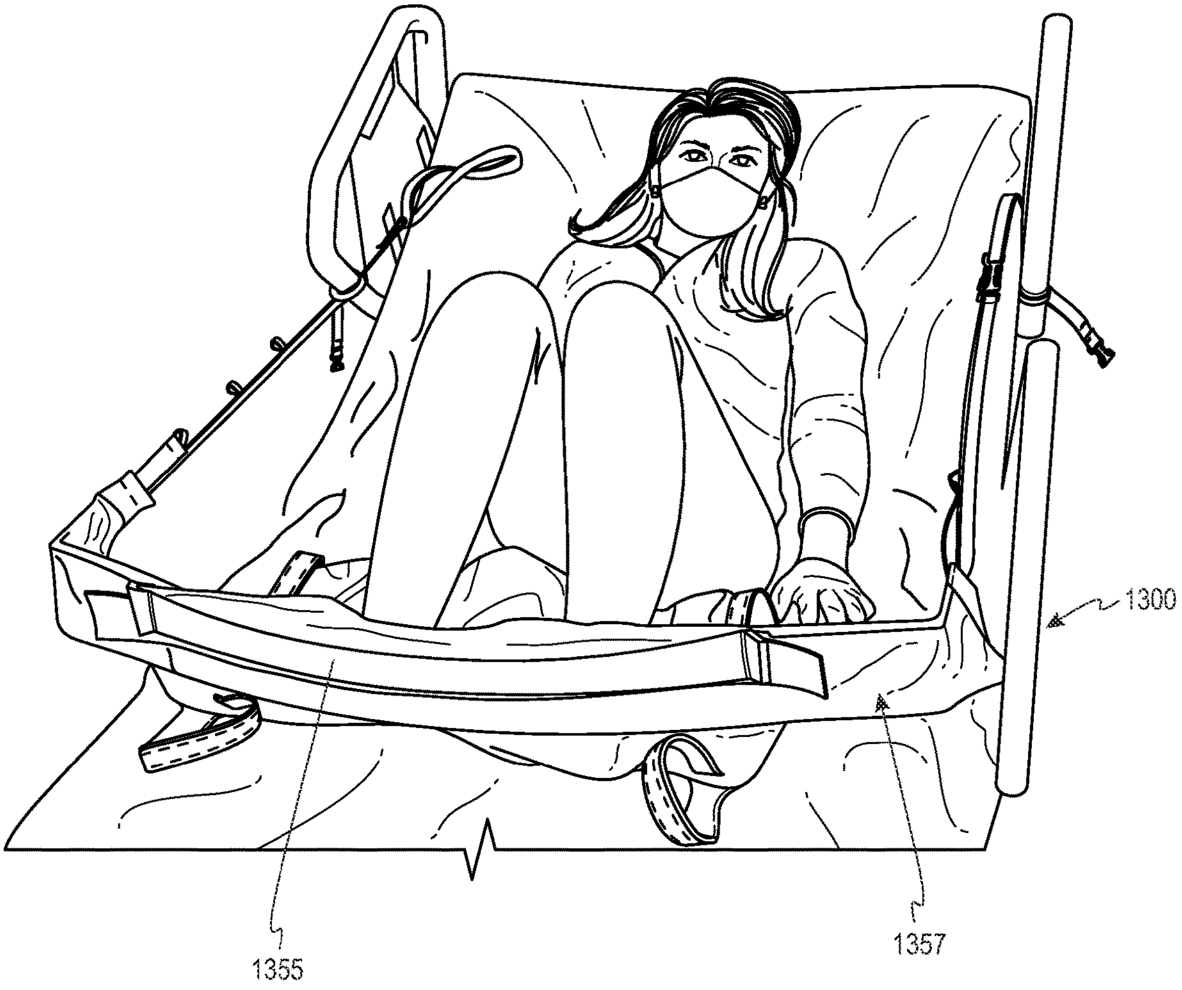
FIG. 15B illustrates a second perspective view of the bed exercise system of FIGS. 13A-13B coupled to feet of an operator without boots according to an example.

FIGS. 15A-15B illustrate the bed exercise system 1300 with an operator's feet coupled to the pockets 1345 on the first portion 1320A of the foot pad 1320. As shown in FIG. 15A, at least a portion of each pocket 1345 can be coupled to the foot pad 1320 by a hook and loop fastener coupling. For example, each pocket 1345 can include a flap 1549 of material having a hook and loop fastener 1551 on lateral sides of the flap 1549, and a corresponding hook and loop fastener 1553 can be located on the front side 1347 of the first portion 1320A of the foot pad 1320. This can allow for adjustable configuration of the pockets 1345 on the front side 1347. In other examples, the flap 1549 can be releasably coupled to the front side 1347 by an additional or alternative coupling mechanism (e.g., snaps and/or clips). In still other examples, the flap 1548 can be permanently coupled to the front side 1347 (e.g., by stitching) and a size of the pockets 1345 can be adjusted by an alternative mechanism (e.g., a drawstring and/or shoestring laces).

Figure 16:
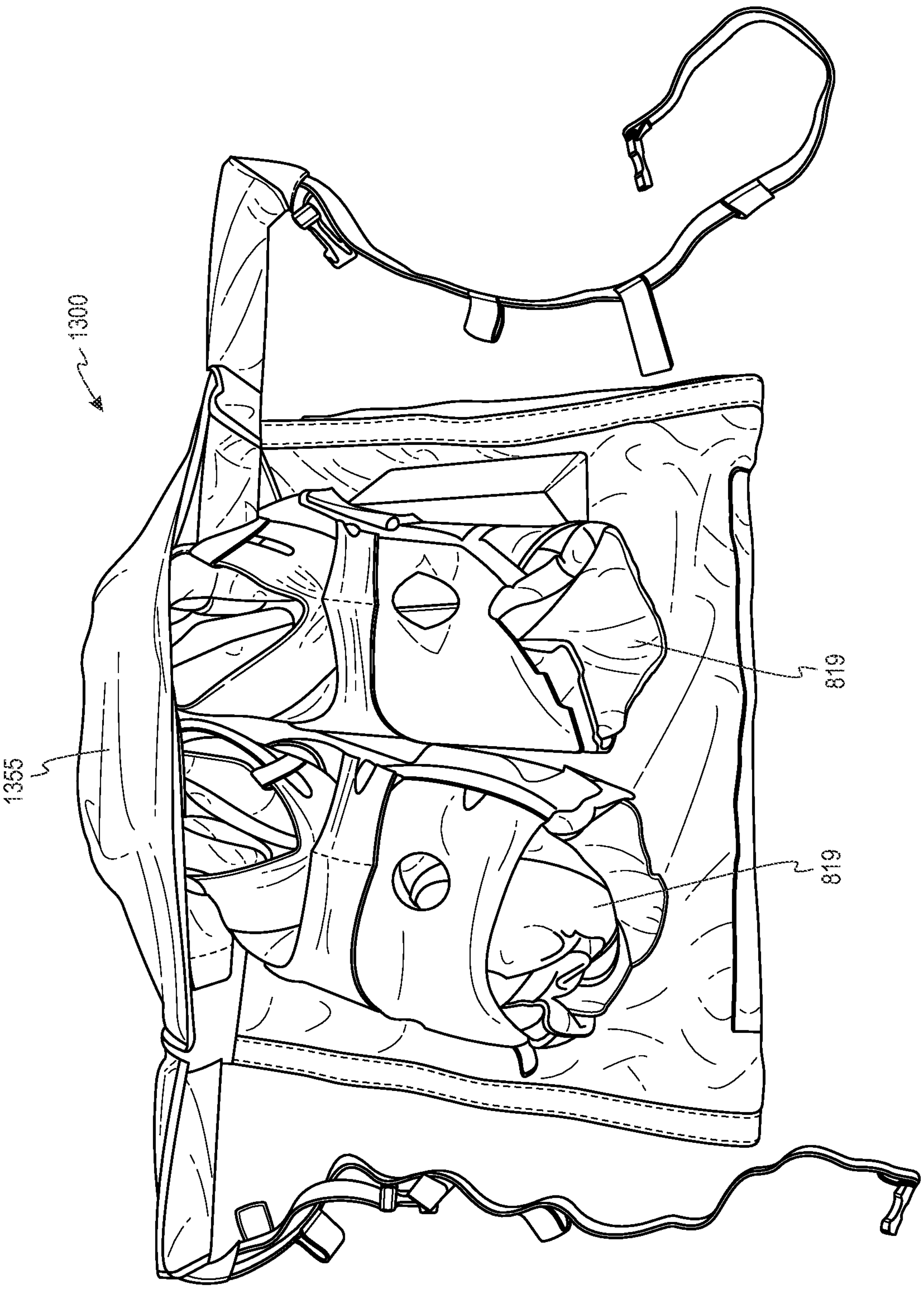
FIG. 16 illustrates a perspective view of the bed exercise system shown in FIG. 13A coupled to a pair of boots, according to an example.

As shown in FIG. 13B, the at least one foot retention structure can additionally or alternatively a hood structure 1355 that is movable between a storage position on a back side 1357 of the foot pad 1320 and a retention position on the front side 1347 of the foot pad 1320. FIGS. 13B and 15B show the hood structure 1355 in the storage position on the back side 1357 of the first portion 1320A of the foot pad 1320. FIG. 16 shows the hood structure 1355 in the retention position and coupled to the boots 819 on the front side 1347. As shown in FIG. 16, in the retention position, the hood structure 1355 is configured to retain at least a forefoot region of the pair of boots 819 worn by the operator while soles of the pair of boots 819 contact the front side 1347 of the foot pad 1320.

The hood structure 1355 can beneficially have a relatively larger size than the pockets 1345 to accommodate the relatively larger size of the boots 819 relative to the feet of the operator without the boots 819. As such, when the foot pad 1320 includes both the pockets 1345 and the hood structure 1355, the foot pad 1320 can provide for the patient using the bed exercise system 1300 with and without the boots 819. Although there are benefits to including both the pockets 1345 and the hood structure 1355, the bed exercise system 1300 (and/or the bed exercise systems 100, 800) can include only the pockets 1345 or only the hood structure 1355 in other examples.

As shown in FIGS. 13A-13B, the hood structure 1355 can include a plurality of accordion pleats 1359 configured to expand responsive to moving the hood structure 1355 from the storage position to the retention position. As such, the accordion pleats 1359 can help to more compactly store the hood structure 1355 in the storage position when not in use.

Figure 17:
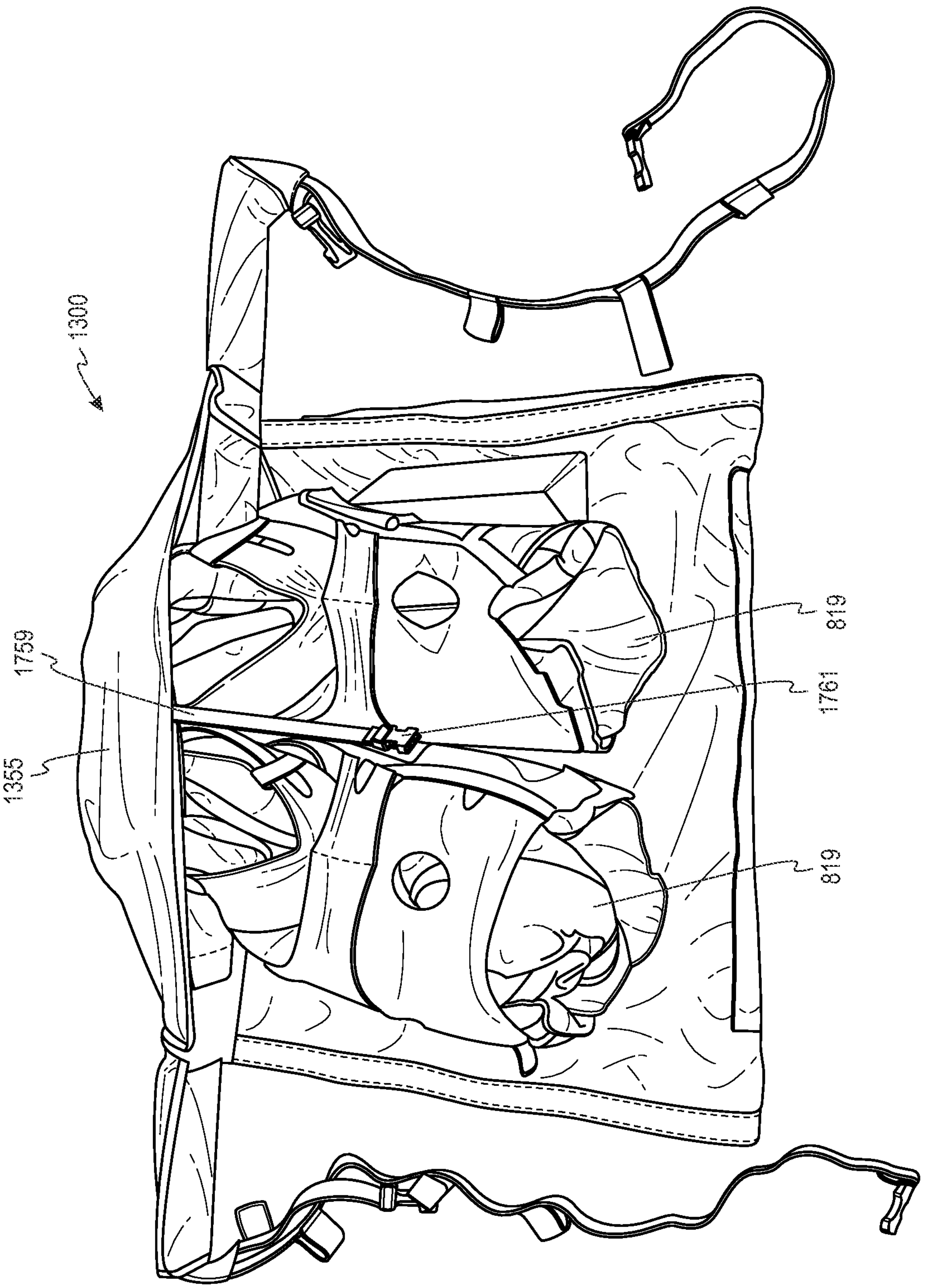
FIG. 17 illustrates a perspective view of the bed exercise system shown in FIG. 13A coupled to a pair of boots, according to another example.

In some examples, the bed exercise system 1300 can include a hood connector that is configured to releasably couple the hood structure 1355 to the foot pad 1320 in the retention position. For example, as shown in FIG. 17, the bed exercise system 1300 can include a strap 1759 having (i) a first end coupled to the hood structure 1355 and (ii) a second end that is configured to, when the hood structure 1355 is in the retention position, removably couple to the foot pad 1320 via a buckle 1761. The strap 1759 can thus help to retain the hood structure 1355 in the retention position during use of the bed exercise system 1300.

In the example shown in FIGS. 7A-8B, 10D, 13A, and 15A, the mattress anchor 701 is configured to couple to the head end 708A of the mattress 108. This can help to fix the second ends of the first and second elastic connectors to a proximal portion of the bed 102 (e.g., a portion of the bed 102 that is proximal of a midpoint of the mattress 108 along a length of the mattress 108 extending between the head end 708A and the foot end 708B). However, as shown in FIGS. 8B and 10D, coupling the mattress anchor 701 to the proximal portion of the bed 102 results in the first elastic connector 124, 224, 824, 1024, 1324 and the second elastic connector 126, 226, 826, 1026, 1326 extending alongside the arms and/or shoulders of the operator 104. In some implementations, this may lead to the first elastic connector 124, 224, 824, 1024, 1324 and the second elastic connector 126, 226, 826, 1026, 1326 contacting the operator and/or equipment coupled to the operator while the operator is operating the bed exercise system 100.

FIGS. 18A-24 illustrate implementations for the anchors 172, 701 that can help to mitigate contact between the operator and the bed exercise system 100, improve operation of the bed exercise system 100 (e.g., enhance tension on the elastic connectors over a range of motion of the foot pad), and/or improve a process for coupling and/or decoupling the bed exercise system 100 to the bed 102.

Within examples, the anchors described below and illustrated with respect to FIGS. 18A-24 can be used with any of the foot pads 120, 820, 1020, 1320 and any of the elastic connectors 124, 126, 224, 824, 826, 1024, 1026, 1324, 1326 described above (including combinations and variations of different features of the foot pads and elastic connectors described herein). In general, the bed exercise systems 100 described below include a foot pad, a first elastic connector, a second elastic connector, and an anchor. In these examples, the anchor is configured to fasten, at a fixed position relative to the bed 102, the second end of the first elastic connector and the second end of the second elastic connector while (i) the foot pad is moved between a first position and a second position relative to a bed, and (ii) a tension on the first elastic connector and a tension on the second elastic connector increases as the foot pad moves from the first position to the second position.

Figure 18A:
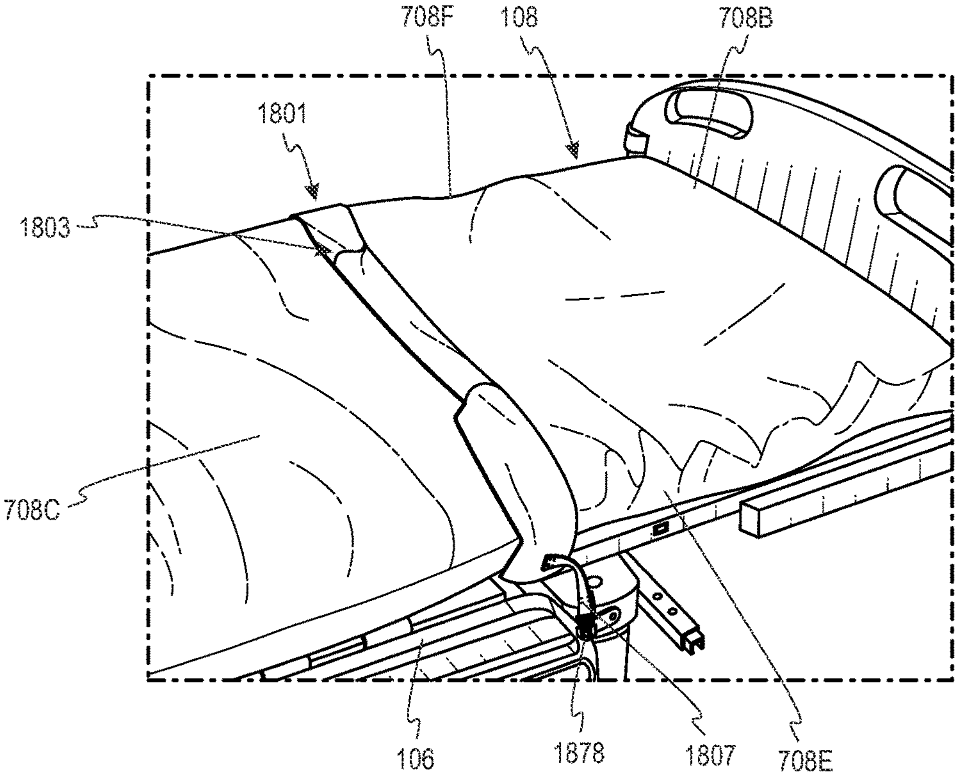
FIG. 18A illustrates a perspective view of an upper surface of a mattress of a bed with an anchor coupled to the mattress, according to an example.
Figure 18B:
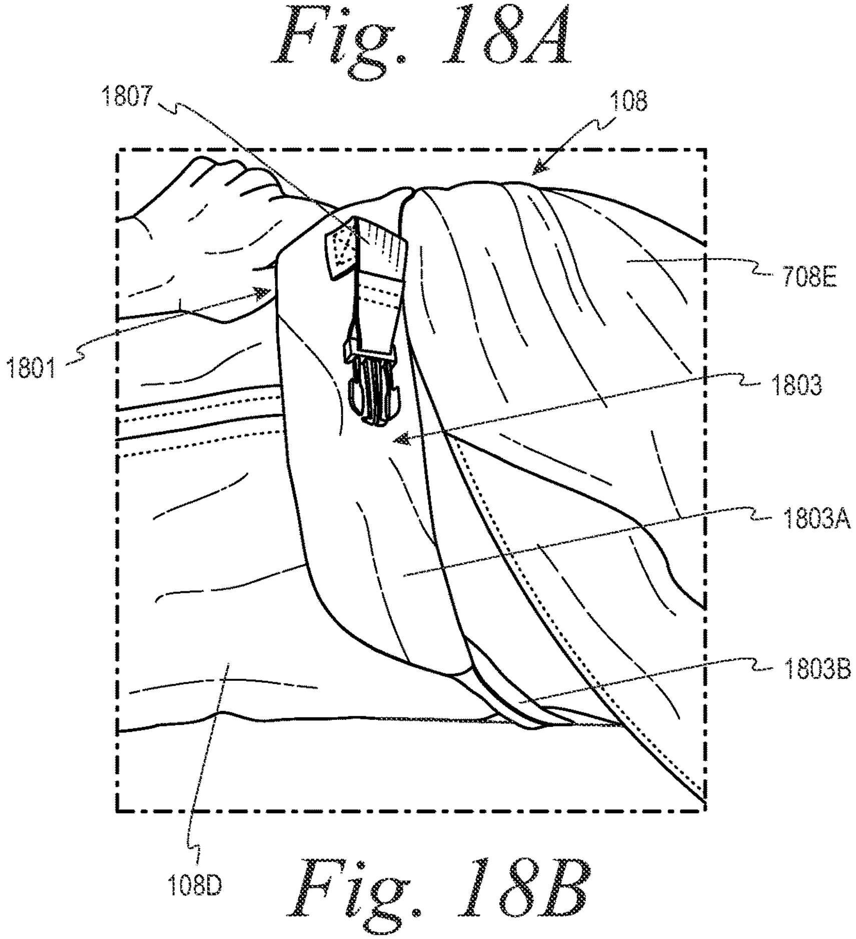
FIG. 18B illustrates a perspective view of a lower surface of the mattress of the bed with the anchor of FIG. 18A coupled to the mattress, according to an example.
Figure 18C:
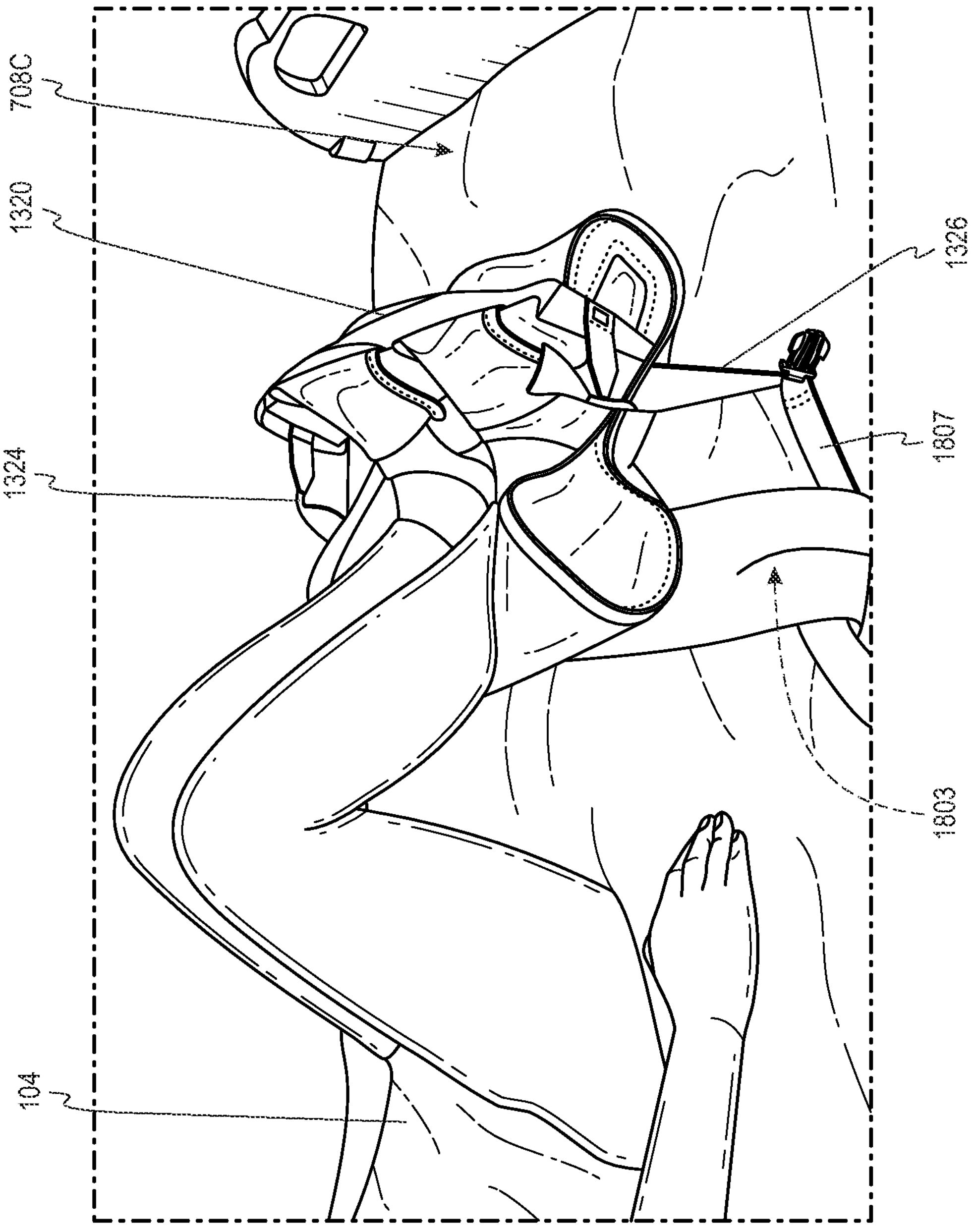
FIG. 18C illustrates the anchor of FIG. 18A coupled to the mattress and a foot pad by a first elastic connector and a second elastic connector, according to an example.

Referring now to FIGS. 18A-18C, an anchor 1801 is shown according to an example. In particular, FIG. 18A shows a perspective view of the upper surface 708C of the mattress 108 of the bed 102 with the anchor 1801 coupled to the mattress 108, FIG. 18B shows a perspective view of the lower surface 708D of the mattress 108 of the bed 102 with the anchor 1801 coupled to the mattress 108, and FIG. 18C shows the anchor 1801 coupled to the mattress 108 and the foot pad 1320 by the first elastic connector 1324 and the second elastic connector 1326 of FIGS. 13A-17. Although FIG. 18C depicts the anchor 1801 coupled with the foot pad 1320 by the first elastic connector 1324 and the second elastic connector 1326 of FIGS. 13A-17, the anchor 1801 can be coupled to any other foot pad and/or any other elastic connectors described above.

As shown in FIGS. 18A-18C, the mattress 108 includes the foot end 708B, the upper surface 708C, the lower surface 708D, the first lateral surface 708E, and the second lateral surface 708F. The mattress 108 also includes the head end 708A shown in FIGS. 7B-7C. As described above, the head end 708A is configured to be located nearer to an operator's head and the foot end 708B is configured to be located nearer the operator's feet (e.g., the feet 116) when the operator is supported on the upper surface 708C of the mattress 108 and the mattress 108 is supported on a bed frame 106. Also, as described above, the mattress 108 has the length extending between the head end 708A and the foot end 708B, the width extending between the first lateral surface 708E and the second lateral surface 708F, the thickness extending between the upper surface 708C and the lower surface 708D, and the circumference extending around the upper surface 708C, the lower surface 708D, the first lateral surface 708E, and the second lateral surface 708F.

In FIGS. 18A-18C, the anchor 1801 includes a mattress band 1803 and first and second connectors 1807. The first connector 1807 can couple to the second end of the first elastic connectors 1324 and the second connector 1807 can couple to the second end of the second elastic connector 1326 in a manner similar to that described above. For instance, the first and second connectors 1807 of the anchor 1801 can include a portion of the buckle 1878 for coupling with the first and second elastic connectors 1324, 1326. In other examples, the connectors 1807 can be additionally or alternatively coupled to the elastic connectors 1324, 1326 by, for instance, one or more hooks, carabiner clips, gate clips, slots, and/or buttons.

In FIGS. 18A-18C, the mattress band 1803 can be in the form of a loop that is configured to extend around the circumference (e.g., the width and the thickness) of the mattress 108. In some examples, the mattress band 1803 can include an elastic material such that the mattress band 1803 can have a circumferential size that can be adjusted to extend around mattresses having a plurality of different circumference sizes. As different mattresses may have different circumferential sizes, the elasticity of the mattress band 1803 can help to more universally couple the bed exercise system 100 with a wide variety of mattresses types. However, the mattress band 1803 can be entirely inelastic in other examples.

In FIGS. 18A-18C, the mattress band 1803 includes one or more inelastic sections 1803A and one or more elastic sections 1803B. The elastic section(s) 1803B are configured to have an adjustable size, whereas the inelastic section(s) 1803A are configured to have a fixed, static size. In the example shown in FIGS. 18A-18C, the first and second connectors 707 each extend between the inelastic section(s) 1803A. This can beneficially help to reduce stretching of the anchor 1801 in the distal direction while the operator is operating the foot pad 1320 (which, in turn, applies a distally directed force on the anchor 1801 via the first and second elastic connectors 1324, 1326).

In some examples, in addition to one or more elastic sections 1803B, the mattress band 1803 can include an adjustment mechanism that is configured to adjust a size of the mattress band 1803. For instance, the adjustment mechanism can be similar or identical to the adjustment mechanisms described above (e.g., including a buckle, a frame and a bar, loops and clips, and/or holes and buttons). The adjustment mechanism can allow the mattress band 1803 to have a circumferential size that can be adjusted to extend around mattresses having a plurality of different circumference sizes and, thus, more universally couple the bed exercise system 100 with a wide variety of mattresses types Within examples, the mattress band 1803 can also include a high-friction portion that can help to mitigate the mattress band 1803 from moving relative to the mattress 108 and/or the bed frame 106. In an example, the high-friction portion can have a coefficient of friction that is greater than approximately 1.0. For instance, the high-friction portion of the mattress band 1803 can be formed a urethane-coated nylon and/or polyester coated with an adhesive. In FIGS. 18A-18C, the high-friction portion is provided on an inner surface of the mattress band 1803 that faces the mattress 108 when the mattress band 1803 is coupled to the mattress 108. As one example, in FIGS. 18A-18C, the high-friction portion is provided at the inelastic section 1803A. However, in other examples, the high-friction portion can be additionally or alternatively provided at other locations (e.g., the elastic section 1803B).

As shown in FIG. 18C, unlike the mattress anchor 701 described above, the anchor 1801 can be coupled at a fixed position that is distal of a midpoint of the bed 102 along the length of the bed 102. For instance, the anchor 1801 can be positioned at or distal to the hips of the operator 104. This can allow for the second ends of the first and second elastic connectors 1324, 1326 to be positioned lower on the bed 102 (e.g., closer to the mattress 108), which can help to reduce contact between the operator 104 and the bed exercise system 100 (e.g., contact with the first and second elastic connectors 1324, 1326). Additionally, because the anchor 1801 does not include the end straps 705 of the mattress anchor 701, the anchor 1801 can provide for positioning the second ends of the first and second elastic connectors 1324, 1326 at a fixed position that is selectable based on a size of the operator 104 and/or a desired range of motion for the legs of the operator 104. As different operators have different sizes, this can allow for easily tailoring a setup of the bed exercise system 100 to the operator 104.

In use, the anchor 1801 can be coupled to the mattress 108 by first positioning the mattress band 1803 that the mattress band 1803 extends around the circumference of the mattress 108. In some examples, coupling the mattress band 1803 to the mattress 108 can include stretching, via the elastic section(s) 1803B, the mattress band 1803 to increase the circumference of the mattress band 1803 to be approximately the same size as the circumference of the mattress 108. As a result, the mattress band 1803 can apply a compressive force to the mattress 108, which can assist in resisting movement of the mattress band 1803 relative to the mattress 108 when the mattress band 1803 is coupled to the mattress 108.

In additional or alternative examples, coupling the mattress band 1803 to the mattress 108 can include using the adjustment mechanism to adjust a circumference of the mattress band 1803. For instance, the mattress band 1803 can be first positioned around the mattress 108 with a first circumference and then the adjustment mechanism can be used to adjust the circumference of the mattress band 1803 to a second circumference, which is smaller than the first circumference.

In one implementation of the process, the connectors 1807 can be coupled to the first elastic connector 1324 and the second elastic connector 1326 after coupling the anchor 1801 to the mattress 108. In another implementation of the process, the connectors 1807 can be coupled to the first elastic connector 1324 and the second elastic connector 1326 prior to coupling the anchor 1801 to the mattress 108.

In some implementations, the process can also include rolling a top sheet around the mattress band 1803 such that the operator 104 does not directly contact the mattress band 1803, as shown for example in FIG. 18C. This can help to reduce contact between the operator 104 and the bed exercise system 100, and/or help to mitigate the mattress band 1803 moving relative to the mattress 108 and/or the bed frame 106.

Figure 19A:
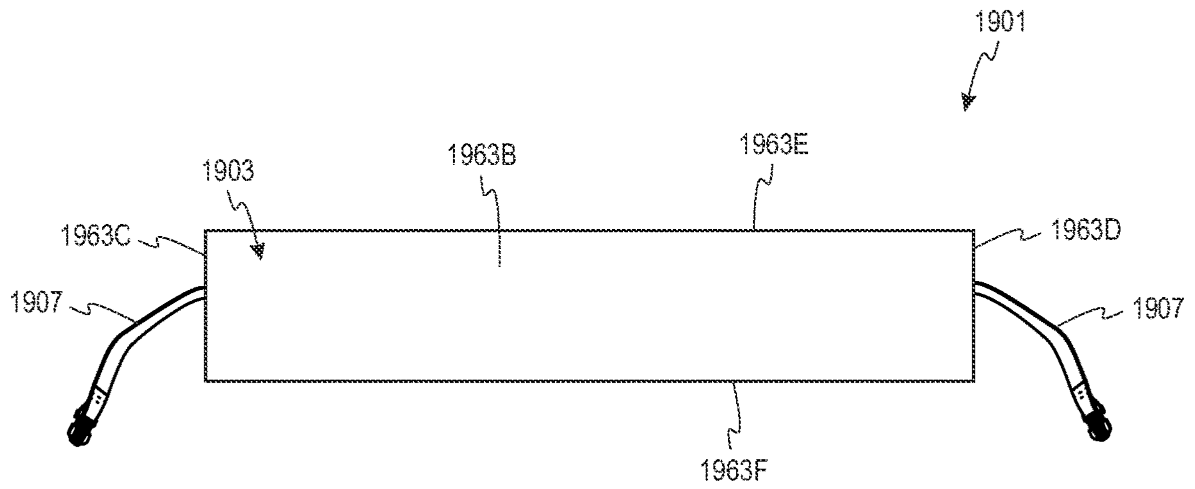
FIG. 19A illustrates a top view of an anchor, according to another example.
Figure 19B:
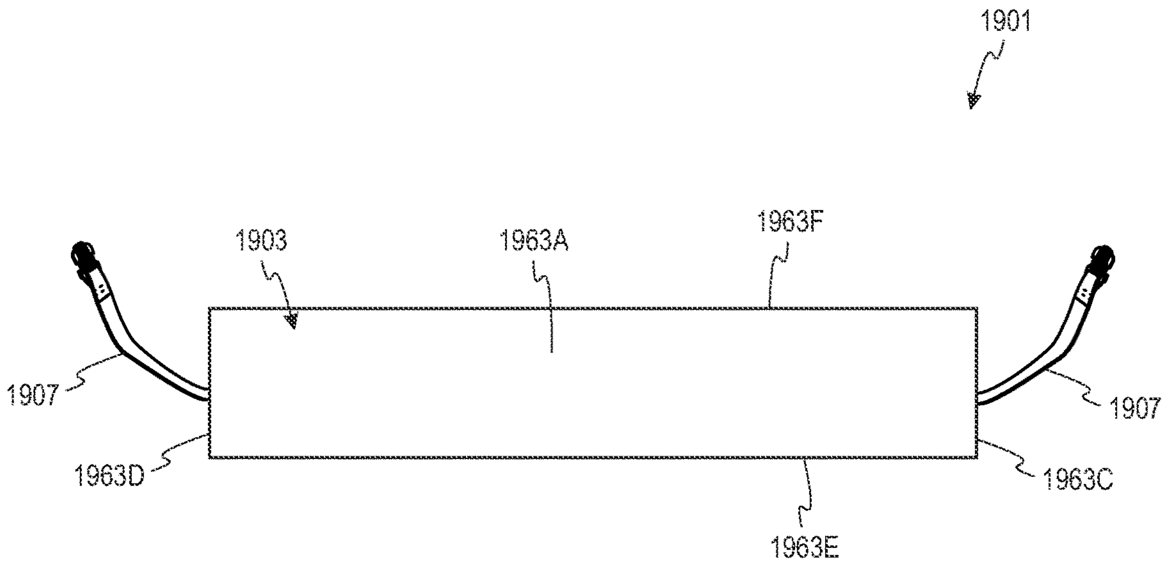
FIG. 19B illustrates a bottom view of the anchor of FIG. 19A, according to an example.
Figure 19E:
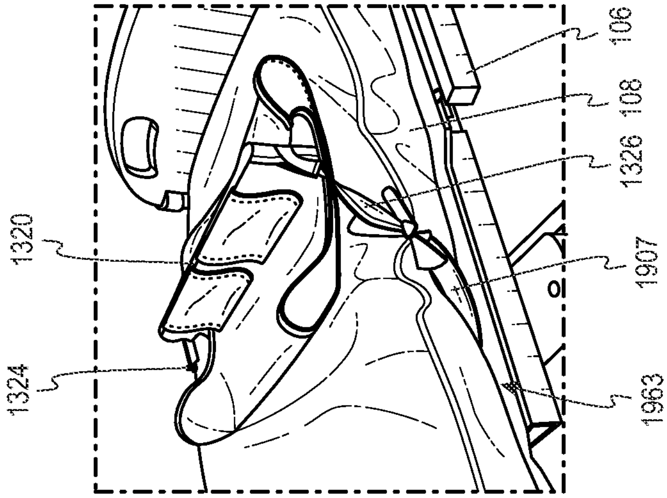
FIG. 19E illustrates the anchor of FIG. 19A coupled to a foot pad and first and second elastic connectors, according to an example.
Figure 19D:
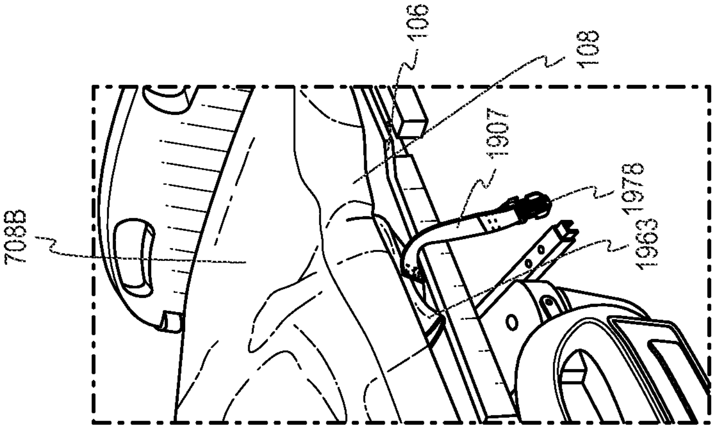
FIG. 19D illustrates the anchor of FIG. 19A positioned between the mattress and the bed frame, according to an example.
Figure 19C:
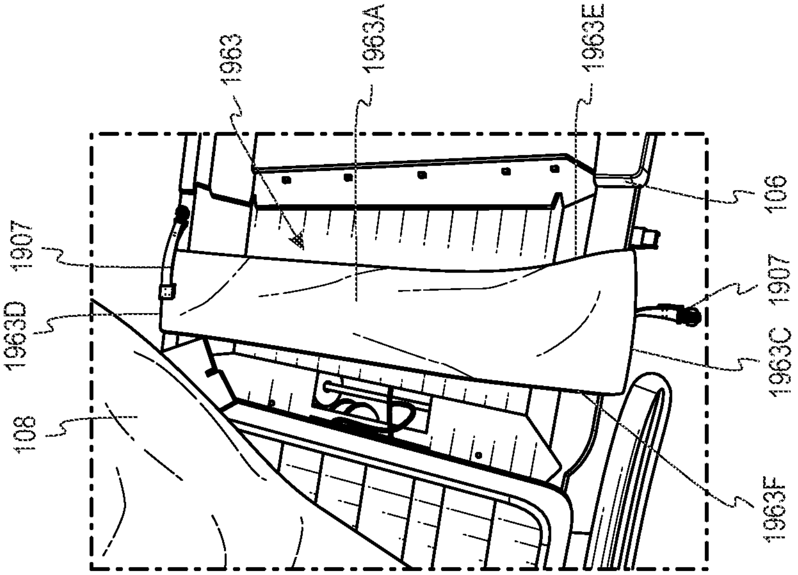
FIG. 19C illustrates the anchor of FIG. 19A on a bed with a mattress raised off a bed frame, according to an example.

Referring now to FIGS. 19A-19E, an anchor 1901 is shown according to another example. In particular, FIG. 19A depicts a top view of the anchor 1901, FIG. 19B depicts a bottom view of the anchor 1901, FIG. 19C depicts the anchor 1901 on the bed 102 with the mattress 108 raised off the bed frame 106, FIG. 19D depicts the anchor 1901 positioned between the mattress 108 and the bed frame 106, and FIG. 19E depicts the anchor 1901 coupled to the foot pad 1320 and the first and second elastic connectors 1324, 1326.

In FIGS. 19A-19E, the anchor 1901 includes an elongated strip 1963 and first and second connectors 1907. The first connector 1907 can couple to the second end of the first elastic connectors 1324 and the second connector 1907 can couple to the second end of the second elastic connector 1326 in a manner similar to that described above. For instance, the first and second connectors 1907 of the anchor 1901 can include a portion of the buckle 1978 for coupling with the first and second elastic connectors 1324, 1326. In other examples, the first and second connectors 1907 can be additionally or alternatively coupled to the elastic connectors 1324, 1326 by, for instance, one or more hooks, carabiner clips, gate clips, slots, and/or buttons.

In FIGS. 19A-19E, the anchor 1901 includes an elongated strip 1963 that is configured to couple to the bed frame 106 of the bed 102 at a location between the bed frame 106 and the mattress 108 of the bed 102. As shown in FIGS. 19A-19B, the elongated strip 1963 includes a lower surface 1963A that is configured to couple to the bed frame 106, an upper surface 1963B that is configured to engage the mattress 108, a first end 1963C that is configured to be positioned adjacent to the first lateral surface 708E of the mattress 108 (shown in FIGS. 7B-7C), and a second end 1963D that is configured to be positioned adjacent to the second lateral surface 708F of the mattress 108 (shown in FIGS. 7B-7C).

Additionally, as shown in FIGS. 19A-19C, the elongated strip 1963 also includes a distal side 1963E that is configured to face the foot end 708B (shown in FIGS. 7B-7C and 19D) of the mattress 108 and a proximal side 1963F that is configured to face the head end 708A (shown in FIGS. 7B-7C) of the mattress 108 when the anchor 1901 is coupled to the bed 102.

In this arrangement, the elongated strip 1963 has a length extending between the first end 1963C and the second end 1963D. In some examples, the length of the elongated strip 1963 can be greater than the width of the mattress 108 such that the first end 1963C of the elongated strip 1963 and the second end 1963D of the elongated strip 1963 protrude outwardly from the first lateral surface 708E of the mattress 108 and the second lateral surface 708F of the mattress 108. This can help to provide easy access to the first and second connectors 1907 to facilitate coupling the first and second elastic connectors 1324, 1326 to the anchor 1901 (e.g., without having to lift the mattress 108 off the bed frame 106 to access the first and second connectors 1907).

In other examples, the length of the elongated strip 1963 can be approximately equal to the width of the mattress 108 such that the first end 1963C of the elongated strip 1963 and the second end 1963D of the elongated strip 1963 are at or recessed away from the first lateral surface 708E of the mattress 108 and the second lateral surface 708F of the mattress 108. This can help to reduce an extend by which the first and second connectors 1907 extend or hang from the bed frame 106 when the bed exercise system 100 is not in use (e.g., when the first and second elastic connectors 1324, 1326 are decoupled from the anchor 1901).

As described above, the lower surface 1963A can be configured to couple to the bed frame 106. In an example, the lower surface 1963A of the elongated strip 1963 can include an adhesive that is configured to couple to the bed frame 106. In another example, the lower surface 1963A of the elongated strip 1963 can additionally or alternatively include a magnet that is configured to couple to the bed frame 106.

Within examples, the upper surface 1963B of the elongated strip 1963 can include a high-friction portion that can help to inhibit the elongated strip 1963 from moving relative to the mattress 108 and/or the bed frame 106. More particularly, the high-friction portion can extend over a part or an entirety of the upper surface 1963B and frictionally engage the mattress 108 when the anchor 1901 is positioned between the mattress 108 and the bed frame 106. In an example, the high-friction portion can have a coefficient of friction that is greater than approximately 1.0. For instance, the high-friction portion of the elongated strip 1963 can be formed a urethane-coated nylon and/or polyester coated with an adhesive.

As shown in FIGS. 19D-19E, when the elongated strip 1963 is coupled to the bed 102, the elongated strip 1963 is not positioned on the upper surface 708 of the mattress 108. As a result, the anchor 1901 can further reduce contact between the operator 104 and the bed exercise system 100 as compared to, for example, the mattress anchor 701 and/or the anchor 1801 described above.

In FIGS. 19A-19E, the elongated strip 1963 is formed from a material that is configured to conform to a shape of the bed frame 106 when the elongated strip 1963 is positioned on the bed frame 106. This can help to reduce or mitigate lumps that may increase pressure on the operator 104 through the mattress 108. In these implementations, the elongated strip 1963 can be formed from a pliable material such as, for instance, a fabric material that can conform to the shape of the bed frame 106. As examples, the elongated strip 1963 can be formed from at least one material selected from a group of materials consisting of: a urethane coated fabric and/or a silicone coated fabric. Additionally or alternatively, forming the elongated strip 1963 from a pliable material can help to store the anchor 1901 in a relatively more compact and space-efficient manner.

Figure 20:
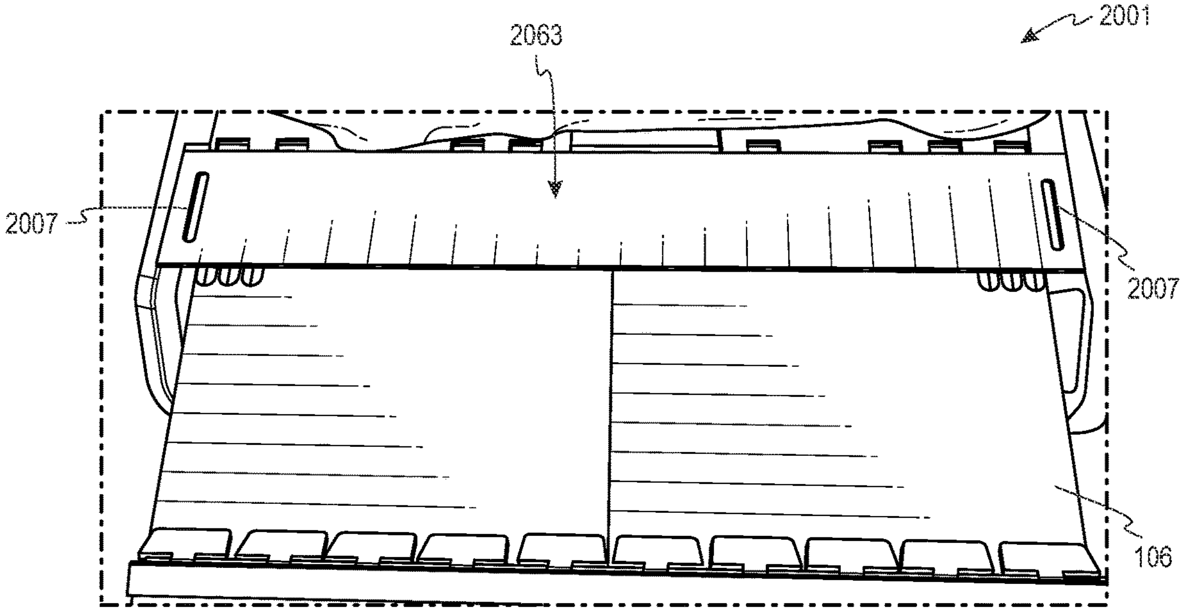
FIG. 20 illustrates an anchor according to another example.

Although the elongated strip 1963 is formed from a fabric material in FIGS. 19A-19E, the elongated strip 1963 can be formed from a rigid material in other implementations. As an example, FIG. 20 illustrates an anchor 2001 that includes an elongated strip 2063. In particular, FIG. 20 illustrates the anchor 2001 coupled to the bed frame 106 with the mattress 108 removed for illustration purposes.

The elongated strip 2063 includes an upper surface, a lower surface, a first end, a second end, a distal side, and a proximal side as described above with respect to the elongated strip 1963. Also, as described above, the lower surface can be configured to couple to the bed frame 106 (e.g., via an adhesive and/or a magnet). The upper surface of the elongated strip 2063 can include the high-friction portion that can help to inhibit the elongated strip 2063 from moving relative to the mattress 108 and/or the bed frame 106.

The anchor 2001 also includes first and second connectors 2007 at the first and second ends of the elongated strip 2063, respectively. In FIGS. 19A-19E, the first connector 2007 and the second connector 2007 each include a respective strap. However, the first and second connectors 1907 can have a different configuration. For example, as shown in FIG. 20, the first connector 2007 and the second connector 2007 each include a respective aperture in the elongated strip 2063. In this arrangement, the first and second elastic connectors 1324, 1326 can be configured to couple to the anchor 2001 via the apertures of the first and second connectors 2007. However, in other examples, the first and second connectors 2007 of the anchor 2001 in FIG. 20 can be in the form of the straps shown in FIGS. 19A-19E.

As described above, in FIG. 20, the elongated strip 2063 is formed from a rigid material. This can help to provide greater structural support to the elongated strip 2063 and improved resistance to migration of the anchor 2001 as compared to the anchor 1901 formed from pliable material. As a result, the elongated strip 2063 can be coupled to the bed frame 106 with less adhesive, a weaker adhesive, a smaller magnet, and/or a weaker magnet than the elongated strip 1963 to achieve a similar resistance to migration of the anchor 2001.

In some implementations, the elongated strip 2063 can have a flat, planar shape. This can be beneficial for coupling the elongated strip 2063 to bed frames having a flat planar surface facing the mattress 108. In other examples, the elongated strip 2064 can have a non-planar shape corresponding to a non-planar shape of the bed frame 106. For instance, the non-planar shape can include the upper surface of the elongated strip 2063 having a concave portion and the lower surface of the elongated strip 2063 having a convex portion so that the elongated strip 2063 can be received in a similarly shaped concave support surface of the bed frame 106. Providing the elongated strip 2064 with a non-planar shape corresponding to a non-planar shape of the bed frame can help to reduce or mitigate lumps that may increase pressure on the operator 104 through the mattress 108.

In use, the anchor 1901, 2001 can be coupled to the mattress 108 by removing the mattress 108 from at least a portion of the bed frame 106, and coupling the lower surface 1963A to the bed frame 106 (e.g., via the adhesive and/or the magnet). After coupling the anchor 1901, 2001 to the bed frame 106, the mattress 108 can be positioned on top of the anchor 1901, 2001 with the lower surface 708D of the mattress 108 (shown in FIG. 7C) frictionally engaged with the upper surface 1963B of the elongated strip 1963, 2063. In one implementation of the method, the connectors 1907, 2007 can be coupled to the first elastic connector 1324 and the second elastic connector 1326 after coupling the anchor 1901, 2001 to the bed 102. In another implementation of the method, the connectors 1907, 2007 can be coupled to the first elastic connector 1324 and the second elastic connector 1326 prior to coupling the anchor 1901, 2001 to the bed 102.

In FIGS. 18A-20, the anchors 1801, 1901, 2001 include first and second connectors 1807, 1907, 2007 that are interconnected to each other by the anchor 1801, 1901, 2001 (e.g., by the mattress band 1803, the elongated strip 1963, and/or the elongated strip 2063). This can help to increase a surface area to the anchor 1801, 1901, 2001 and thereby help to resist movement of the anchor 1801, 1901, 2001 relative to the mattress 108 and/or the bed frame 106 while the bed exercise system 100 is in use. Additionally or alternatively, the interconnection between the connector 1807, 1907, 2007 can help to position the first and second connectors 1807, 1907, 2007 at approximately the same position along the length of the mattress 108 so as to provide for approximately equal tension on the first elastic connector and the second elastic connector.

In other examples, however, the anchor can include a plurality of discrete components that are not directly interconnected to each other by the anchor. This can help reduce a size of the anchor, which may enhance storage efficiencies. Additionally or alternatively, providing the anchor as a plurality of discrete components can provide for relatively easier coupling of the anchor to the bed frame 106 as a side of the mattress 108 may be lifted a relatively small amount to access a coupling point on the bed frame 106 (e.g., as opposed alternative implementations in which it may be beneficial to lift the mattress 108 sufficiently to access an entire width of the bed frame 106 at the coupling point on the bed frame 106).

Figure 21A:
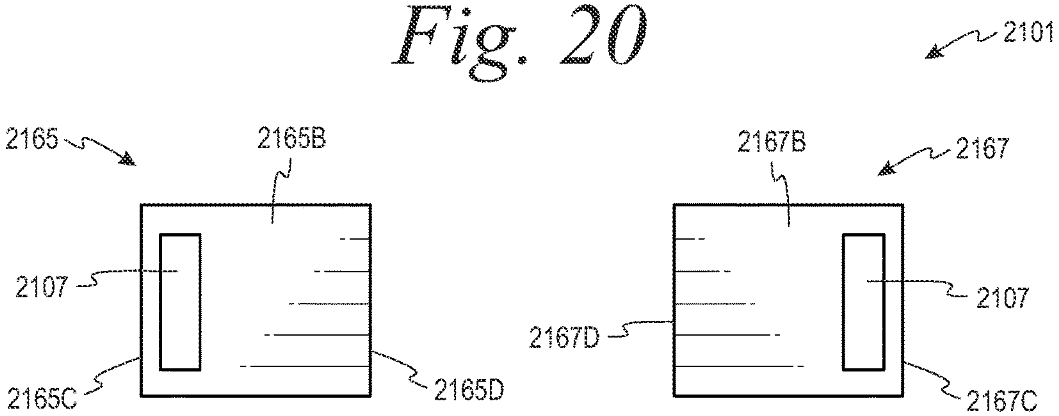
FIG. 21A illustrates a top view of an anchor, according to another example.
Figure 21B:
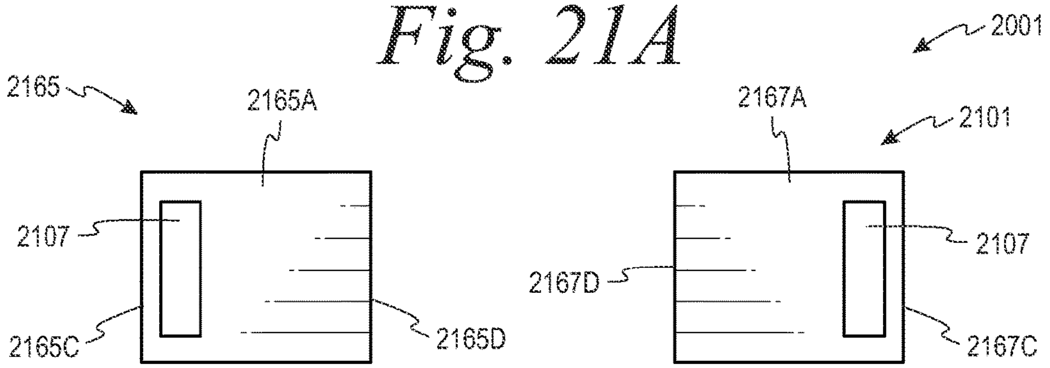
FIG. 21B illustrates a bottom view of the anchor of FIG. 21A, according to an example.
Figure 21C:
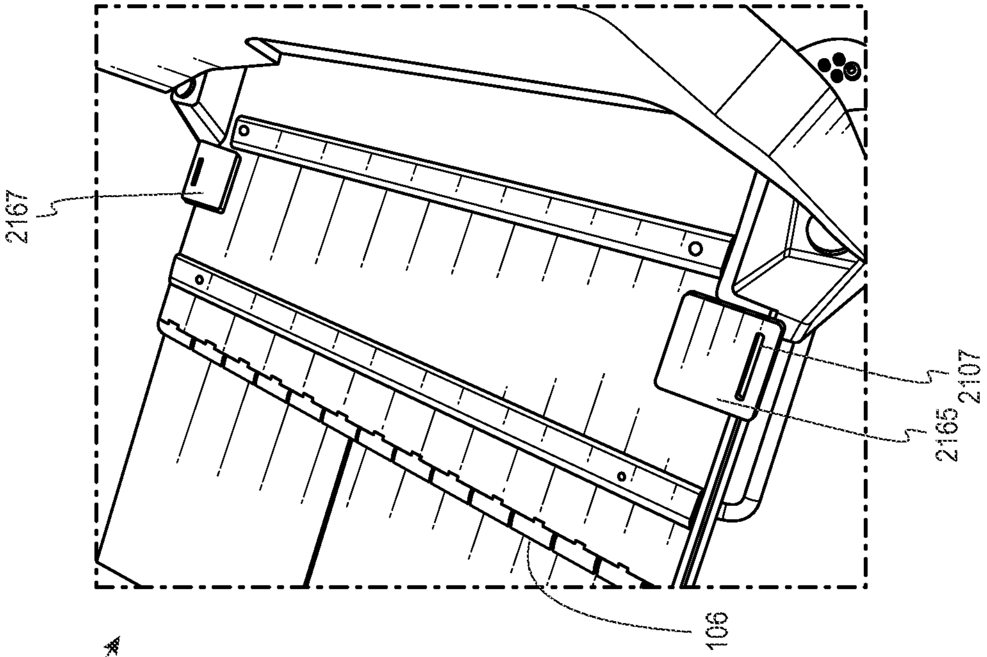
FIG. 21C illustrates the anchor of FIG. 21A coupled to a bed frame of a bed, according to an example.
Figure 21D:
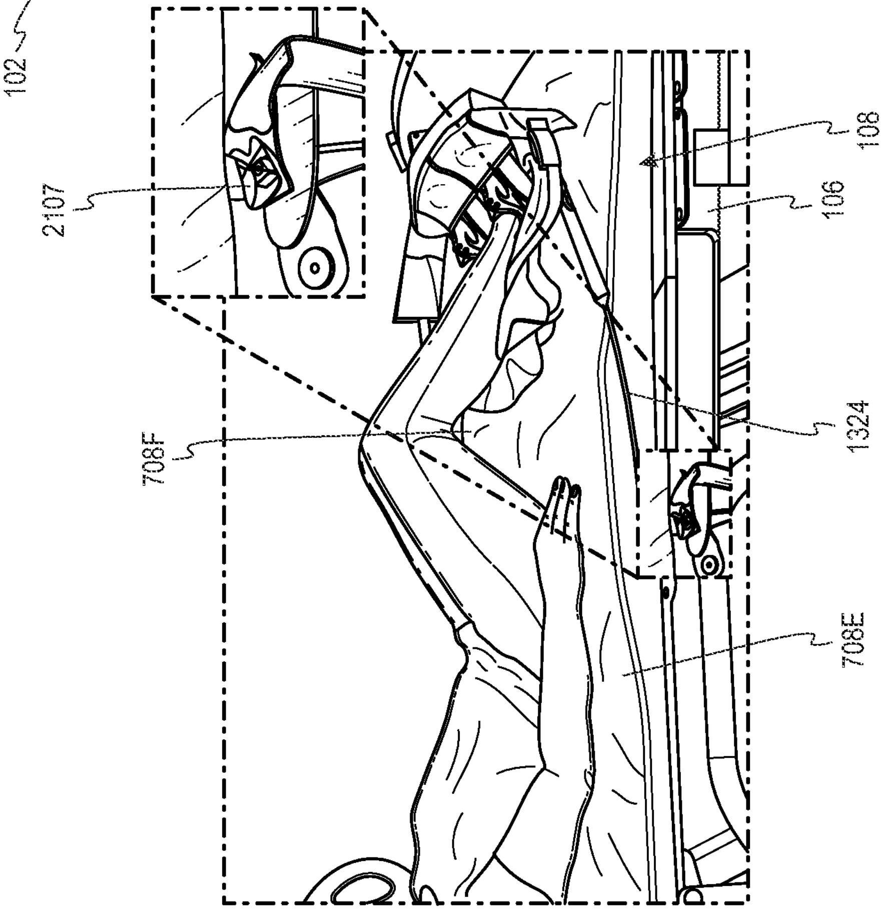
FIG. 21D illustrates the anchor of FIG. 21A coupled to the bed between the bed frame and a mattress, according to an example.

Referring now to FIGS. 21A-21D, an anchor 2101 is shown according to another example. In particular, FIG. 21A shows a top view of the anchor 2101, FIG. 21B shows a bottom view of the anchor 2101, FIG. 21C shows the anchor 2101 coupled to the bed frame 106, and FIG. 21D shows the anchor 2101 coupled to the bed 102 between the bed frame 106 and the mattress 108.

As shown in FIGS. 21A-21B, the anchor 2101 includes a first pad 2165 and a second pad 2167. The first pad 2165 and the second pad 2167 that are each configured to couple to the bed frame 106 of the bed 102 between the bed frame 106 and the mattress 108 of the bed 102.

Additionally, as shown in FIGS. 21A-21B, the first pad 2165 includes a lower surface 2165A that is configured to couple to the bed frame 106, an upper surface 2165B that is configured to engage the mattress 108, a first end 2165C that is configured to be positioned adjacent to the first lateral surface 708E of the mattress 108, and a second end 2165D that is opposite the first end 2165C. Similarly, the second pad 2167 includes a lower surface 2167A that is configured to couple to the bed frame 106, an upper surface 2167B that is configured to engage the mattress 108, a first end 2167C that is configured to be positioned adjacent to the second lateral surface 708F of the mattress 108, and a second end 2167D that is opposite the first end 2167C.

In FIGS. 21A-21D, the anchor 2101 also include a first connector 2107 at the first end 2165C of the first pad 2165 and a second connector 2107 at the first end 2167C of the second pad 2167. Similar to the first and second connectors 1307, the first connector 2107 is configured to couple to the second end of the first elastic connector 1324, and the second connector 2107 is configured to couple to the second end of the second elastic connector 1326. In FIGS. 21A-21C, the first connector 2107 and the second connector 2107 each include a respective aperture in the first pad 2165 and the second pad 2167. In other examples, such as for example the implementation of the anchor 2100 shown in FIG. 21D, the first connector 2107 and the second connector 2107 can each include a respective strap.

As shown in FIGS. 21C-21D, the first pad 2165 can be positioned adjacent to the first lateral surface 708E of the mattress 108, and the second pad 2167 can be positioned adjacent to the second lateral surface 708F of the mattress 108. In FIGS. 21C-21D, the first pad 2165 and the second pad 2167 can be coupled to the bed frame 106 such that that the first end 2165C of the first pad 2165 and the first end 2167C of the second pad 2167 protrude outwardly from the first lateral surface 708E of the mattress 108 and the second lateral surface 708F of the mattress 108. This can help to provide easy access to the first and second connectors 2107 to facilitate coupling the first and second elastic connectors 1324, 1326 to the anchor 2101 (e.g., without having to lift the mattress 108 off the bed frame 106 to access the first and second connectors 2107).

In other examples the first pad 2165 and the second pad 2167 can be coupled to the bed frame 106 such that that the first end 2165C of the first pad 2165 and the first end 2167C of the second pad 2167 such that the first end 2165C of the first pad 2165 and the first end 2167C of the second pad 2167 are at or recessed under the first lateral surface 708E of the mattress 108 and the second lateral surface 708F of the mattress 108, respectively. This can help to reduce an extent by which the first and second connectors 2107 extend from the bed frame 106 when the bed exercise system 100 is not in use (e.g., when the first and second elastic connectors 1324, 1326 are decoupled from the anchor 2101).

As described above, the lower surface 2165A of the first pad 2165 and the lower surface 2167A of the second pad 2167 can be configured to couple to the bed frame 106. In an example, the lower surface 2165A of the first pad 2165 and the lower surface 2167A of the second pad 2167 can include an adhesive that is configured to couple to the bed frame 106. In another example, the lower surface 2165A of the first pad 2165 and the lower surface 2167A of the second pad 2167 can additionally or alternatively include a magnet that is configured to couple to the bed frame 106.

Within examples, the upper surface 2165B of the first pad 2165 and the upper surface 2167B of the second pad 2167 can each include a high-friction portion that can help to inhibit the first pad 2165 and the second pad 2167 from moving relative to the mattress 108 and/or the bed frame 106. More particularly, the high-friction portion can extend over a part or an entirety of the upper surfaces 2165B, 2167B and frictionally engage the mattress 108 when the anchor 2101 is positioned between the mattress 108 and the bed frame 106. In an example, the high-friction portion can have a coefficient of friction that is greater than approximately 1.0. For instance, the high-friction portion of the first pad 2165 and the second pad 2167 can be formed a urethane-coated nylon and/or polyester coated with an adhesive.

In use, the anchor 2101 can be coupled to the mattress 108 by removing the mattress 108 from at least a portion of the bed frame 106, coupling the lower surface 2165A of the first pad 2165 to the bed frame 106 (e.g., via the adhesive and/or the magnet) on a first side of the bed frame 106, and coupling the lower surface 2167A of the second pad 2167 to the bed frame 106 (e.g., via the adhesive and/or the magnet) on a second side of the bed frame 106 opposing the first side of the bed frame 106. After coupling the first pad 2165 and the second pad 2167 to the bed frame 106, the mattress 108 can be positioned on top of the anchor 2101 with the lower surface 708D of the bed 102 (shown in FIG. 7C) frictionally engaged with the upper surface 2165B of the first pad 2165 and the upper surface 2167B of the second pad 2167.

In some implementations, the process can include aligning the first pad 2165 and the second pad 2167 with each other along a length of the bed frame 106 prior to or during coupling the first pad 2165 and the second pad 2167 to the bed frame 106. In one implementation of the process, the connectors 2107 can be coupled to the first elastic connector 1324 and the second elastic connector 1326 after coupling the anchor 2101 to the bed 102. In another implementation of the process, the connectors 2107 can be coupled to the first elastic connector 1324 and the second elastic connector 1326 prior to coupling the anchor 2101 to the bed 102.

Figure 22B:
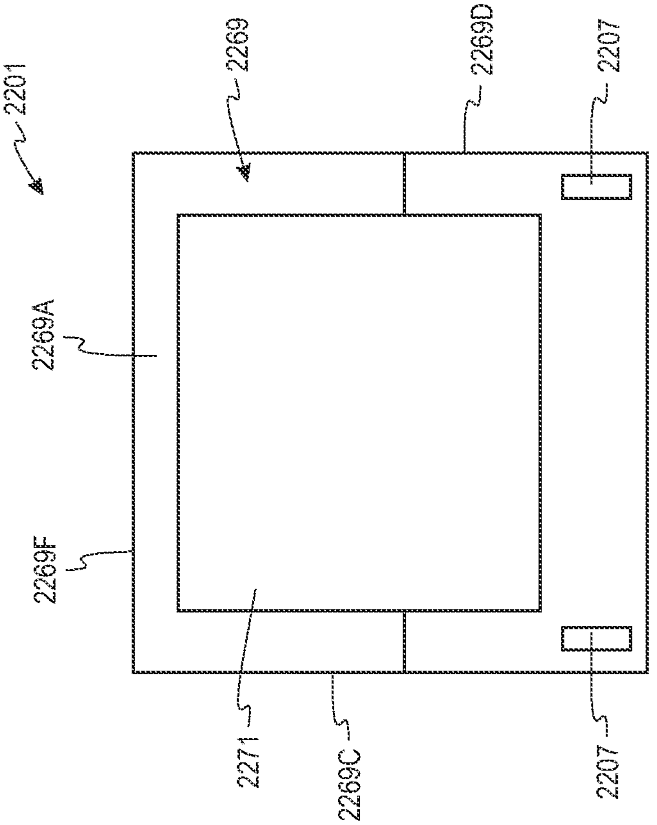
FIG. 22B illustrates a bottom view of the anchor of FIG. 22A, according to an example.
Figure 22A:
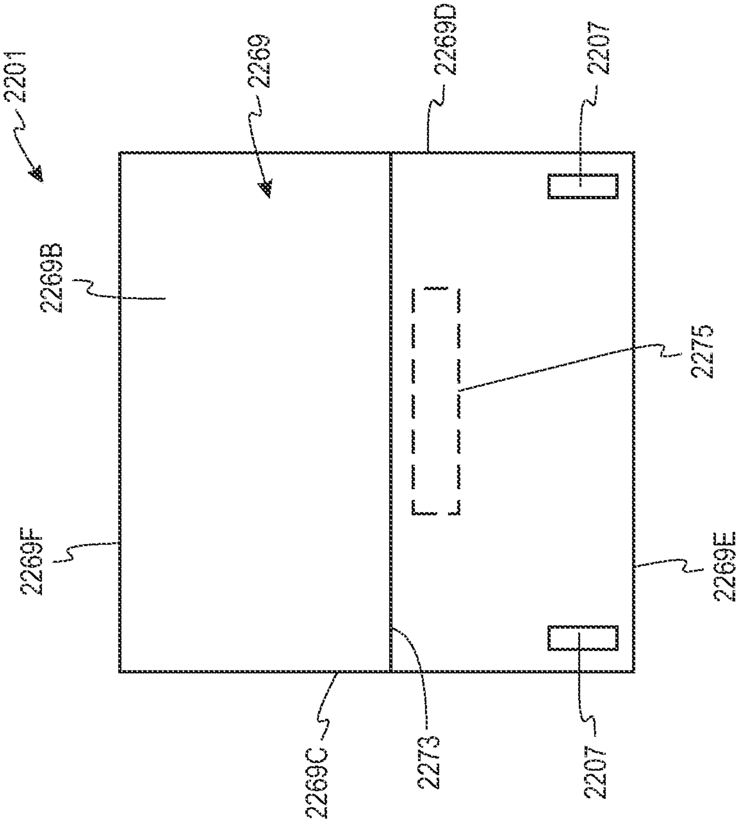
FIG. 22A illustrates a top view of an anchor, according to another example.
Figure 22D:
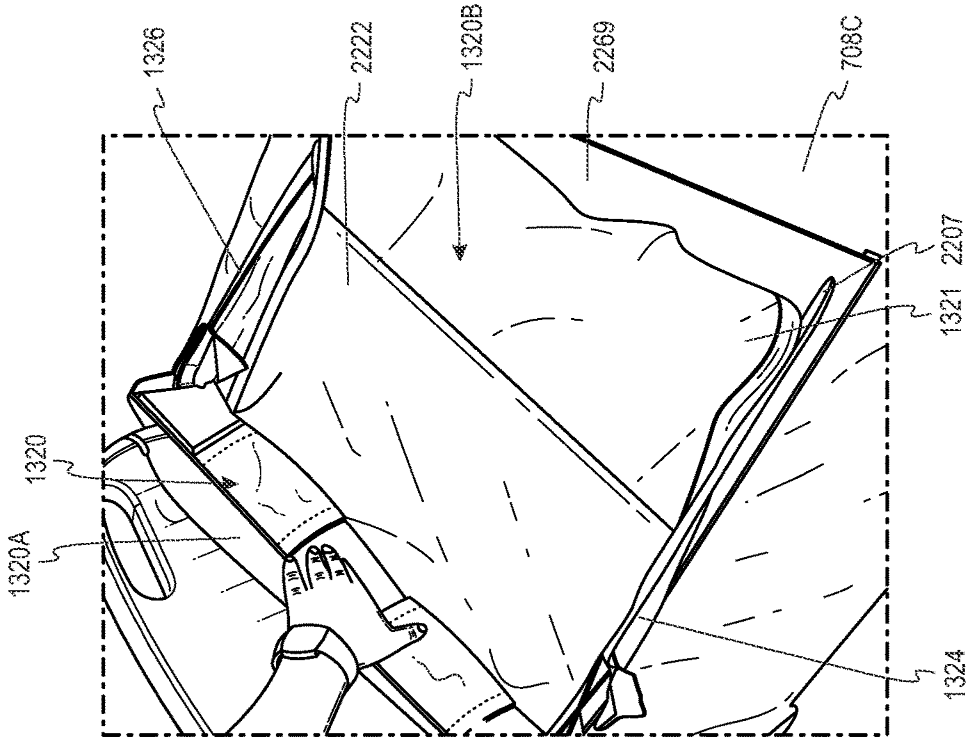
FIG. 22D illustrates the anchor of FIG. 22A coupled to the foot pad with the foot pad in a second, extended position according to an example.
Figure 22C:
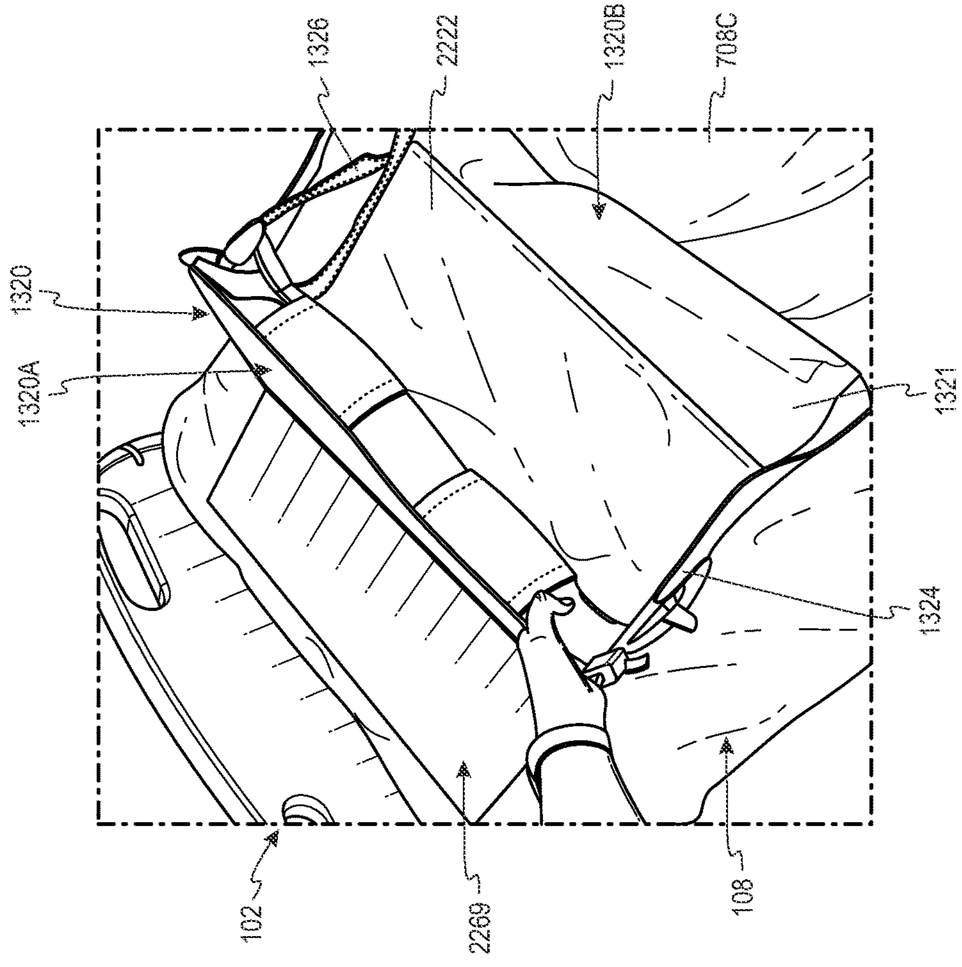
FIG. 22C illustrates the anchor of FIG. 22A coupled to a foot pad with the foot pad in a first, retracted position according to an example.
Figure 23:
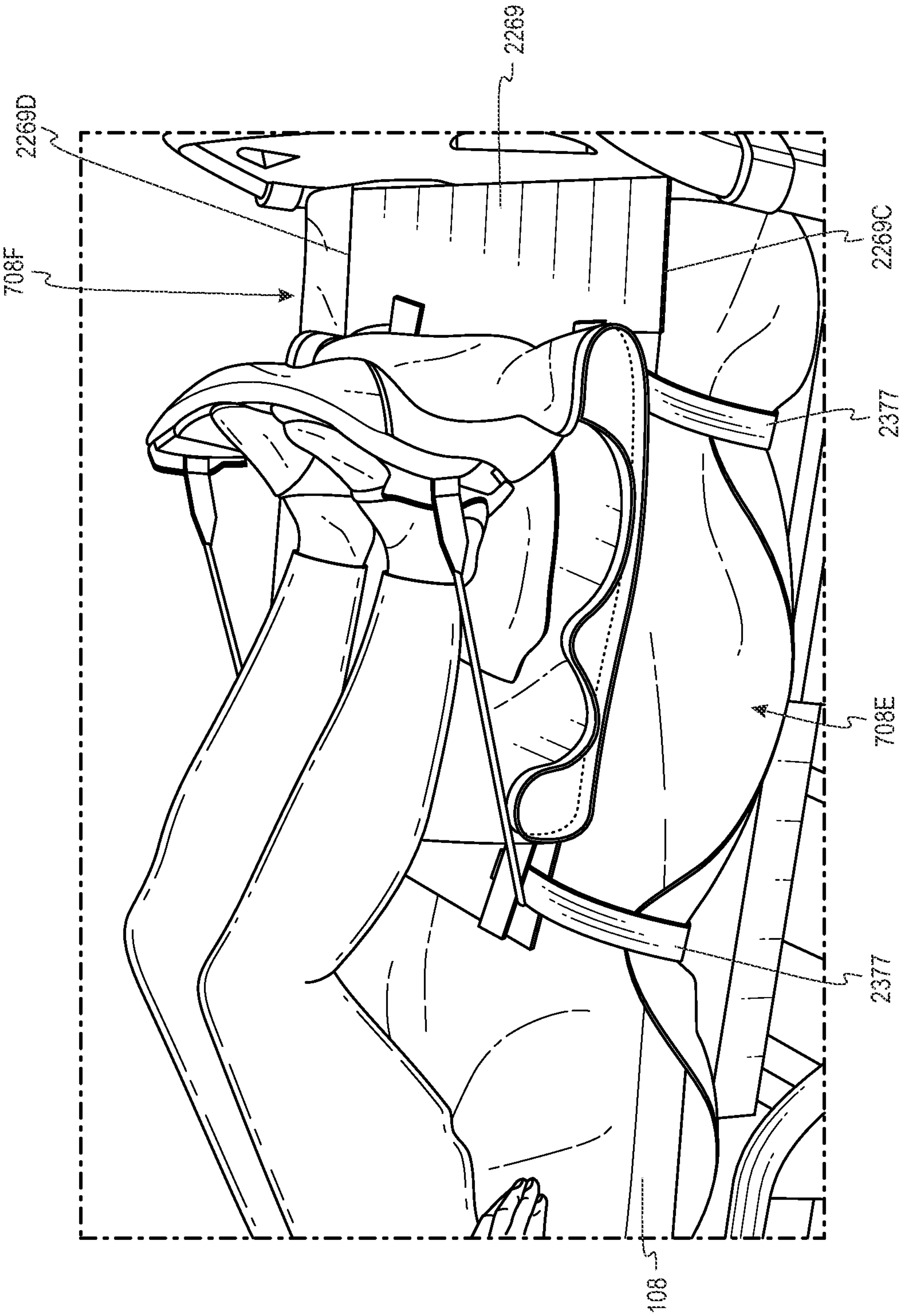
FIG. 23 illustrates an anchor including an anchor board and one or more anchor straps, according to an example.

Referring now to FIGS. 22A-22D, an anchor 2201 is shown according to another example. In particular, FIG. 22A shows a top view of the anchor 2201, FIG. 22B shows a bottom view of the anchor 2201, FIG. 22C shows the anchor 2201 coupled to a foot pad 2220 with the foot pad 2220 in the first, retracted position, and FIG. 22D shows the anchor 2201 coupled to the foot pad 2220 with the foot pad 2220 in the second, extended position.

In FIGS. 22A-22D, the anchor 2201 includes an anchor board 2269 that is configured to be positioned on the upper surface 708C of a mattress 108 of the bed 102, a first connector 2207 that is configured to couple the second end of the first elastic connector 1324 to the anchor board 2269, and a second connector 2207 that is configured to couple the second end of the second elastic connector 1326 to the anchor board 2269.

As shown in FIGS. 22A-22B, the anchor board 2269 can include (i) a lower board surface 2269A that is configured to engage the upper surface 708C of the mattress 108, (ii) an upper board surface 2269B that is configured to face the foot pad 1320, (iii) a first lateral board side 2269C configured to face the first lateral surface 708E of a mattress 108 of the bed 102, (iv) a second lateral board side 2269D configured to face a second lateral surface 708F of the mattress 108 of the bed 102, (v) a distal board side 2269E configured to face the foot end 708B of the mattress 108, and (vi) a proximal board side 2269F configured face the head end 708A of the mattress 108. In this arrangement, the lower board surface 2269A and the upper board surface 2269B each extend between the first lateral board side 2269C, the second lateral board side 2269D, the distal board side 2269E, and the proximal board side 2269F of the anchor board 2269.

In FIGS. 22C-22D, the foot pad 1320 can be operated by an operator 104 between the first, retracted position and the second, extended position (as described above) while the anchor board 2269 freely rests on the upper surface 708C of the mattress 108 (e.g., without the anchor board 2269 being coupled to the mattress 108 or the bed frame 106 by straps, adhesives, magnets, etc.). To assist in mitigating movement of the anchor board 2269 relative to the mattress 108, the lower board surface 2269A can include a high-friction portion 2271 that can frictionally engage the upper surface 708C of the mattress 108. For instance, the high-friction portion 2271 can have a coefficient of friction greater than approximately 1.0. As examples, the high-friction portion 2271 can be formed a urethane-coated nylon and/or polyester coated with an adhesive.

Additionally or alternatively, to assist in mitigating movement of the anchor board 2269 relative to the mattress 108, the anchor board 2269 can have a relatively heavy weight. In one example, the anchor board 2269 can have a weight of at least 10 pounds. Also, as an example, the anchor board 2269 can be formed from a metal or another relatively heavy material.

As shown in FIGS. 22A-22B, the anchor board 2269 can be configured to be folded to transition the anchor board 2269 from a deployed configuration to a storage configuration. For instance, the anchor board 2269 can include one or more hinges that are configured to fold at one or more locations to reduce a footprint size of the anchor board 2269 for more space-efficient storage of the anchor board 2269. In FIGS. 22A-22B, the anchor board 2269 includes a single hinge 2273 at a midpoint between the distal board side 2269E and the proximal board side 2269F. In this arrangement, the hinge 2273 can allow the anchor board 2269 to be folded in half to transition the anchor board from the deployed configuration to the storage position. In other examples, the hinge 2273 can be located at a different position on the anchor board 2269 and/or the anchor board 2269 can include a different quantity of hinges 2273 (e.g., zero hinges, two hinges, three hinges, etc.).

In this example, the anchor 2201 also includes a first connector 2207 and a second connector 2207. The first connector 2207 is at or adjacent to the first lateral board side 2269C and the second connector 227 is at or adjacent to the second lateral board side 2269D. The first connector 2207 can couple to the second end of the first elastic connectors 1324 and the second connector 2207 can couple to the second end of the second elastic connector 1326 in a manner similar to that described above. For instance, in FIGS. 22A-22D, the first connector 2207 and the second connector 2207 each include a respective aperture in the anchor board 2269. In other examples, for instance, the first and second connectors 2207 of the anchor 2201 can include a strap and/or a portion of the buckle for coupling with the first and second elastic connectors 1324, 1326. In other examples, the first and second connectors 2207 can be additionally or alternatively coupled to the elastic connectors 1324, 1326 by, for instance, one or more hooks, carabineer clips, gate clips, slots, and/or buttons.

As shown in FIGS. 22C-22D and as described above, the foot pad 1320 can include the first portion 1320A and the second portion 1320B, the first portion 1320A can include the rigid support member, and the second portion 1320B of the foot pad 1320 can extend from the lower side of the first portion 1320A of the foot pad 1320. Additionally, the second portion 1320B of the foot pad 1320 can include the tube 1321 having the interior surface and the exterior surface, as described above. In this arrangement, a first portion of the interior surface is configured to contact a second portion of the tube 1321 when the foot pad 1320 is moved between the first, retracted position shown in FIG. 22C and the second, extended position shown in FIG. 22D.

Additionally, as shown in FIGS. 22A and 22C-22D, the exterior surface of the tube 1321 can be coupled to the upper board surface 2269B of the anchor board 2269. As examples, the exterior surface of the tube 1321 can be coupled to the anchor board 2269 by an adhesive and/or a material with a relatively high coefficient of friction (e.g., a urethane coated fabric and/or a silicone coated fabric).

FIG. 22A shows an attachment region 2275 on the upper board surface 2269B at which the tube 1321 is coupled to the anchor board 2269, according to one example. In other examples, the anchor board 2269 can include one or more additional attachment regions 2275, the attachment region 2275 can be located at a different position on the anchor board 2269, the attachment region 2275 can have a different size, and/or the attachment region 2275 can have a different shape than the attachment region 2275 illustrated in FIG. 22A.

As shown in FIGS. 22C-22D, a leg support member 2222 can extend from a lower side of the first portion 1320A of the foot pad 1320. In this example, the leg support member 2222 can include a leg cushion in a manner similar to that described above with respect to the leg cushion 152 of FIGS. 1A-1B. The leg support member 2222 can assist in improving operator comfort by providing cushioning between the ankle(s) and leg(s) 112 of the operator 104 and the anchor board 2269.

As described above, the anchor board 2269 shown in FIGS. 22A-22D can be configured to freely rest on the mattress 108 while resisting movement of the anchor board 2269 relative to the mattress 108. In another example, shown in FIG. 23, the anchor 2201 can additionally include one or more anchor straps 2377 that are configured to couple the anchor board 2269 to the mattress 108 by extending around the first lateral surface 708E of the mattress 108, a lower surface 708D (shown in FIG. 7C) of the mattress 108, and a second lateral surface 708F of the mattress 108. For instance, each anchor strap 2377 can include a first end coupled to the anchor board 2269 at or adjacent to the first lateral board side 2269C and a second end coupled to the anchor board 2269 at or adjacent to the second lateral board side 2269D.

In some examples, each anchor strap 2377 can include an adjustment mechanism that is configured to adjust a length of the anchor strap 2377. For instance, the adjustment mechanism can be similar or identical to the adjustment mechanisms described above (e.g., including a buckle, a frame and a bar, loops and clips, and/or holes and buttons). The adjustment mechanism can allow the anchor strap 2377 to have a length that can be adjusted to allow the anchor 2201 to extend around mattresses having a plurality of different circumference sizes and, thus, more universally couple the bed exercise system 100 with a wide variety of mattresses types.

Although the anchor 2301 includes two anchor straps 2377, the anchor 2301 can include a single anchor strap 2377 or more than two anchor straps 2377 in other examples. In some implementations, the anchor 2301 can include a single anchor strap 2377 at or adjacent to the proximal board side 2269F and/or at or adjacent to the first and second connectors 2207.

In some examples, when the anchor 2201 includes the anchor straps 2377, the anchor board 2269 can be formed from a lighter weight material than may be used when the anchor board 2269 is configured to freely rest on the mattress 108. This may help to improve storability and/or ease of use of the anchor 2201 relative to the anchor board 2269 that is configured to freely rest on the mattress 108.

Figure 24:
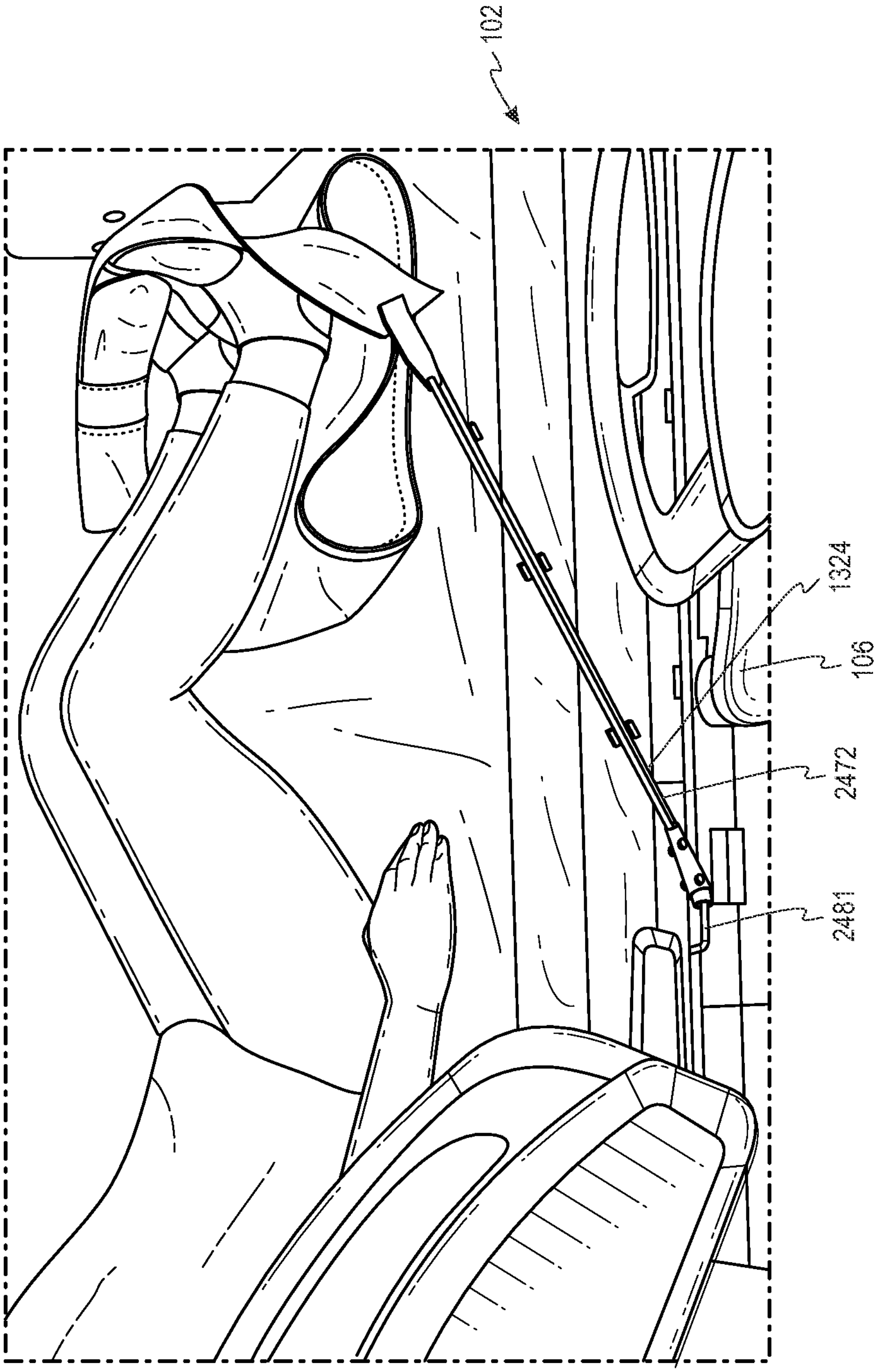
FIG. 24 illustrates an anchor coupled to a foot pad, according to another example.

Referring to FIG. 24, an anchor 2401 is shown according to another example. The anchor 2401 includes a first anchor 2472 and a second anchor (not shown) that are substantially similar or identical to the first anchor 172 and the second anchor 174 described above. As shown in FIG. 24, the first anchor 2472 includes a first loop of material that is configured to couple the second end of the first elastic connector 1324 to a first restraint hook 2481 of the bed frame 106 of the bed 102, and the second anchor includes a second loop of material that is configured to couple the second end of the second elastic connector 1326 to a second restraint hook 2481 of the bed frame 106 of the bed 102.

Figure 25A:
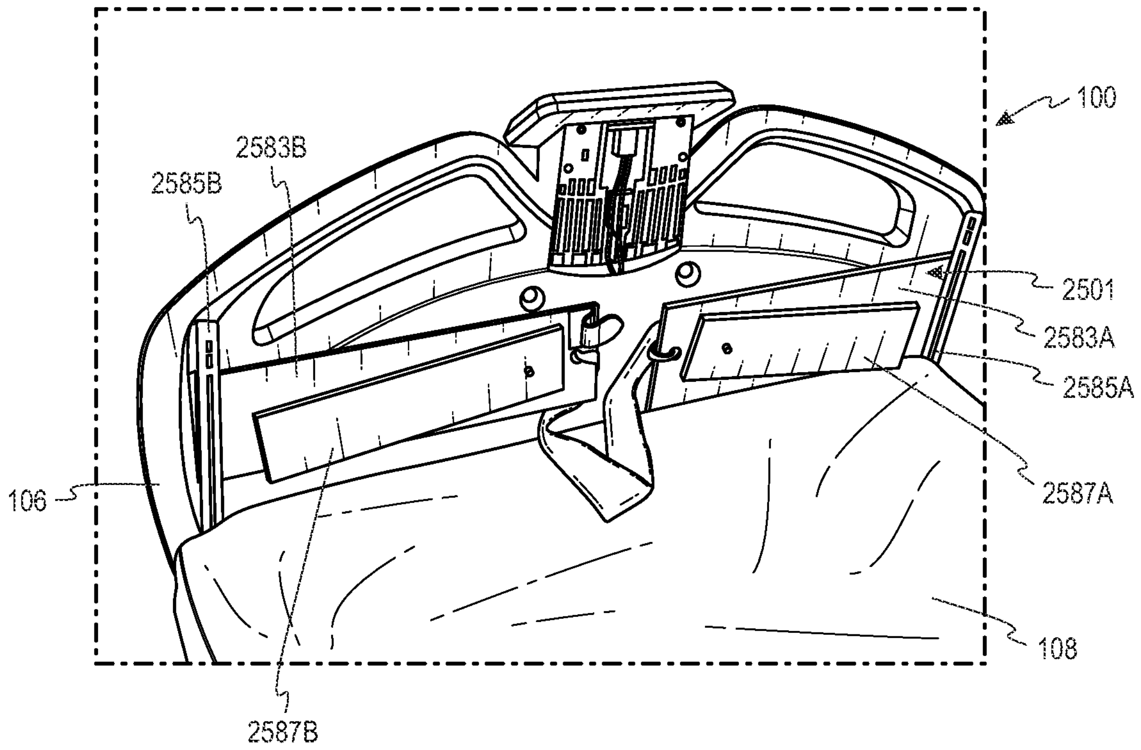
FIG. 25A illustrates an anchor coupled to an elastic band, according to another example.
Figure 25B:
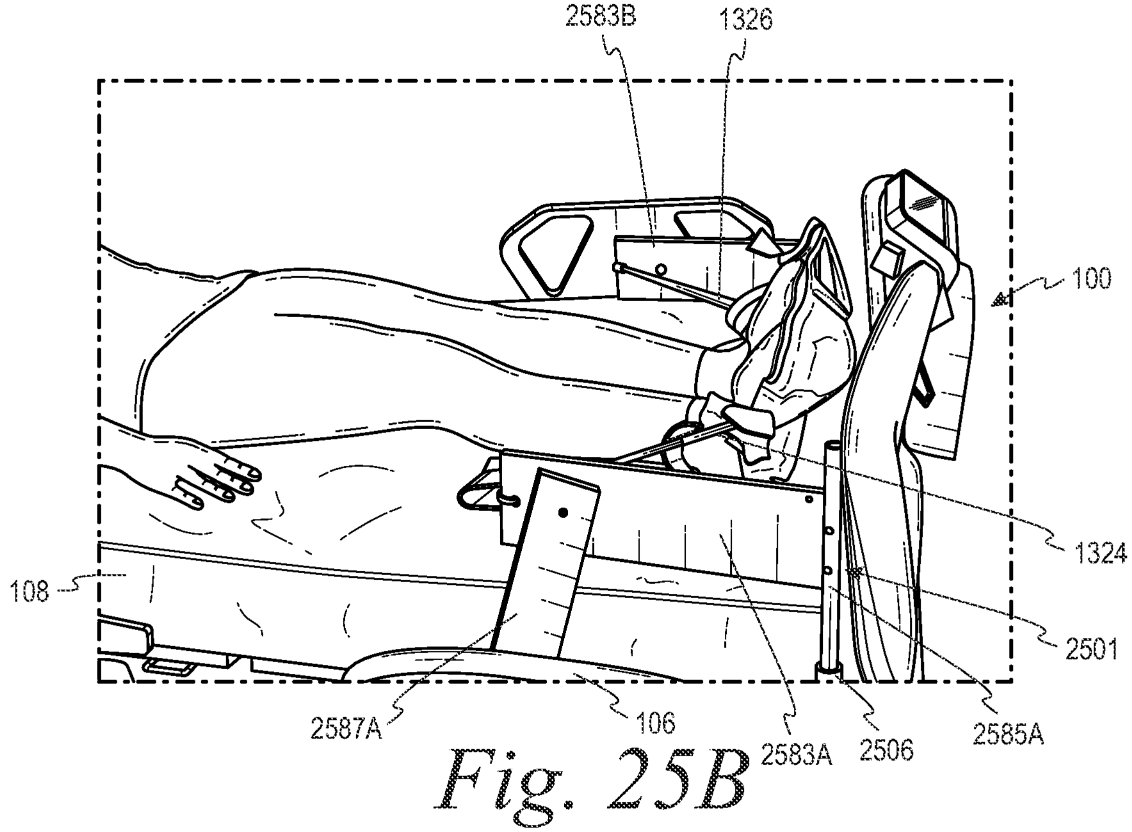
FIG. 25B illustrates the anchor of FIG. 25A coupled to a foot pad, according to another example.

Referring to FIGS. 25A-25B, an anchor 2501 is shown according to another example. As shown in FIGS. 25A-25B, the anchor 2501 includes a first bracket 2583A and a second bracket 2583B. As shown in FIG. 25B, the first elastic connector 1324 can be coupled to the first bracket 2583A and the second elastic connector 1326 can be coupled to the second bracket 2583B. Alternatively, as shown in FIG. 25A, an elastic band can be coupled to the first bracket 2583A and the second bracket 2583B.

As shown in FIGS. 25A-25B, the first bracket 2583A is coupled to a first pole 2585A and the second bracket 2583B is coupled to a second pole 2585B. The first pole 2585A and the second pole 2585B are each configured to couple to a respective slot on the bed frame 106. For instance, in FIGS. 25A-25B, the first pole 2585A and the second pole 2585B are each configured to couple to a respective intravenous (IV) pole hole 2506 on the bed frame 106.

The anchor 2501 also includes a first brace 2587A coupled to the first bracket 2583A and a second brace 2587B coupled to the second bracket 2583B. For instance, in FIGS. 25A-25B, the first brace 2587A is rotatably coupled to the first bracket 2583A and the second brace 2587B is rotatably coupled to the second bracket 2583B.

In this arrangement, the first pole 2585A and the second pole 2585B can couple to the bed frame 106 and extend vertically in a direction that is approximately perpendicular to the bed frame 106 and/or a ground floor upon which the bed frame 106 is positioned. The first bracket 2583A and the second bracket 2583B can extend proximally from the first pole 2585A and the second pole 2585B (e.g., in a direction approximately parallel to a length of the mattress 108 and/or the bed frame 106). To deploy the anchor 2501, the first brace 2587A and the second brace 2587B can rotate to extend down from the first bracket 2583A and the second bracket 2583B, respectively, toward the bed frame 106. For instance, as shown in FIG. 25B, the first brace 2587A and the second brace 2587B can extend down to respective positions on opposing sides of the mattress 108 and/or between the bed frame 106 and the mattress 108. This can help to lock the anchor 2501 in a deployed state such that the first bracket 2583A and the second bracket 2583B do not move while the operator operates the bed exercise system 100.

As shown in FIG. 25A, the anchor 2501 can transition from the deployed state to a storage state when not in use. In the storage state, the first brace 2587A can be rotated towards the first bracket 2583A and the second brace 2587B can be rotated towards the second bracket 2583B such that the first bracket 2583A can rotate about the first pole 2585A and the second bracket 2583B can rotate about the second pole 2585B. For instance, the first bracket 2583A and the second bracket 2583B can be rotated to contact a foot of the bed frame 106.

In some examples, the first pole 2585A and the second pole 2585B each can be configured to couple to an IV pole while being coupled to the bed frame 106. For instance, the first pole 2585A and the second pole 2585B can have a stepped diameter to accept an IV pole inside of it.

Referring to FIGS. 26A-26F, an anchor 2601 is shown according to another example. The anchor 2601 is substantially similar or identical to the anchor 2501 shown in FIGS. 25A-25B, except the anchor 2601 is adjustable in at least one dimension to help tailor a setup of the bed exercise system 100 to a particular user, bed frame 106, and/or mattress 108.

As shown in FIGS. 26A-26F, the anchor 2601 includes a first bracket 2683A and a second bracket 2683B. The first bracket 2683A is coupled to a first pole 2685A and the second bracket 2683B is coupled to a second pole 2685B. The first pole 2685A and the second pole 2685B are each configured to couple to a respective slot on the bed frame 106. For instance, in FIGS. 26A-26F, the first pole 2685A and the second pole 2685B are each configured to couple to a respective intravenous (IV) pole hole 2606 on opposing sides of the bed frame 106.

The first bracket 2683A and the second bracket 2683B can each include a connector 2607 that is configured to couple to the elastic connectors 1324, 1326 in a manner similar to that described above with respect to the connectors 707, 1307, 1807, 1907, 2007, 2107, 2207. For instance, the connectors 2607 can include a portion of the buckle 178 for coupling with the elastic connectors 124, 126, as shown in FIGS. 1A and 3. In other examples, the connectors 2607 can be additionally or alternatively coupled to the elastic connectors 124, 126 by, for instance, one or more hooks, carabineer clips, gate clips, slots, and/or buttons.

The anchor 2601 also includes a first brace 2687A coupled to the first bracket 2683A and a second brace 2687B coupled to the second bracket 2683B. For instance, in FIGS. 26A-26F, the first brace 2687A is rotatably coupled to the first bracket 2683A and the second brace 2687B is rotatably coupled to the second bracket 2683B.

In this arrangement, the first pole 2685A and the second pole 2685B can couple to the bed frame 106 and extend vertically in a direction that is approximately perpendicular to the bed frame 106 (and/or a ground on which the bed frame 106 is positioned). The first bracket 2683A and the second bracket 2683B can extend proximally from the first pole 2685A and the second pole 2685B (e.g., in a direction approximately parallel to a length of the mattress 108 and/or the bed frame 106). To deploy the anchor 2601, the first brace 2687A and the second brace 2687B can rotate to extend down from the first bracket 2683A and the second bracket 2683B, respectively, toward the bed frame 106 and the mattress 108. For instance, as shown in FIGS. 26A-26F, the first brace 2687A and the second brace 2687B extend down to respective positions along the lateral surfaces of the bed frame 106 and the mattress 108. This can help to lock the anchor 2601 in a deployed state such that the first bracket 2683A and the second bracket 2683B do not move inwardly while the operator operates the bed exercise system 100.

As described above for the anchor 2501 of FIGS. 25A-25B, the anchor 2601 can transition from the deployed state to a storage state when not in use. In the storage state, the first brace 2687A can be rotated towards the first bracket 2683A and the second brace 2687B can be rotated towards the second bracket 2683B such that the first bracket 2683A can rotate about the first pole 2685A and the second bracket 2683B can rotate about the second pole 2685B. For instance, the first bracket 2683A and the second bracket 2683B can be rotated to contact a foot of the bed frame 106.

In some examples, the first pole 2685A and the second pole 2685B each can be configured to couple to an IV pole while being coupled to the bed frame 106. For instance, the first pole 2685A and the second pole 2685B can have a stepped diameter to accept an IV pole inside of it.

As noted above, the anchor 2601 is adjustable in at least one dimension. In this example, the anchor 2601 is configured to adjust a height of the first bracket 2683A and the second bracket 2683B relative to the upper surface of the mattress 108 and/or the bed frame 106. This can help to improve compatibility of the bed exercise system 100 with a plurality of different types of mattresses 108 (e.g., having different thicknesses) and/or bed frames 106.

Figure 26A:
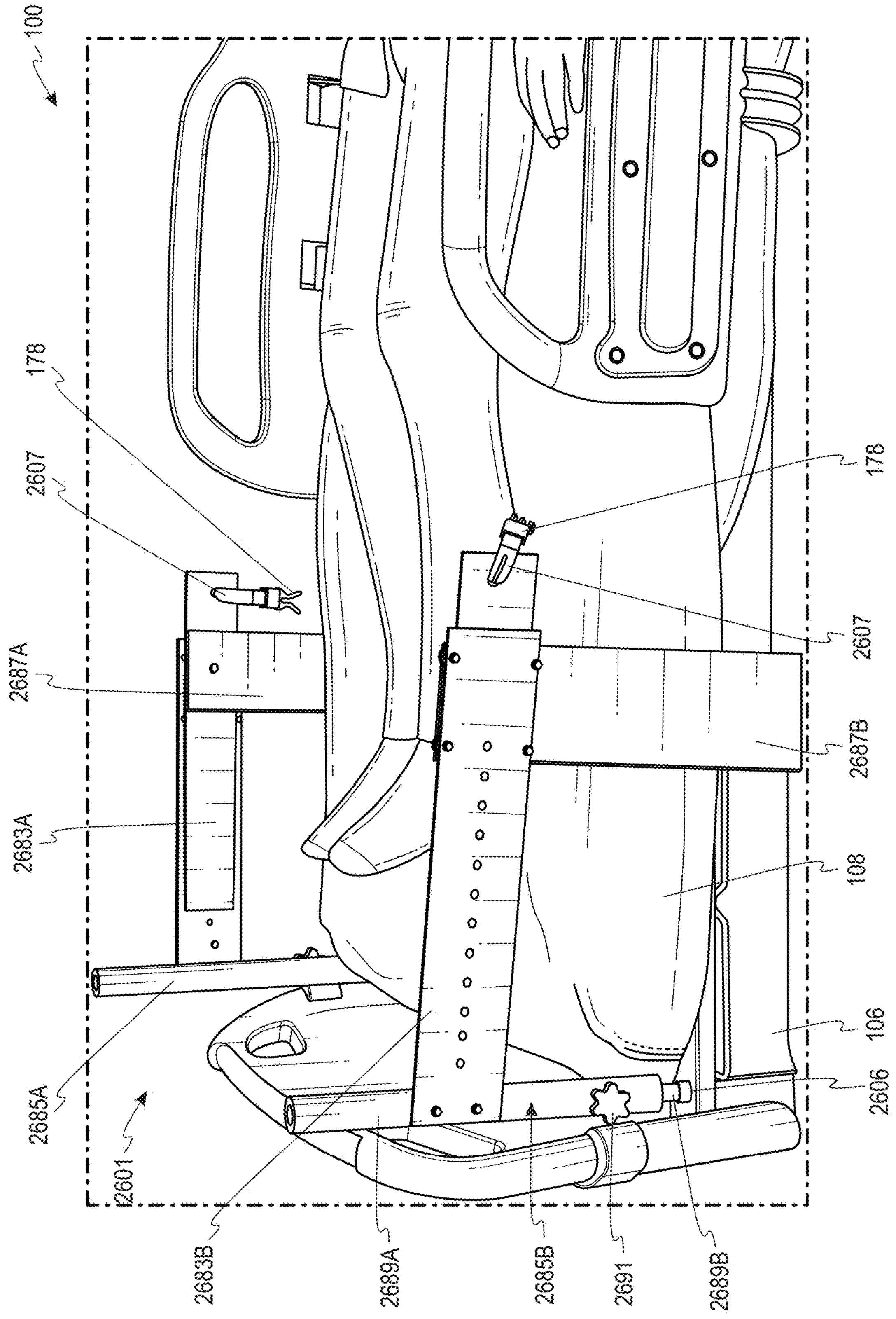
FIG. 26A illustrates an anchor in a first configuration, according to another example.
Figure 26B:
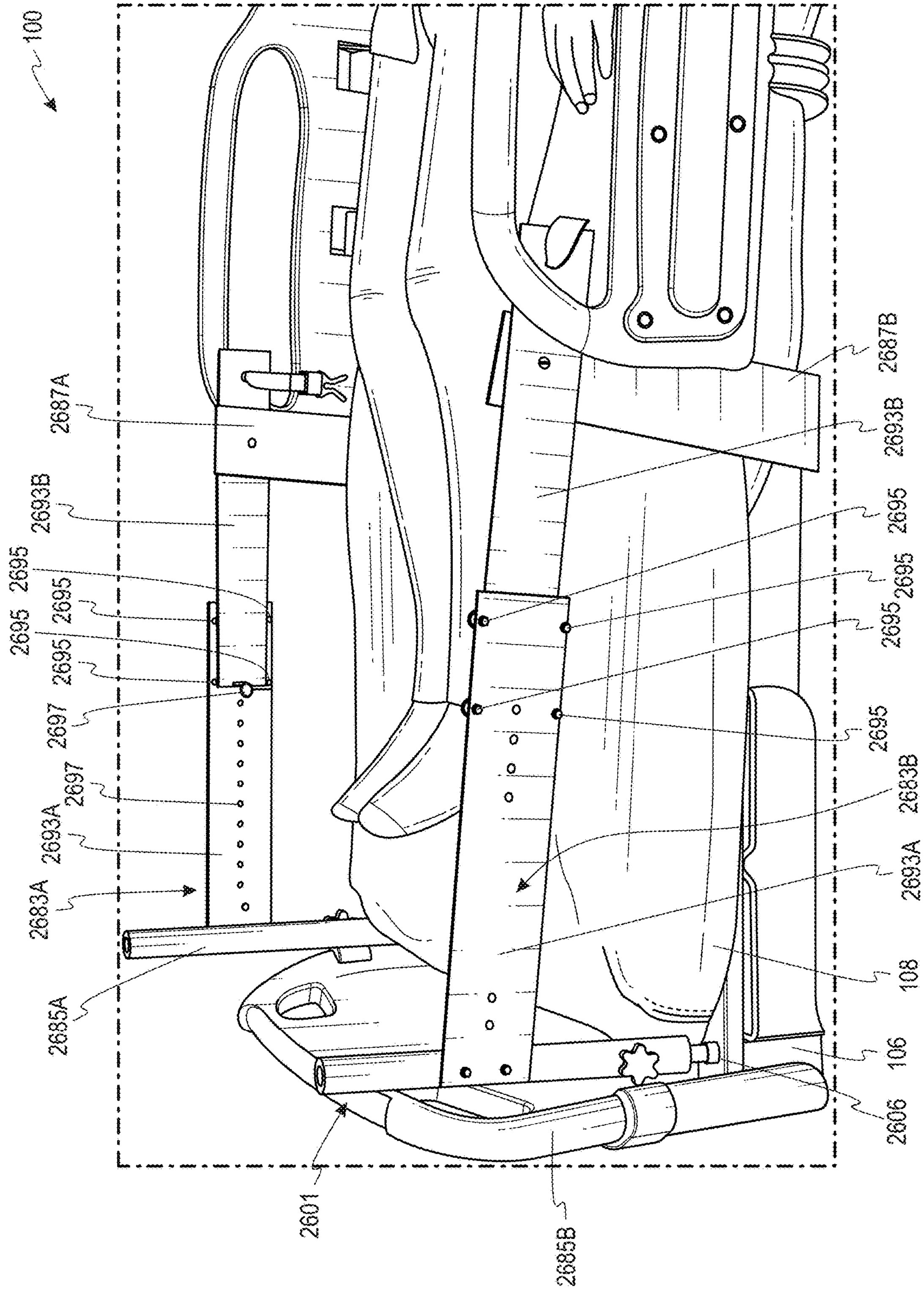
FIG. 26B illustrates the anchor of FIG. 26B in a second configuration, according to an example.

In FIGS. 26A-26B, the first pole 2685A and the second pole 2685B can have a size that is adjustable to adjust the height of the first bracket 2683A and the second bracket 2683B relative to the upper surface of the mattress 108 and/or the bed frame 106. For example, the first pole 2685A and the second pole 2685B can be extendable and retractable along a longitudinal axis of the first pole 2685A and the second pole 2685B. For instance, in FIGS. 26A-26B, the first pole 2685A and the second pole 2685B each include an upper portion 2689A and a lower portion 2689B that are telescopically movable relative to each other to adjust the size of the first pole 2685A and the second pole 2685B, respectively. In the illustrated example, the lower portion 2689B is movable within a bore of the upper portion 2689A. However, in another example, the upper portion 2689A can be movable within a bore of the lower portion 2689B. The telescopic arrangement of the upper portion 2689A and the lower portion 2689B can help to enhance structural support between the upper portion 2689A and the lower portion 2689B. In still other examples, the upper portion 2689A and the lower portion 2689B can be configured to move relative to each other in a non-telescopic manner (e.g., in a side-by-side arrangement).

As shown in FIGS. 26A-26F, the first pole 2685A and the second pole 2685B can also include a locking mechanism 2691 that can be actuated between (i) a first state that allows for movement of the upper portion 2689A relative to the lower portion 2689B, and (ii) a second state that inhibits or prevents movement of the upper portion 2689A relative to the lower portion 2689B. In FIGS. 26A-26F, the locking mechanism 2691 is a set screw that is threadably engaged with and extends through the upper portion 2689A to adjustably engage the lower portion 2689B such that the set screw can be loosened to actuate the locking mechanism 2691 to the first state and tightened to actuate the locking mechanism 2691 to the second state.

In some examples, such as the example shown in FIGS. 26A-26F, the locking mechanism 2691 can provide for locking the upper portion 2689A and the lower portion 2689B at any position within a range of movement of the upper portion 2689A and the lower portion 2689B. This can provide greater freedom and relatively fine-tuned adjustment the height of the first bracket 2683A and the second bracket 2683B. However, in other examples, the locking mechanism can be configured to lock the upper portion 2689A and the lower portion 2689B only at a subset of positions within the range of movement of upper portion 2689A and the lower portion 2689B (e.g., at a plurality of incremented positions within the range of motion but not at other positions between the incremented positions). This may help to more easily adjust both the first pole 2685A and the second pole 2685B to the same height.

In FIGS. 26A-26F, the first bracket 2683A and the second bracket 2683B can additionally or alternatively have a size that is adjustable. For example, the first bracket 2683A and the second bracket 2683B can each include a distal portion 2693A and a proximal portion 2693B that are movable relative to each other to adjust a length (e.g., in a dimension extending between the head end and the foot end of the mattress 108) of the first bracket 2683A and the second bracket 2683B. Adjusting the length of the first bracket 2683A and the second bracket 2683B can help to accommodate operators of different heights.

FIG. 26A depicts the first bracket 2683A and the second bracket 2683B with each proximal portion 2693B in a retracted position relative to the respective distal portion 2693A. FIG. 26B depicts the first bracket 2683A and the second bracket 2683B with each proximal portion 2693B in an extended position relative to the respective distal portion 2693A.

The first bracket 2683A and the second bracket 2683B can include a plurality of support members 2695 that help to support the proximal portion 2693B while the proximal portion 2693B moves relative to the distal portion 2693A. The support members 2695 can also help to maintain a coupling between the proximal portion 2693B and the distal portion 2693A while the proximal portion 2693B moves relative to the distal portion 2693A. In one example, as shown in FIG. 26B, the support members 2695 can include a plurality of rollers that can help to slidably move the proximal portion 2693B relative to the distal portion 2693A. The rollers can be rotatably coupled to the distal portion 2693A such that the rollers rotate about an axis when the proximal portion 2693B moves relative to the distal portion 2693A. The rollers can also include a groove that can receive an edge of the proximal portion 2693B to help maintain the coupling between the proximal portion 2693B and the distal portion 2693A while the proximal portion 2693B moves relative to the distal portion 2693A.

In another example, the first bracket 2683A and/or the second bracket 2683B can additionally or alternatively a different structure for supporting the proximal portion 2693B during movement relative to the distal portion 2693A such as, for instance, a channel on the distal portion 2693A that surrounds the proximal portion 2693B and/or a plurality of ledges on the distal portion 2693A that partially overlaps with the proximal portion 2693B.

The first bracket 2683A and the second bracket 2683B can also include a position selector 2697 that can be actuated between (i) a first state that allows for movement of the proximal portion 2693B relative to the distal portion 2693A, and (ii) a second state that inhibits or prevents movement of the proximal portion 2693B relative to the distal portion 2693A. In FIGS. 26A-26F, the position selector 2697 is a pin that is configured to couple to the proximal portion 2693B and extend through one aperture selected from among a plurality apertures in the distal portion 2693A, where each of the apertures in the distal portion 2693A corresponds to a respective position of the proximal portion 2693B relative to the distal portion 2693A. In one implementation, the pin can be spring-loaded to assist in actuating the position selector 2697 from the first state to the second state.

In use, the anchor 2601 can be coupled to the bed frame 106 with the lower portions 2689B of the first pole 2685A and the second pole 2685B coupled to the IV pole slots on the bed frame 106, as shown in FIG. 26A. The height of the first bracket 2683A and the second bracket 2683B can be adjusted by actuating the locking mechanism 2691 from the second state to the first state and, while the locking mechanism 2691 is in the first state, moving the upper portions 2689A relative to the lower portions 2689B. In one implementation, the size of the first pole 2685A and the second pole 2685B can be adjusted such that the connectors 2607 are approximately aligned with the balls of an operators feet (e.g., approximately 4 inches to approximately 6 inches above the upper surface of the mattress 108). After adjusting the size of the first pole 2685A and the second pole 2685B, the locking mechanism 2691 can be actuated from the first state to the second state to inhibit or prevent inadvertent adjustments to the sizes of the first pole 2685A and/or the second pole 2685B.

Figure 26C:
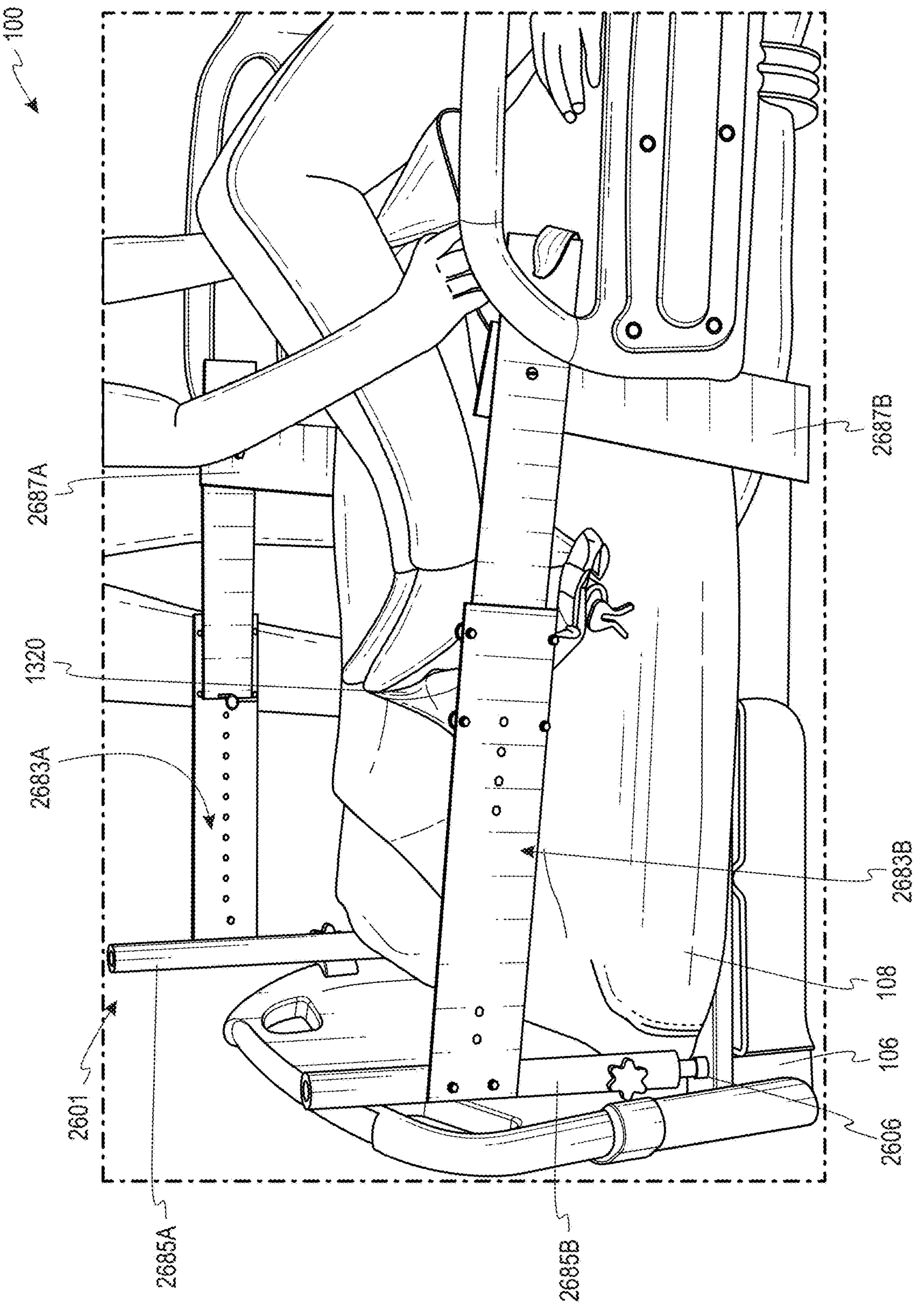
FIG. 26C illustrates a bed exercise system including the anchor of FIG. 26A, according to an example.
Figure 26D:
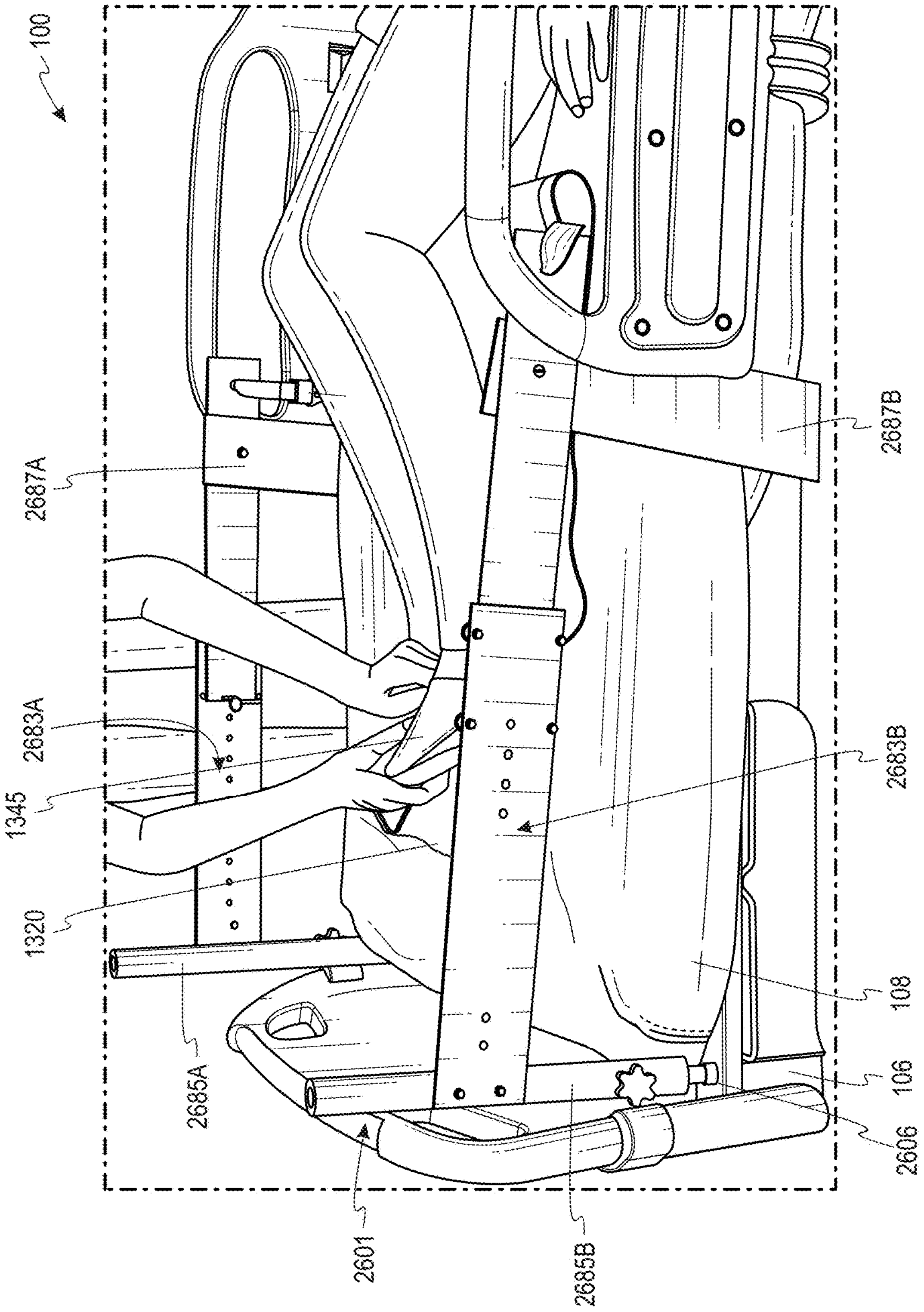
FIG. 26D illustrates a foot pad of the bed exercise system of FIG. 26C coupled to the feet of an operator, according to an example.
Figure 26E:
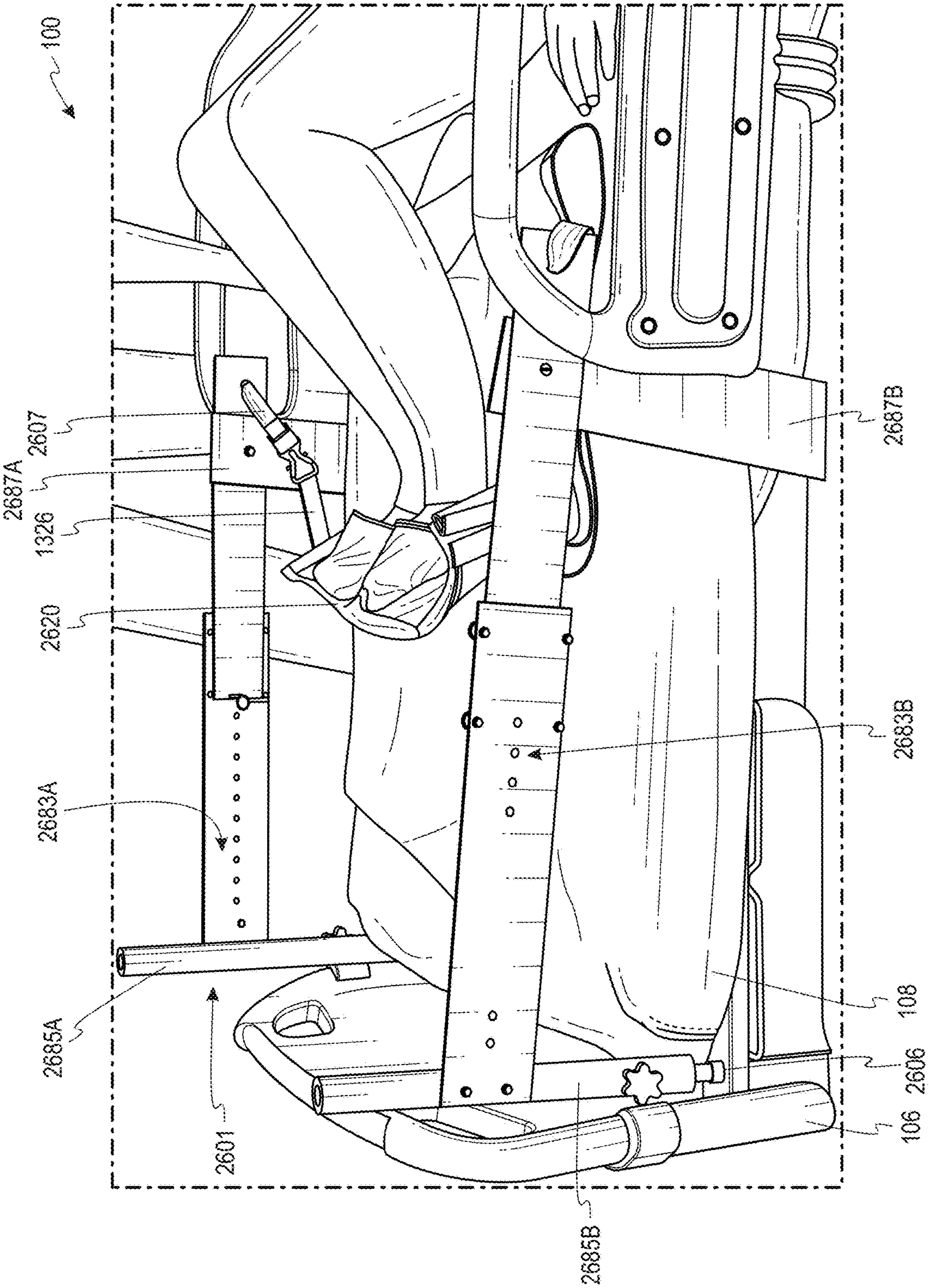
FIG. 26E illustrates the bed exercise system of FIG. 26C with a foot pad coupled to the anchor and the foot pad in a first, retracted position, according to an example.
Figure 26F:
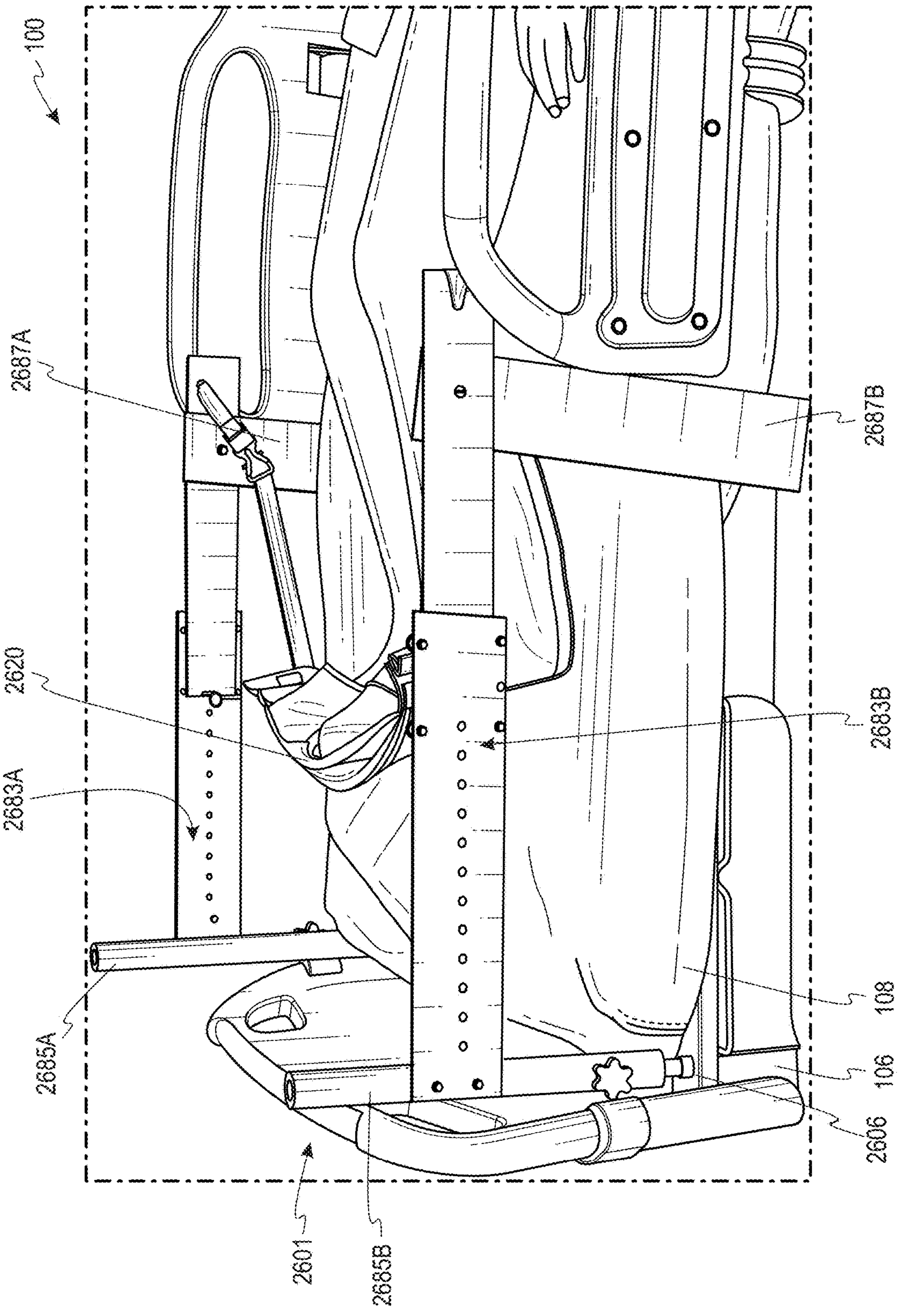
FIG. 26F illustrates the bed exercise system of FIG. 26C with a foot pad coupled to the anchor and the foot pad in a second, extended position, according to an example.

As shown in FIG. 26B, the process can additionally or alternatively include adjusting the size of the first bracket 2683A and the second bracket 2683B using the position selector 2697. For instance, the position selector 2697 can be actuated from the second state to the first state and, while the position selector 2697 is in the first state, moving the proximal portions 2693B relative to the distal portions 2693A to adjust the length of the first bracket 2683A and the second bracket 2683B. After adjusting the size of the first bracket 2683A and the second bracket 2683B, the position selector 2697 can be actuated from the first state to the second state to inhibit or prevent inadvertent adjustments to the sizes of the first bracket 2683A and the second bracket 2683B. As shown in FIG. 26C, the process can also include positioning the foot pad 1320 (or any other foot pad disclosed herein) under the feet of the operator. As shown in FIG. 26D, the process can further include coupling the feet of the operator to the foot pad 1320 (e.g., using the pockets 1345 or, alternatively, using the hood structure 1355). As shown in FIG. 26E, the connectors 2007 can be coupled to the elastic connectors 1324, 1326. After coupling the connectors 2007 to the elastic connectors 1324, 1326, the operator can move the foot pad 2620 between the first, retracted position shown in FIG. 26E and the second, extended position shown in FIG. 26F to perform one or more reps of a leg press exercise.

As described above, the anchor 2501 shown in FIGS. 25A-25B and the anchor 2601 shown in FIGS. 26A-26F can be coupled with the foot pad described above (e.g., the foot pad 1320) to provide for leg press and/or calf extension exercises. In some examples, the anchor 2501, 2601 can be additionally or alternatively coupled with other components of the bed exercise system 100 to provide for additional or alternative types of exercises.

Figure 27:
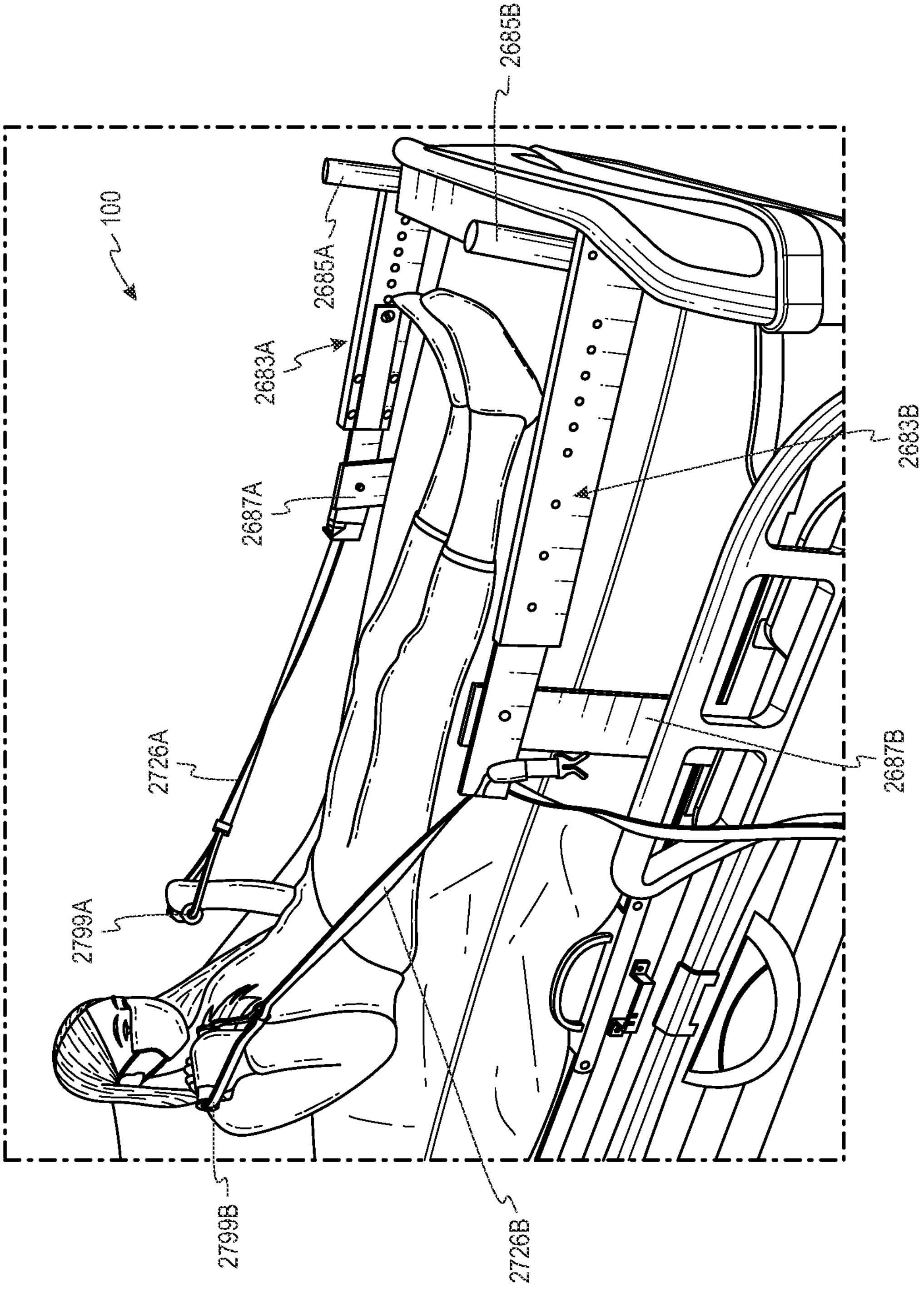
FIG. 27 illustrates a bed exercise system, according to another example.

As one example, FIG. 27 depicts the bed exercise system 100 in which the anchor 2601 is coupled with one or more handles 2799A, 2799B. For example, in FIG. 27, the handles 27799A, 2799B include a first handle 2799A coupled to the first bracket 2683A by a first elastic connector 2724 and a second handle 2799B coupled to the second bracket 2683B by a second elastic connector 2726. The first handle 2799A and the second handle 2700B can each include a rigid structure that is configured to be help in a hand of the operator. In FIG. 27, the rigid structure of the first handle 2799A and the second handle 2799B is in the shape of a tube. However, the rigid structure of the first handle 2799A and the second handle 2799B can have other shapes so long as each of the first handle 2799A and the second handle 2799B can be held by a respective hand of the operator.

In some examples, the first elastic connector 2724 and the second elastic connector 2726 can be coupled to the connector 2607 in a manner similar to that described above (e.g., via the buckle 178 arrangement shown in FIGS. 1A and 3). In other examples, the connectors 2607 can be additionally or alternatively coupled to the elastic connectors 124, 126 by, for instance, one or more hooks, carabineer clips, gate clips, slots, and/or buttons. For instance, in FIG. 27, the first elastic connector 2724 is coupled to an aperture in the first bracket 2683A and the second elastic connector 2724 is coupled to an aperture in the second bracket 2683B.

When the first handle 2799A and the second handle 2799B are coupled to the anchor 2601, the first elastic connector 2724 has a first end that is coupled to the first handle 2799A and a second end that is coupled to the first bracket 2683A of the anchor 2601, and the second elastic connector 2726 has a first end that is coupled to the second handle 2799B and a second end that is coupled to the second bracket 2683B. In this arrangement, the first handle 2799A and the second handle 2799B are each movable between the first, retracted position and the second, extended position relative to the anchor 2601 while the second ends of the elastic connectors 2724, 2726 are maintained at a fixed position by the anchor 2601. The first, retracted position is distal of the second, extended position relative to a body of the operator. Additionally, when the first handle 2799A and/or the second handle 2799B are in the first, retracted position, the first elastic connector 2724 and the second elastic connector 2726 are in a relatively relaxed state (i.e., a relatively low tension state) such that the first handle 2799A and/or the second handle 2799B apply a first or low level of resistance against the hands and arms of the operator 104.

To move the first handle 2799A and/or the second handle 2799B from the first, retracted position to the second, extended position, the operator 104 can move the hands farther away from the anchor 2601. For instance, the operator can move their hands and/or arms to perform at least one exercise selected from a group consisting of: bicep curl, a front raise, a lateral raise, a seated row, a tricep extension, a shoulder press, an upright row, an isometric bicep hold, a pectoral fly, and/or a rear deltoid fly exercise. As the first handle 2799A and/or the second handle 2799B move from the first, retracted position to the second, extended position, the tension on the first elastic connector 2724 and/or the second elastic connector 2726 increases. In this way, the first handle 2799A and/or the second handle 2799B can apply progressively increasing levels of resistance against the hands, arms, shoulders, and/or back of the operator 104 as the first handle 2799A and/or the second handle 2799B moves from the first, retracted position to the second, extended position.

After the first handle 2799A and/or the second handle 2799B are in the second, extended position, the operator 104 can move the hands closer to the anchor 2601 to move the first handle 2799A and/or the second handle 2799B back from the second, extended position to the first, retracted position. As the first handle 2799A and/or the second handle 2799B moves from the second, extended position to the first, retracted position, the tension on the first elastic connector 2724 and the second elastic connector 2726 decreases (and, thus, the resistance applied by the first handle 2799A and/or the second handle 2799A to the hands, arms, shoulders, and/or back of the operator 104 decreases).

By operating the bed exercise system 100 to move the first handle 2799A and/or the second handle 2799B between the first, retracted position and the second, retracted position, various muscles of the operator 104 contract against the resistance applied by the first handle 2799A and/or the second handle 2799B on the hands, arms, shoulders, and/or back of the operator 104. Accordingly, by exercising various muscles throughout the upper body of the operator 104, the bed exercise system 100 can help to reduce (or prevent) muscle atrophy and/or deterioration while the operator 104 is confined to the bed 102 (e.g., on bed rest). This in turn may help the operator 104 to reduce (or minimize) rehabilitation and/or recovery time after an injury and/or a medical procedure. Additionally, the bed exercise system 100 can help to reduce the risk of (or prevent) injuries to the operator 104 after a period of confinement to the bed 102.

In FIG. 27, the anchor 2601 is coupled to the handles 2799A, 2799B, but the anchor 2601 and the elastic connectors 2724, 2726 can be additionally or alternatively coupled to other handheld attachments in other examples. For instance, as additional or alternative examples, the first ends of the elastic connectors 2724, 2726 can be coupled to at least one handheld attachment selected from a group consisting of: a multi-grip curl bar, a tricep rope, a straight bar, a tringle row handle, an open row, and a neutral grip lat bar.

Within examples, the foot pads 120, 820, 1020, 1320, handles 2799A-2799B, and other handheld attachments described herein can be more generally referred to as exercise attachments that can be coupled to any of the anchors 1801, 1901, 2001, 2101, 2201, 2301, 2401, 2501, 2601 described herein. For instance, more generally, the bed exercise system 100 described herein can include (i) the anchor 801, 1901, 2001, 2101, 2201, 2301, 2401, 2501, 2601 that can be configured to couple to the bed frame 106 and/or the mattress 108, (ii) an exercise attachment; and (iii) the first elastic connector 124, 126, 224, 824, 826, 1024, 1026, 1324, 1326, 2724 having a first end coupled to the exercise attachment and a second end coupled to the anchor 801, 1901, 2001, 2101, 2201, 2301, 2401, 2501, 2601. In some implementations, the bed exercise system can further include the second elastic connector 124, 126, 224, 824, 826, 1024, 1026, 1324, 1326, 2726 having a first end coupled to the exercise attachment and a second end coupled to the anchor 801, 1901, 2001, 2101, 2201, 2301, 2401, 2501, 2601.

As described above, the anchor 801, 1901, 2001, 2101, 2201, 2301, 2401, 2501, 2601 can beneficially help to maintain the second ends of the first elastic connector 2724 and the second elastic connector 2726 at a fixed position while the first ends move along with the handheld attachment(s) (e.g., the first handle 2799A and/or the second handle 2799B). As the anchor 2601 is fixed to the bed 102, the bed exercise system 100 applies the tension to the upper body of the operator 104 during operation of the bed exercise system 100. However, in another example, the second ends of the first elastic connector 2724 and/or the second elastic connector 2726 can be coupled to the foot pad 1320 instead of the anchor 2601. One implementation of such an example is shown in FIG. 28.

Figure 28:
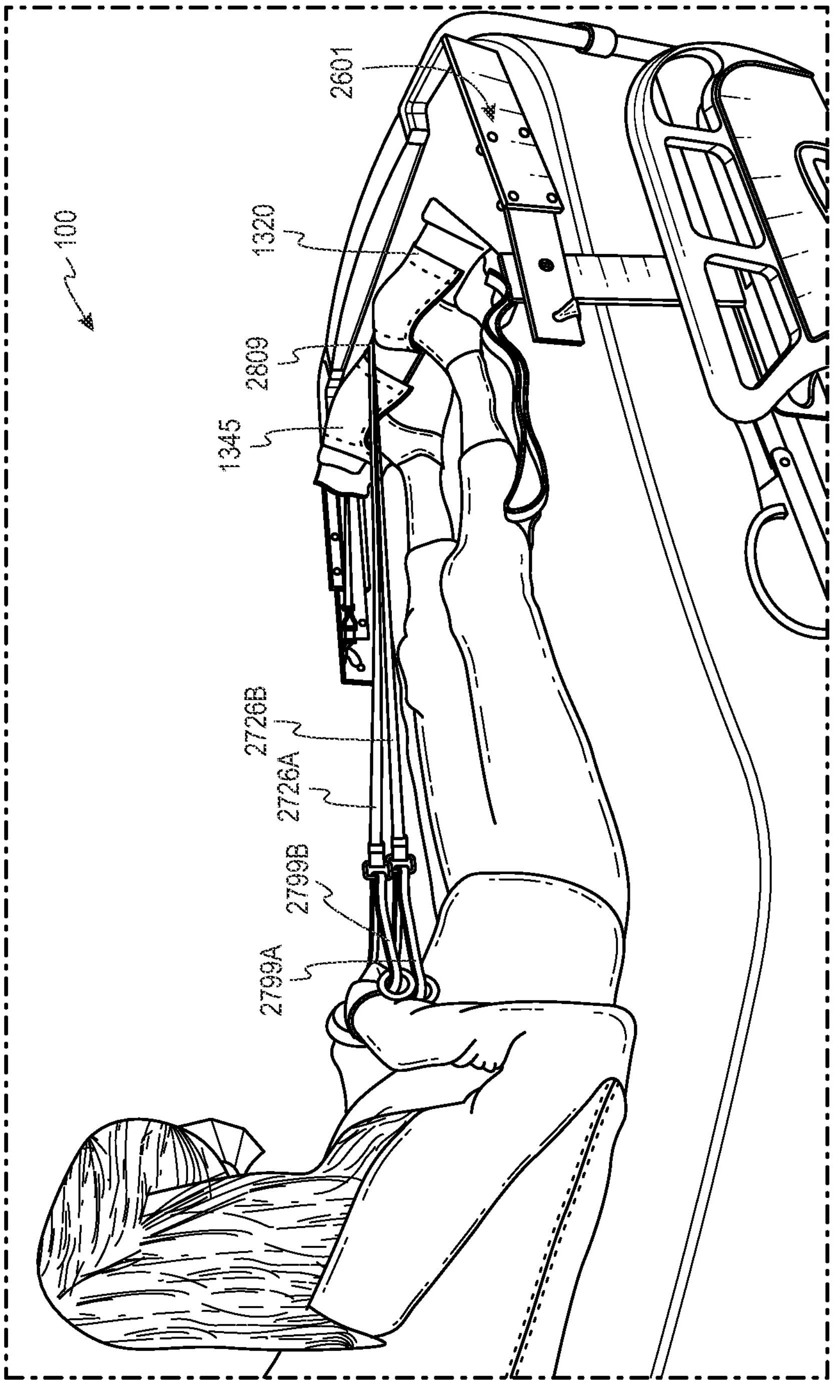
FIG. 28 illustrates a bed exercise system, according to another example.

As shown in FIG. 28, the second ends of the first elastic connector 2724 and the second elastic connector 2726 are coupled to an attachment anchor 2809 on the foot pad 1320. The attachment anchor 2809 can be similar or identical to the structures described above for coupling the second ends of the elastic connectors 2724, 2726 to the anchor 2601 (e.g., one or more buckles, hooks, carabineer clips, gate clips, slots, and/or buttons). In FIG. 28, the second ends of the first elastic connector 2724 and the second elastic connector 2726 are coupled to a single attachment anchor 2809 at a central portion of the foot pad 1320 (e.g., at a position between the pockets 1345). However, in other examples, the foot pad 1320 can include more than one attachment anchor 2809 at one or more locations on the foot pad 1320 (e.g., at the central portion and/or at an outer peripheral portion located outwardly of the pockets 1345).

In this arrangement, the second ends of the elastic connectors 2724, 2726 can be held in a relatively fixed position by a force applied by the legs of the operator 104 against the foot pad 1320. As the operator 104 moves the first handle 2799A and/or the second handle 2799B against the tension in the elastic connectors 2724, 2726, some tension may also be applied to the legs of the operator 104. However, the rigid support member 1342 of the foot pad 1320 can help to stabilize the legs and feet of the operator while operating the first handle 2799A and/or the second handle 2799B as described above.

Figure 29A:
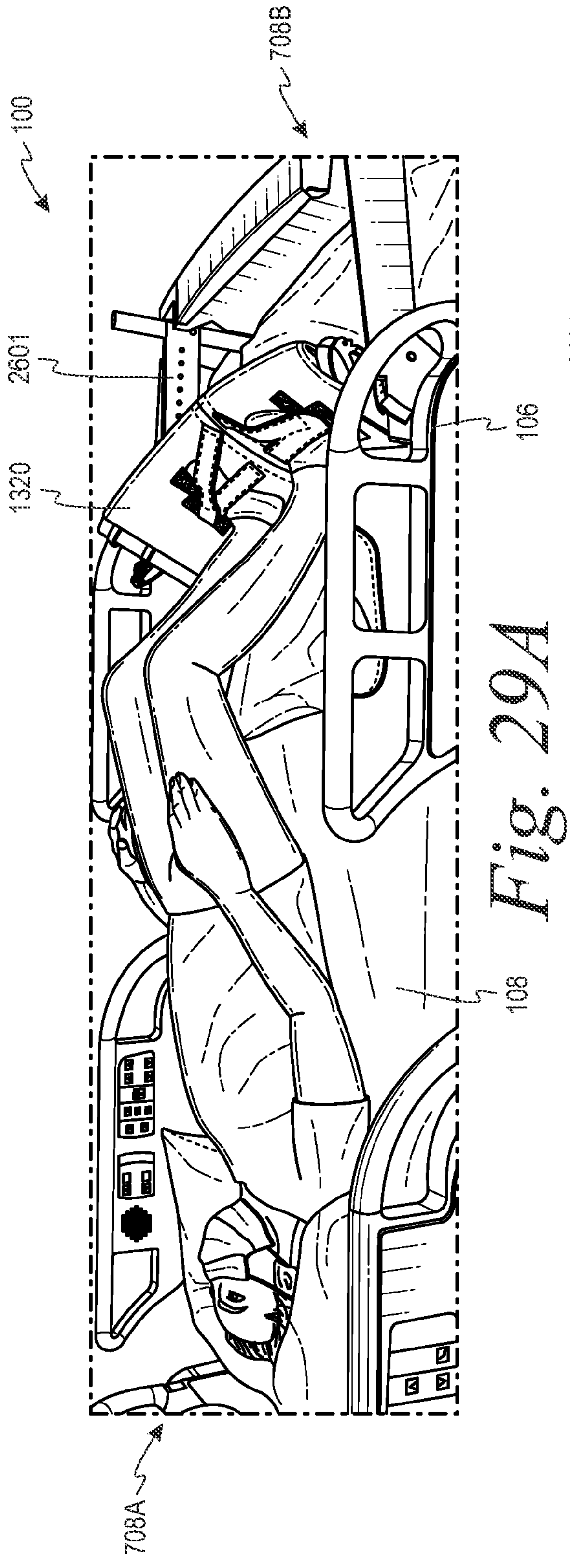
FIG. 29A illustrates a system for performing an exercise and/or repositioning a patient on a bed while the patient is in a first position in the bed, according to an example.
Figure 29B:
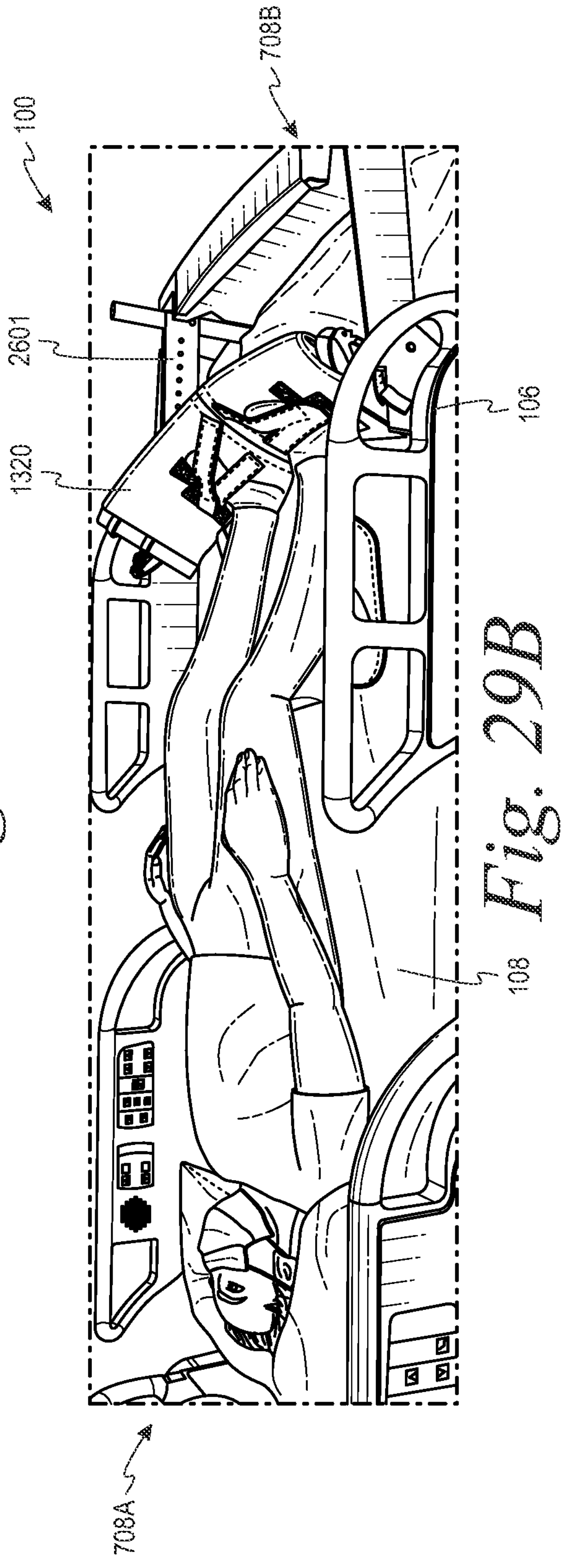
FIG. 29B illustrates a system for performing an exercise and/or repositioning a patient on a bed while the patient is in a second position in the bed, according to an example.

Referring now to FIGS. 29A-29B, the bed exercise system 100 is shown according to another example. In this example, the bed exercise system 100 can be adapted to address a long felt need—namely, difficulties repositioning a patient towards the head end 708A of the bed 102 when the patient has migrated toward the foot end 708B of the bed. Accordingly, in this example, the bed exercise system 100 can additionally or alternatively be a patient repositioning system.

In FIGS. 29A-29B, the bed exercise system 100 includes the foot pad 1320 and the anchor 2601 as described above. The anchor 2601 is coupled to the bed frame 106 as described above. However, instead of the coupling the foot pad 1320 to the anchor 2601 using the elastic connectors 1326, the foot pad 1320 is coupled to the anchor 2601 by a first inelastic connector 2924 and a second inelastic connector 2926.

In FIGS. 29A-29B, the first inelastic connector 2624 has a first end that can couple to the first lateral side of the foot pad 1320 and a second end that can couple to the anchor 2601, as described above with respect to the first elastic connectors 1324, 2624. Similarly, in FIGS. 29A-29B, the second elastic connector 2926 has a first end that can couple to the second lateral side of the foot pad 1320 and a second end that can couple to the anchor 2601, as described above with respect to the second elastic connector 1324, 2626.

In this arrangement, when the legs and feet of the operator press on the foot pad 1320, the foot pad 1320 remains in a fixed position due to inelasticity of the first and second inelastic connectors 2924, 2926 and the coupling of the foot pad 1320 to the anchor 2601. As result, the force applied by the operator to the foot pad 1320 can cause the body of the operator to move proximally towards the head end 708A of the bed 102. For example, FIG. 29A depicts the operator 104 in a first position on the bed 102 in which the body of the operator 104 has migrated toward the foot end 708B, and FIG. 29B depicts the operator 104 in a second position on the bed 102 in which the body of the operator 104 has been repositioned towards the head end 708A by pressing the legs and feet against the foot pad 1320, which is coupled to the anchor 2601 by the first inelastic connector 2924 and the second inelastic connector 2926. As shown in FIGS. 29A-29B, the patient is closer to the head end 708A in the second position shown in FIG. 29B as compared to the first position shown in FIG. 29A.

In FIGS. 29A-29B, the foot pad 1320 is substantially similar or identical to the foot pad 1320 described above. However, in other examples, the foot pad 1320 can omit one or more features of the foot pad 1320 described above. For instance, the foot pad 1320 can omit one or more of the tube 1321, the pockets 1345, and/or the hood structure 1355. However, it can be beneficial for the foot pad 1320 to include the rigid support member 1342 to help support the feet of the operator while the operator applies a force to the foot pad 1320.

Figure 30A:
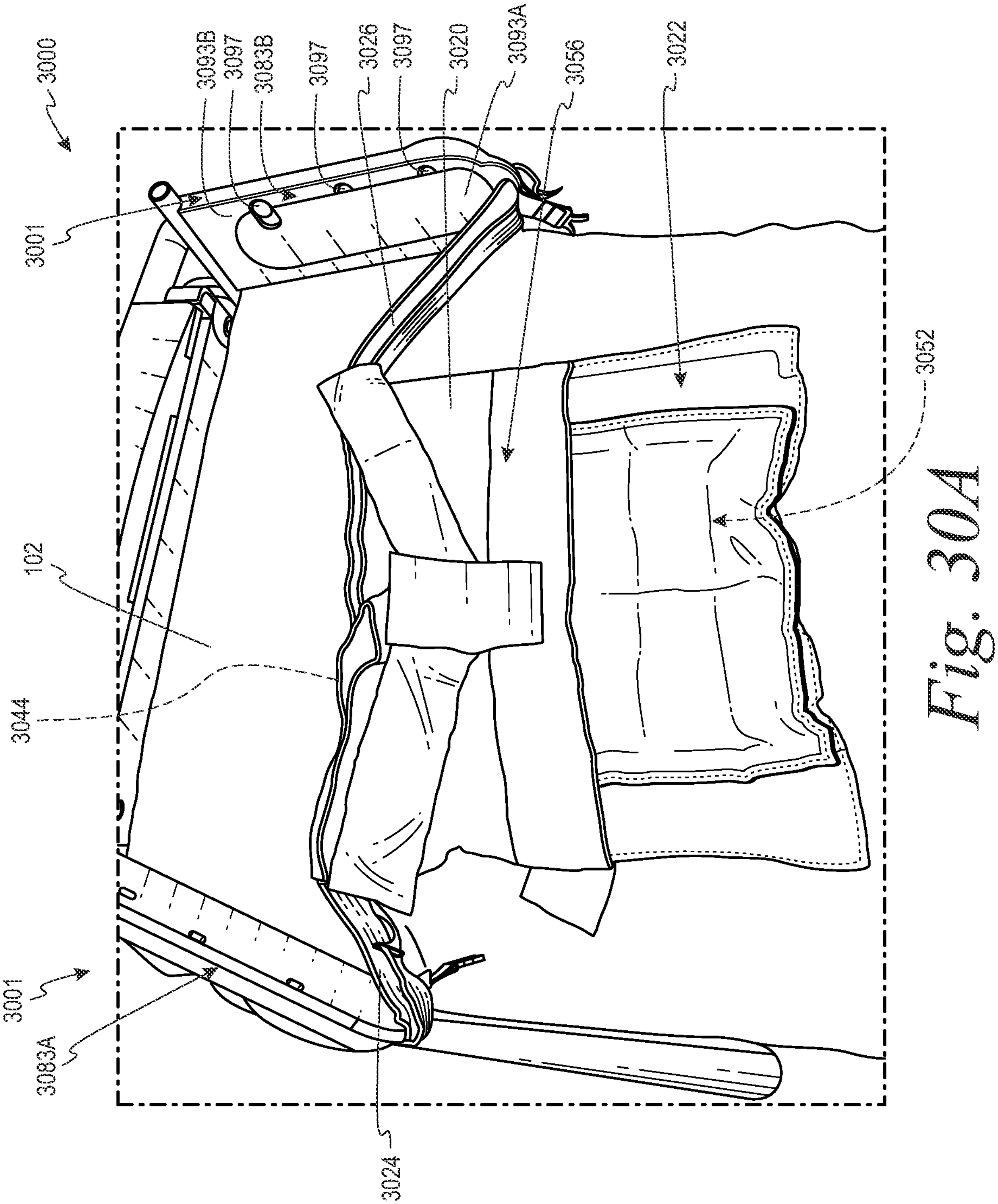
FIG. 30A illustrates a bed exercise system coupled to a bed, according to another example.
Figure 30B:
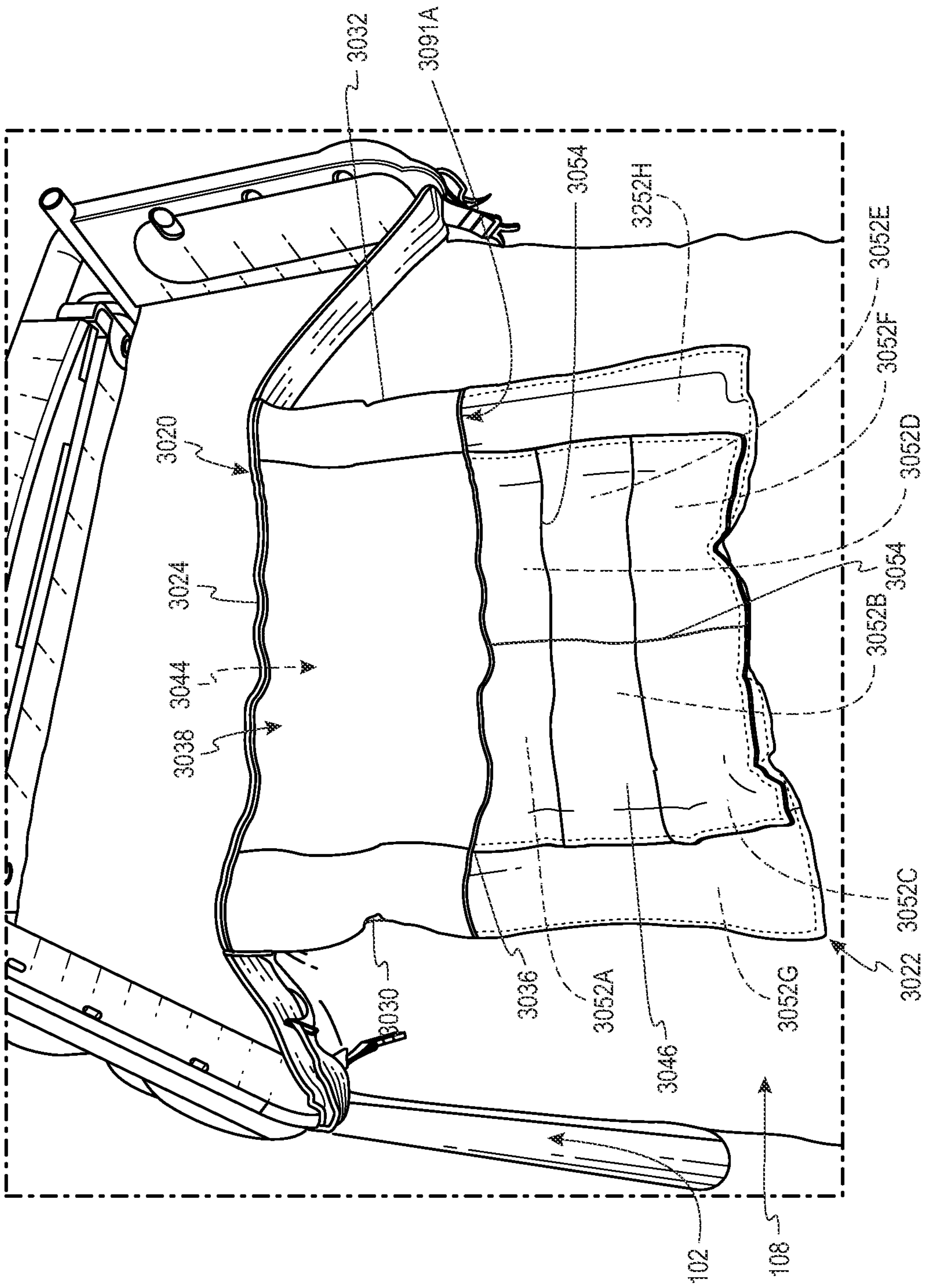
FIG. 30B illustrates an upper side of a foot pad and a leg support member of the bed exercise system shown in FIG. 30A, according to an example.
Figure 30C:
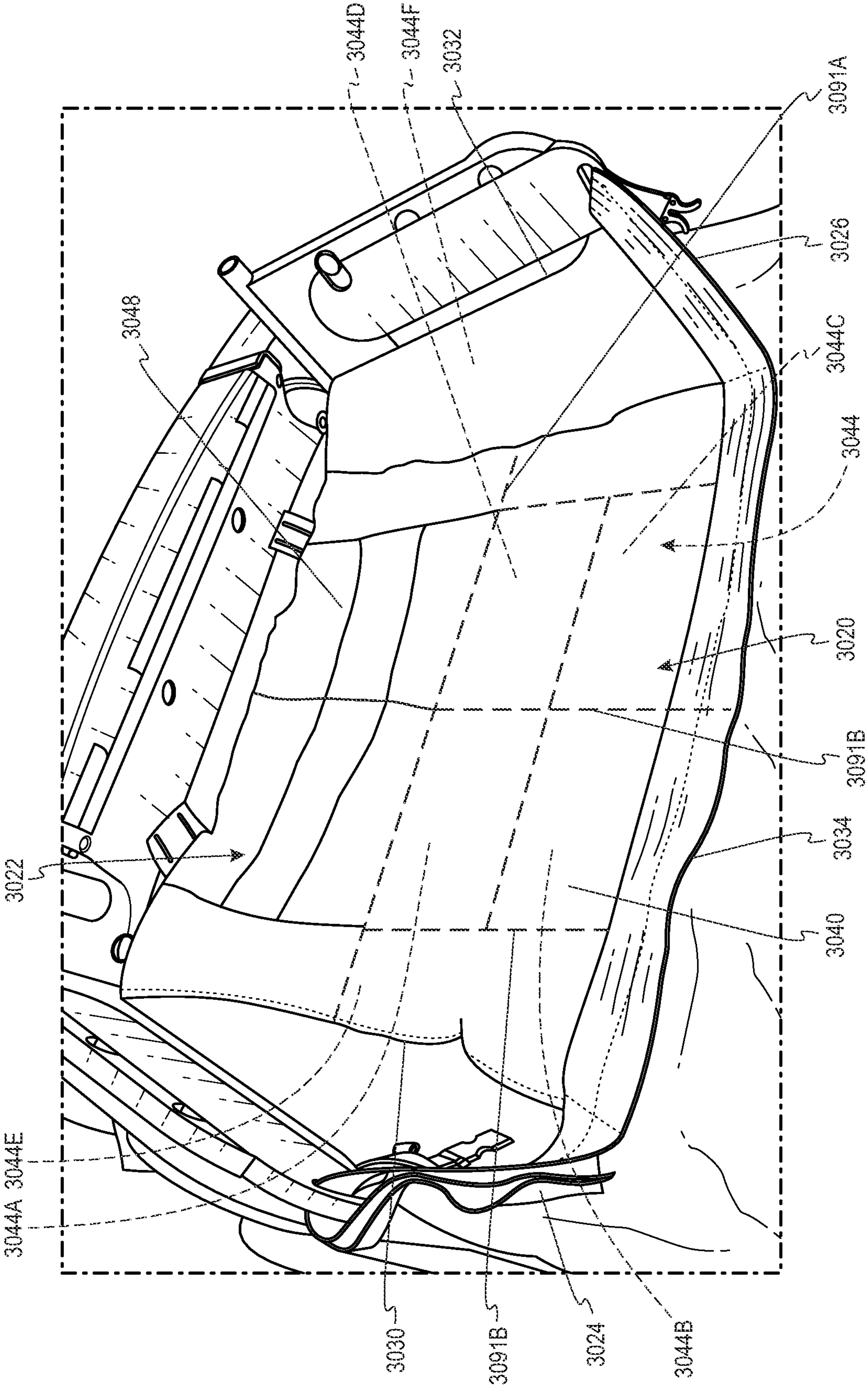
FIG. 30C illustrates a lower side of the foot pad and the leg support member of the bed exercise system shown in FIG. 30A, according to an example.
Figure 30D:
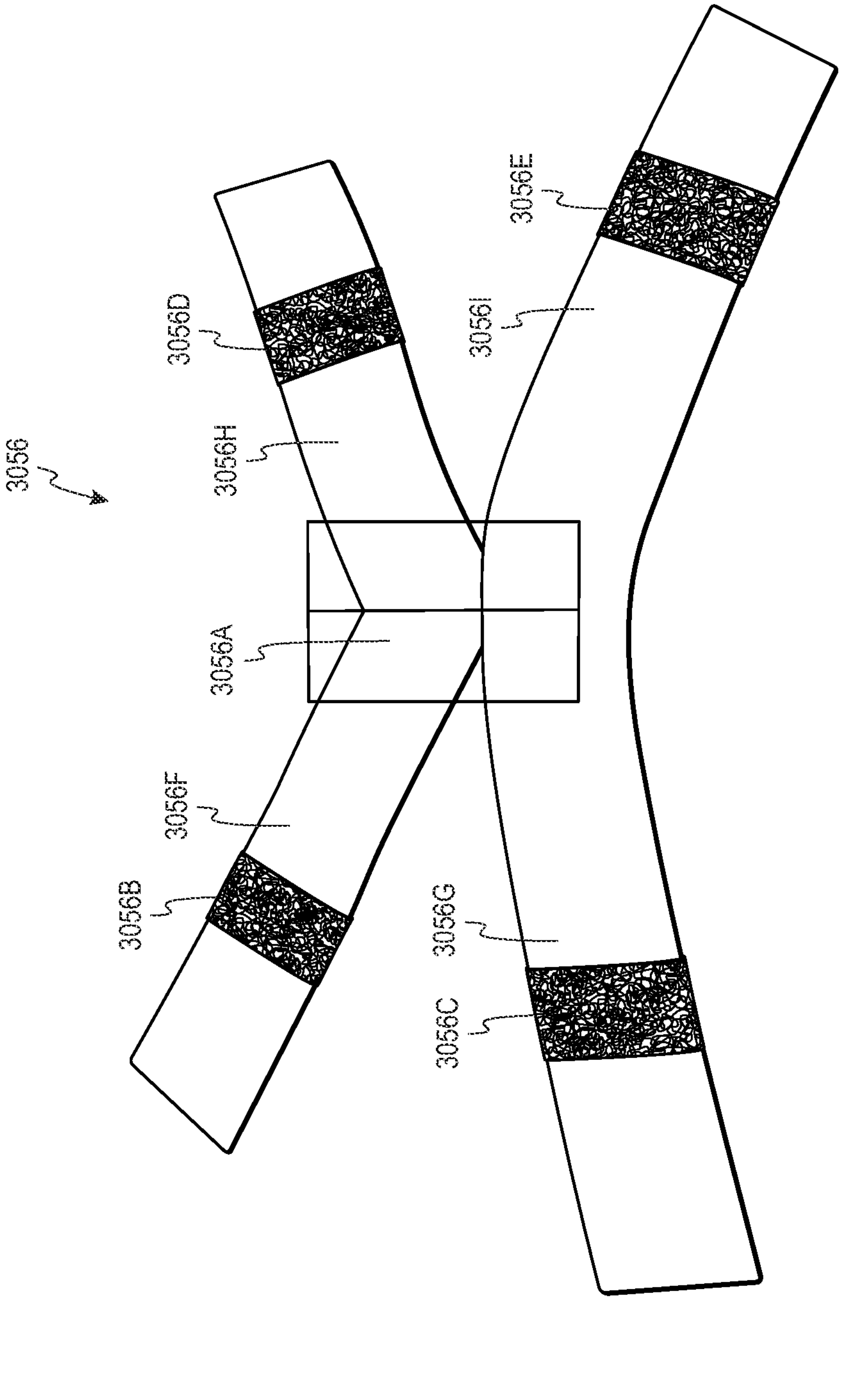
FIG. 30D illustrates a foot strap of the bed exercise system shown in FIG. 30A, according to an example.

Referring now to FIGS. 30A-30D, a bed exercise system 3000 is shown according to another example. FIG. 30A shows the bed exercise system 3000 coupled to a bed 102, FIG. 30B shows an upper side of a foot pad and a leg support member of the bed exercise system 3000, FIG. 30C shows a lower side of the foot pad and the leg support member of the bed exercise system 3000, and FIG. 30D shows a foot strap 3056 of the bed exercise system 3000 according to the example.

As shown in FIG. 30A, the bed exercise system 3000 includes a foot pad 3020, a leg support member 3022, and a plurality of elastic connectors 3024, 3026. In general, the foot pad 3020 is configured to support one foot or both feet of the operator at a distal end of the bed exercise system 3000. As shown in FIGS. 30B-30C, the foot pad 3020 includes a first lateral side 3030, a second lateral side 3032 opposite the first lateral side 3030, an upper side 3034, and a lower side 3036. Additionally, the foot pad 3020 includes a proximal surface 3038 (as shown in FIG. 30B) that faces the operator in use, and a distal surface 3040 (as shown in FIG. 30C) opposite of the proximal surface 3038. In FIGS. 30B-30C, the proximal surface 3038 and the distal surface 3040 extend between the first lateral side 3030, the second lateral side 3032, the upper side 3034, and the lower side 3036 to define an internal cavity in the foot pad 3020.

Additionally, in FIGS. 30A-30C, the foot pad 3020 includes a foot cushion 3044. The foot cushion 3044 can be in the internal cavity of the foot pad 3020. In FIGS. 30A-30C, the foot cushion 3044 includes one or more air bladders. In other examples, the foot cushion 3044 can additionally or alternatively include one or more foam members, feathers, and/or a fibrous material. In use, the foot cushion 3044 can help to enhance a stiffness of the foot pad 3020, which can assist the operator pushing with their feet against the foot pad 3020 to exercise, as described above.

In FIGS. 30A-30C, the foot pad 3020 omits a rigid support member in the cavity of the foot pad 3020 (e.g., the rigid support member 142 described above with respect to FIGS. 1A-1B). However, the foot pad 3020 can include the rigid support member in other examples.

In an example, the foot pad 3020 can have a height (e.g., a dimension between the upper side 3034 and the lower side 3036) between approximately 4 inches and approximately 15 inches, and a width (e.g., a dimension between the first lateral side 3030 and the second lateral side 3032) that is between approximately 9 inches and approximately 36 inches. In FIGS. 30A-30C, the foot pad 3020 has a cross-sectional shape that is generally rectangular. However, in other examples, the foot pad 3020 can have a different cross-sectional shape.

As shown in FIGS. 30A-30C, the leg support member 3022 extends proximally from the lower side 3036 of the foot pad 3020. Additionally, the leg support member 3022 further extends between the first lateral side 3030 and the second lateral side 3032 of the foot pad 3020. In general, the leg support member 3022 is suitable for supporting the heel(s), ankle(s), and/or the leg(s) of the operator during operation of the bed exercise system 3000.

Within examples, the leg support member 3022 can include an upper exterior surface 3046 (shown in FIG. 30B) for engaging with the heel(s), ankle(s), and/or the leg(s) of the operator, and a lower exterior surface 3048 (shown in FIG. 30C) for engaging with the mattress 108 of the bed 102. In FIG. 30B, the upper exterior surface 3046 of the leg support member 3022 includes a relatively high-friction material. As examples, the upper exterior surface 3046 can be made from a directional TDL polyester. As described herein, the relatively high-friction material of the upper exterior surface 3046 can help resist (or prevent) the legs of the operator slipping during operation of the bed exercise system 3000.

The lower exterior surface 3048 can be made from a relatively low-friction material. As examples, the lower exterior surface 3048 can be made from a nylon fabric. As described herein, the relatively low-friction material of the lower exterior surface 3048 can help the leg support member 3022 and the foot pad 3020 move between a first, retracted position and a second, extended position during operation of the bed exercise system 3000.

The upper exterior surface 3046 and the lower exterior surface 3048 can define a cavity of the leg support member 3022. Additionally, the leg support member 3022 can include a leg cushion 3052 (e.g., in the cavity of the leg support member 3022). The leg cushion 3052 can help to offload the heels of the operator from the mattress 108 of the bed 102 during and after exercise. As such, the leg support member 3022 can assist in improving operator comfort by providing cushioning between the heel(s), the ankle(s), and/or leg(s) of the operator 104 and the mattress 108 of the bed 102.

In FIGS. 30A-30C, the leg cushion 3052 includes a leg air bladder. In other examples, the leg cushion 3052 can be made from a foam material, feathers, a fiber material, and/or air. In some examples, the material from which the leg cushion 3052 is made can be selected based on one or more factors such as, for instance, a weight of the material, a compressibility of the material, a cost of the material, and/or a thickness of the material. These factors may also contribute to the disposability of the leg support member 3022 and/or the space-efficiency of the leg support member 3022 for storing of the bed exercise system 3000 when not in use.

As shown in FIGS. 30B-30C, the leg cushion 3052 can include a plurality of leg-cushion segments 3052A-3052H. This can assist in enhancing a balance and stability of the leg support member 3022 during operation of the bed exercise system 3000. In implementations in which the leg cushion 3052 is the leg air bladder, each leg-cushion segment 3052A-3052H can define a discrete air bladder, which are not in fluid communication with each other. This can help in distributing the air among the leg-cushion segments 3052A-3052H to help to maintain air pressure in the leg cushion 3052 for offloading the heel(s) from the mattress 108.

In the example shown in FIGS. 30A-30C, the leg-cushion segments 3052A-3052H include a plurality of center segments 3052A-3052F, a first lateral segment 3052G on a first lateral side of the center segments 3052A-3052F, and a second lateral segment 3052H on a second lateral side of the center segments 3052A-3052F. The first lateral segment 3052G and the second lateral segment 3052H can be elongated and extend along a length of the leg support member 3022 (e.g., along a dimension between a distal end and a proximal end of the leg support member 3022). In this arrangement, the first lateral segment 3052G and the second lateral segment 3052H can help to resist the legs moving laterally outward away from the center segments 3052A-3052F. Additionally, in this arrangement, the center segments 3052A-3052F can each have a volume of air that is smaller than a volume of air in each of the first lateral segment 3052G and the second lateral segment 3052H to help enhance air pressure and mitigate lateral movement of the legs on the center segments 3052A-3052F.

In FIGS. 30A-30C, the leg-cushion segments 3052A-3052H include six center segments 3052A-3052F arranged in an array of two columns and three rows. The first lateral segment 3052E extends along a first three of the center segments 3052A-3052C, and the second lateral segment 3052*h* extends along a second three of the center segments 3052D-3052F. This arrangement can provide a good balance of support for the heel(s), ankle(s), and/or legs(s) while resisting lateral movement of heel(s), ankle(s), and/or leg(s). However, in other examples, the leg-cushion segments 3052A-3052H can include a different number of segments, and/or the leg-cushion segments 3052A-3052H can be in a different arrangement.

Additionally, in FIGS. 30A-30C, the leg-cushion segments 3052A-3052H are separated from each other by a plurality of seams 3054. The seams 3054 can help to maintain the leg-cushion segments 3052A-3052H in respective positions relative to each other. For instance, the seams 3054 can additionally or alternatively help to define and/or control movement of the leg-cushion segments 3052A-3052H relative to each other.

In some examples, the foot pad 3020 can be hingedly movable relative to the leg support member 3022 at an interface between the foot pad 3020 and the leg support member 3022. For instance, in FIGS. 30A-30C, the foot pad 3020 is hingedly movable relative to the leg support member 3022 about a lateral seam 3091 at the interface between the foot pad 3020 and the leg support member 3022. The movability of the foot pad 3020 and the leg support member 3022 relative to each other can facilitate transitioning the bed exercise system 3000 between an operation configuration and a storage configuration. In the operation configuration, the foot pad 3020 can be positioned at a non-zero angle relative to the leg support member 3022 (e.g., an angle between approximately 45 degrees and 135 degrees and/or an angle of approximately 90 degrees) such that the feet of the operator engage the proximal surface 3038 of the foot pad 3020 and the legs of the operator engage the upper exterior surface 3046 of the leg support member 3022.

In the storage configuration, the foot pad 3020 can be positioned at an approximately 0 degree relative to the leg support member 3022 (e.g., the foot pad 3020 and the leg support member 3022 can be substantially coplanar) and/or the foot pad 3020 can be folded over onto the leg support member 3022 such that at least a portion of the proximal surface 3038 of the foot pad 3020 contacts at least a portion of the upper exterior surface 3046 of the leg support member 3022. By folding the foot pad 3020 and the leg support member 3022, the bed exercise system 3000 can be collapsed into a more compact, space-efficient size. This can help to improve (or maximize) efficient storage of one or more of the bed exercise systems 3000 at a particular location. For example, there may be limited storage space at a healthcare facility (e.g., a hospital, a rehabilitation center, and/or a nursing home) and, thus, the foldability can help to use that limited storage space in an efficient manner.

As shown in FIGS. 30B-30C, the foot cushion 3044 can include a plurality of foot-cushion segments 3044A-3044F. This can assist in enhancing a balance and stability of the foot pad 3020 during operation of the bed exercise system 3000. In implementations in which the foot cushion 3044 is the foot air bladder, each foot-cushion segment 3044A-3044F can define a discrete air bladder, which are not in fluid communication with each other. This can help in distributing the air among the foot-cushion segments 3044A-3044F to help to maintain air pressure in the foot cushion 3044 to provide sufficient rigidity for handling forces applied to the foot pad 3020 by the feet of the operator during operation of the bed exercise system 3000.

In the example shown in FIGS. 30A-30C, the foot-cushion segments 3044A-3044F include one or more center segments 3044A-3044D, a first lateral segment 3044E on a first lateral side of the one or more center segments 3044A-3044D, and a second lateral segment 3044F on a second lateral side of the one or more center segments 3044A-3044D. The first lateral segment 3044E and the second lateral segment 3044F can be elongated and extend along a height of the foot pad 3020 (e.g., a dimension between the upper side 2034 and the lower side 2036). In this arrangement, the first lateral segment 3044E and the second lateral segment 3044F can help to resist the feet of the operator moving laterally outward away from the center segments 3044A-3044D.

In FIGS. 30A-30C, the foot-cushion segments 3044A-3044F include four center segments 3044A-3044D arranged in an array of two columns and two rows. The first lateral segment 3044E extends along a first two of the center segments 3044A-3044B, and the second lateral segment 3044F extends along a second two of the center segments 3044C-3044D. This arrangement can provide a good balance of support for the feet of the operator on the foot pad 120. However, in other examples, the foot-cushion segments 3044A-3044F can include a different number of segments, and/or the foot-cushion segments 3044A-3044F can be in a different arrangement.

Additionally, in FIGS. 30A-30C, the foot-cushion segments 3044A-3044F are separated from each other by a plurality of seams 3091B. The seams 3091B can help to maintain the foot-cushion segments 3044A-3044F in respective positions relative to each other. For instance, the seams 3091B can additionally or alternatively help to define and/or control movement of the foot-cushion segments 3044A-3044F relative to each other.

As shown in FIG. 30C, the seams 3091B can include a first lateral seam between the first lateral segment 3044E and the center segments 3044A-3044D of the foot pad 3020, and a second lateral seam between the second lateral segment 3044F and the center segments 3044A-3044D of the foot pad 3020. The first lateral segment 3044E is configured to hingedly move about the first seam relative to the center segments 3044A-3044D, and the second lateral segment 3044F is configured to hingedly move about the second seam relative to the center segments 3044A-3044D. In this arrangement, when tension is applied to the foot pad 3020 by the first elastic connector 3024 and the second elastic connector 3026, the first lateral segment 3044E and the second lateral segment 3044F can hingedly move inwardly relative to the center segments 3044A-3044D to provide lateral barriers that help retain the feet of the operator toward the center of the foot pad 3020.

As shown in FIGS. 30A and 30D, the bed exercise system 3000 can include a foot strap 3056. The foot strap 3056 is coupled to the foot pad 33020 and the foot strap 3056 is configured to couple one or more feet of the operator to the foot pad 3020 (e.g., with the sole of each foot engaging the proximal surface 3038 of the foot pad 3020). In the example shown in FIGS. 30A and 30D, the foot strap 3056 is configured to be coupled to the foot pad 3020 at a plurality of positions on the foot pad 3020. This can provide for coupling and decoupling the feet of the operator to the foot pad 3020 and/or adjusting a fit of the foot strap 3056 based on a size of the feet of the operator.

In one implementation, the foot strap 3056 and the proximal surface 3038 of the foot pad 3020 can be coupled to each other by a hook-and-loop coupling. In such an implementation, the foot strap 3056 can include a first hook-and-loop material, the foot pad 3020 can include a second hook-and-loop material, and the first hook-and-loop material can couple to the second hook-and-loop material by the hook-and-loop coupling. In other examples, the foot strap 3056 can be coupled to the foot pad 3020 by at least one coupling mechanism selected from among: (i) hook-and-loop coupling, (ii) buttons and button holes, (iii) snaps, (iv) clips, (v) stitching, (vi) adhesive, and (vii) weld couplings. In still other examples, the foot strap 3056 can be configured as described above for the ankle straps 156, the pockets 1345, and/or the hood structure 1355.

In the example shown in FIGS. 30A and 30D, the proximal surface 3038 of the foot pad 3020 includes a loop material and the foot strap 3056 includes a plurality of portions 3056A-3056E made from a hook material. In this example, the foot strap 3056 includes a center hook portion 3056A, and a plurality of lateral hook portions 3056B-3056E. The lateral hook portions 3056B-3056E can be coupled to lateral end portions of a plurality of strap portions 3056F-3056I that extend outwardly from the center hook portion 3056A. In this arrangement, the center hook portion 3056A can be coupled to the proximal surface 3038 of the foot pad 3020 at a center region, the feet of the operator can be positioned on opposing sides of the center hook portion 3056A, the strap portions 3056F-3056G can extend over a first foot and couple to the proximal surface 3038 of the foot pad 3020, and the strap portions 3056H-3056I can extend over a second foot and coupled to the proximal surface 3038 of the foot pad 3020.

Although providing the foot strap 3056 with a plurality of strap portions 3056F-3056I for coupling each foot to the foot pad 3020 can help to more securely couple the feet to the foot pad 3020, the foot strap 3056 can include a fewer quantity of strap portions 3056F-3056I in other examples. Additionally or alternatively, the foot strap 3056 can include a greater quantity of strap portions 3056F-3056I in other examples. Although a greater quantity of strap portions 3056F-3056I can help enhance the coupling of the feet to the foot pad 3020, the greater quantity of strap portions 3056F-3056I can also increase a time for coupling and decoupling the feet to the foot pad 3020.

In some examples, the foot strap 3056 can include an elastic material. For instance, the strap portions 3056F-3056I can be formed from an elastic material. This can help to enhance operator comfort and better fit the foot strap 3056 to the feet of the operator.

As shown in FIG. 30A, the elastic connectors 3024, 3026 include a first elastic connector 3024 and a second elastic connector 3026. The first elastic connector 3024 has a first end coupled to the first lateral side 3030 of the foot pad 3020 and a second end. The second elastic connector 3026 has a first end coupled to the second lateral side 3032 of the foot pad 3020 and a second end. The second ends of the first elastic connector 3024 and the second elastic connector 3026 can be coupled to an anchor 3001 as described above. The first elastic connector 3024 and the second elastic connector 3026 can be configured as described above with respect to the elastic connectors 124, 126, 224, 824, 826, 1024, 1026, 1324, 1326, 2724, 2726.

For instance, in some examples, the first elastic connector 3024 and the second elastic connector 3026 can include adjustment mechanisms for adjusting a length of the first elastic connector 3024 and the second elastic connector 3026. In other examples, the first elastic connector 3024 and the second elastic connector 3026 can each have a fixed, non-adjustable length.

As shown in FIGS. 30A-30C, the first elastic connector 3024 and the second elastic connector 3026 can be monolithically formed with each other as a single strip of elastic material, and the single strip of elastic material can extend across the upper side 3034 of the foot pad 3020. Providing the single strip of elastic material across the width of the foot pad 3020 in this manner can help provide additional structural support to the foot pad 3020. However, in other examples, the first elastic connector 3024 and the second elastic connector 3026 can be separate and distinct from each other (e.g., formed from two or more strips of elastic material).

In FIG. 30A, the anchor 3001 is substantially similar or identical to the anchor 2601 shown in FIGS. 26A-26F, except the position selector 2697 of the anchor 2601 has an alternative configuration in FIG. 30A according to another example. In FIG. 30A, the anchor 3001 includes a position selector 3097 that can be actuated between (i) a first state that allows for movement of a proximal portion 3093B relative to a distal portion 3093A of a first bracket 3083A and a second bracket 3083B of the anchor 3001, and (ii) a second state that inhibits or prevents movement of the proximal portion 3093B relative to the distal portion 3093A. In FIG. 30A, the position selector 3097 includes (i) a pin 3097A on one of the proximal portion 3093B and the distal portion 3093A that is spring biased towards (ii) a plurality of slots 3097B on the other one of the proximal portion 3093B and the distal portion 3093A. Each slot 3097B is configured to receive the pin 3097A. Each of the slot 3097B corresponds to a respective position of the proximal portion 3093B relative to the distal portion 3093A.

When the pin 3097A is in one of the slots 3097B, the position selector 3097 is in the second state. When the pin 3097A is actuated away from the slot 3097B (e.g., against a spring force), the position selector 3097 is in the first state. In this way, the position selector 3097 can be operated to adjust the first bracket 3083A and/or the second bracket 3083B in at least one dimension to help tailor a setup of the bed exercise system 3000 to a particular user, bed frame 106, and/or mattress 108.

Figure 31A:
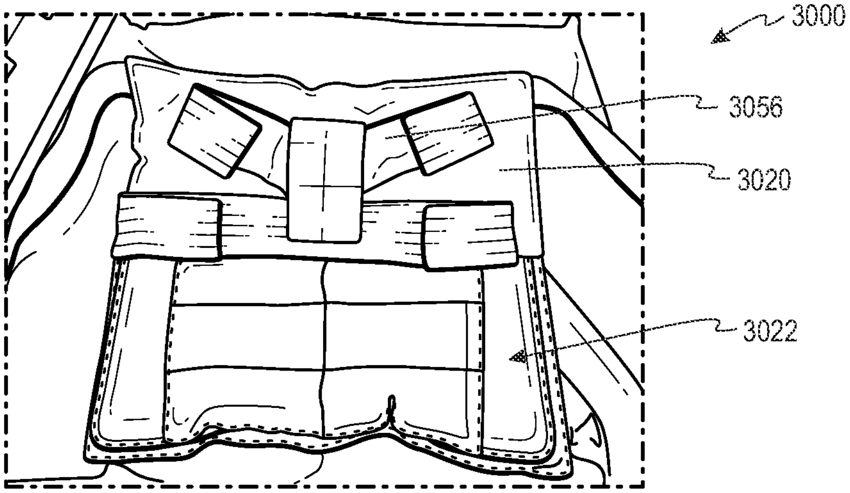
FIG. 31A illustrates a first aspect of a process for coupling one or more feet of an operator to the bed exercise system shown in FIGS. 30A-30D, according to an example.
Figure 31B:
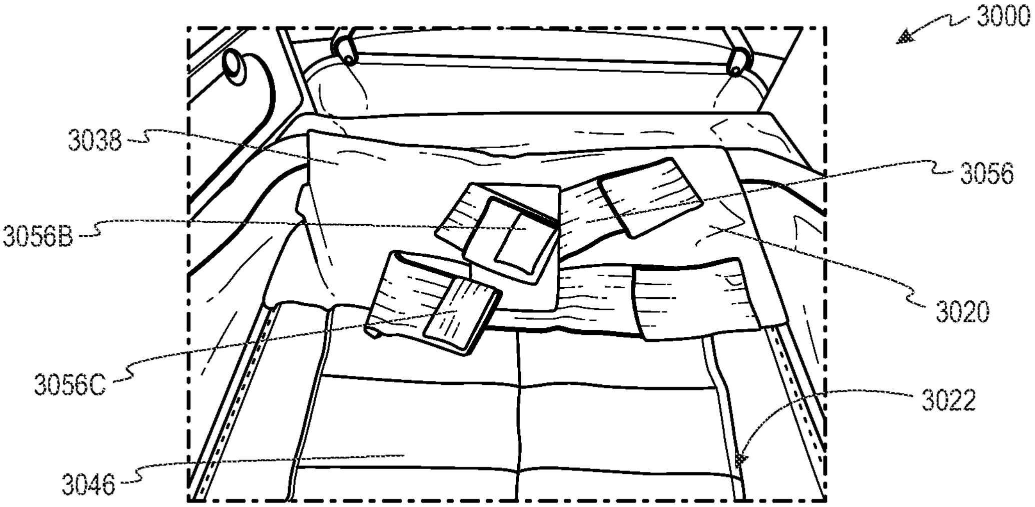
FIG. 31B illustrates a first aspect of a process for coupling one or more feet of an operator to the bed exercise system shown in FIGS. 30A-30D, according to an example.
Figure 31C:
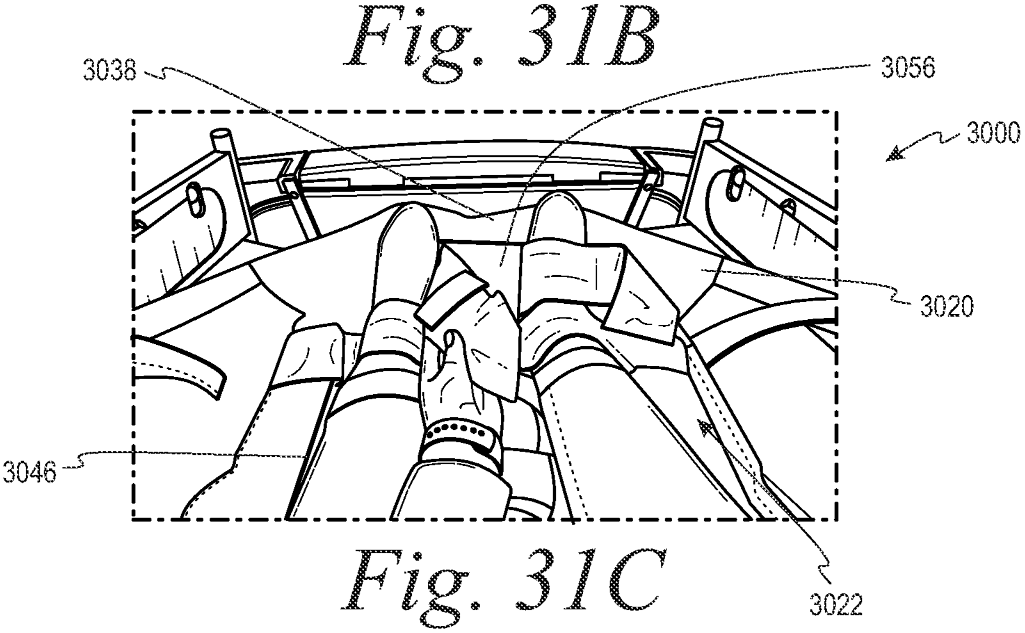
FIG. 31C illustrates a first aspect of a process for coupling one or more feet of an operator to the bed exercise system shown in FIGS. 30A-30D, according to an example.

Referring now to FIGS. 31A-31C, a process for coupling the feet of the operator to the bed exercise system 3000 of FIGS. 30A-30D is shown according to an example. In FIG. 30A, the foot strap 3056 is coupled to the foot pad 3020 and the foot pad 3020 is coupled to the anchor 3001. In FIG. 30B, the lateral hook portions 3056B-3056E of the foot strap 3056 are decoupled from the proximal surface 3038 of the foot pad 3020.

As shown in FIG. 31C, the feet of the operator are positioned with the soles of the feet against the proximal surface 3038 of the foot pad 3020, and the legs of the operator on the upper exterior surface 3046 of the leg support member 3022. The foot strap 3056 is positioned across the tops of the feet and coupled to the proximal surface 3038 of the foot pad 3020 by the lateral hook portions 3056B-3056E. Additionally, as shown in FIG. 31C, the foot strap 3056 can extend across the ankles of the operator as well. As shown in FIG. 31C, when the foot strap 3056 couples the feet of the operator to the foot pad 3020, the foot pad 3020 hinges upward along the lateral seam 3091A.

In the example shown in FIGS. 30A-31B, the upper exterior surface 3046 of the leg support member 3022 includes the relatively high-friction material, which can help resist (or prevent) the legs of the operator slipping during operation of the bed exercise system 3000. In some examples, an entirety of the upper exterior surface 3046 can include the high-friction material. In other examples, a portion of the upper exterior surface 3046 includes the high-friction material, and a portion of the upper exterior surface 3046 omits the high-friction material. For instance, in FIG. 30B, the upper exterior surface 3046 includes the high-friction material over the center segments 3052A-3052F, and omits the high-friction material over the first lateral segment 3052G and the second lateral segment 3052H.

Figure 32A:
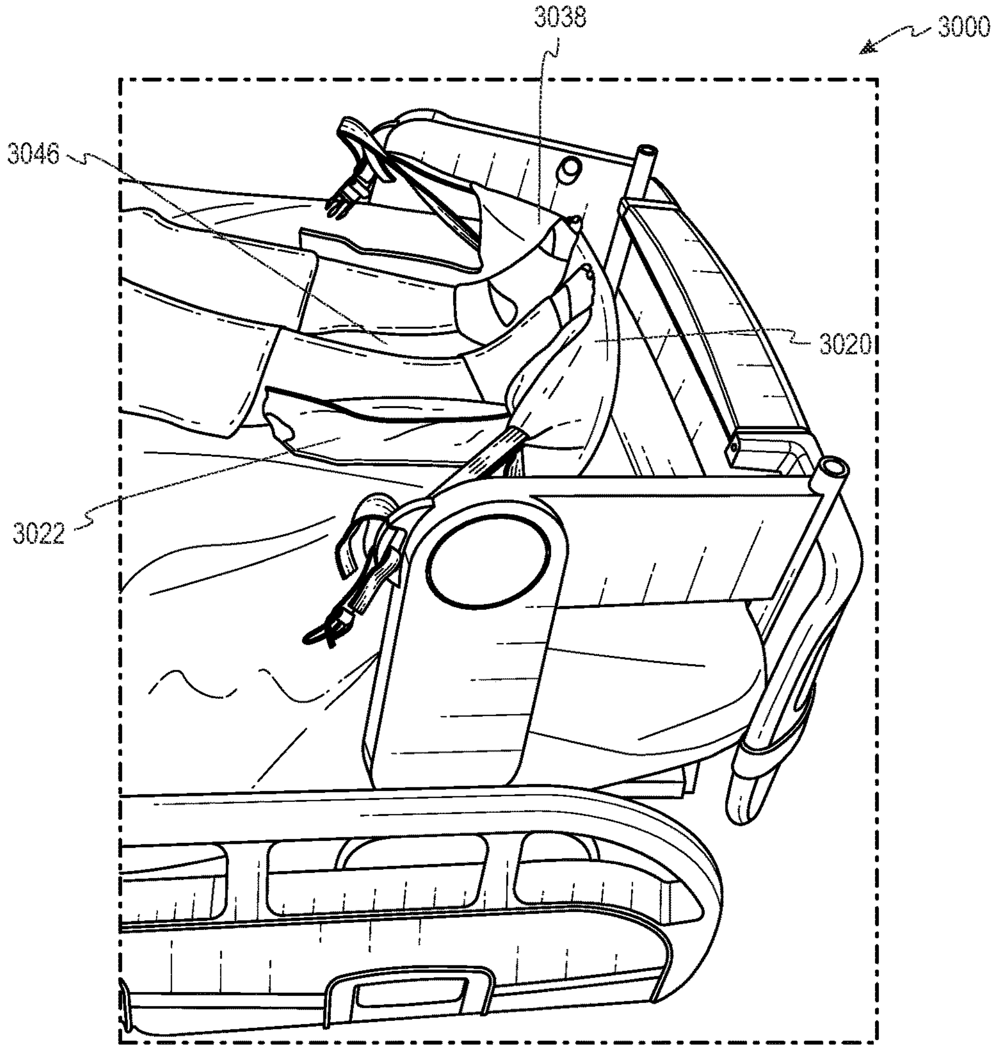
FIG. 32A illustrates a first perspective view of a bed exercise system, according to another example.
Figure 32B:
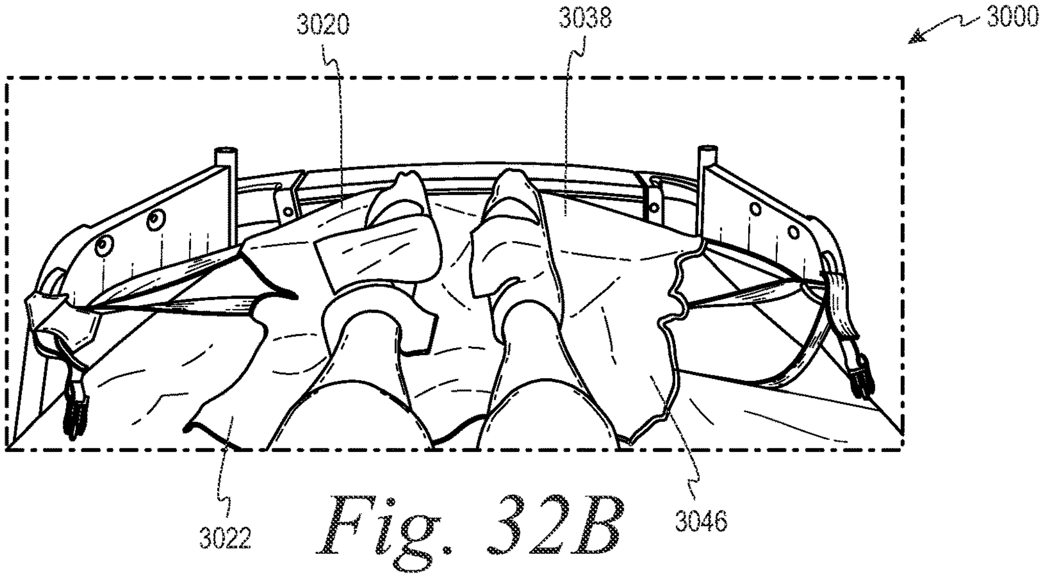
FIG. 32B illustrates a second perspective view of the bed exercise system shown in FIG. 32A, according to an example.

In still other examples, the upper exterior surface 3046 can omit the high friction material. For instance, in another example, the upper exterior surface 3046 can include the second hook-and-loop material of the proximal surface 2038 of the foot pad 3020. As one implementation of such an example, FIGS. 32A-32C depict the bed exercise system 3000 with the second hook-and-loop material extending over the proximal surface 3038 of the foot pad 3020 and the upper exterior surface 3046 of the leg support member 3022.

Figure 33A:
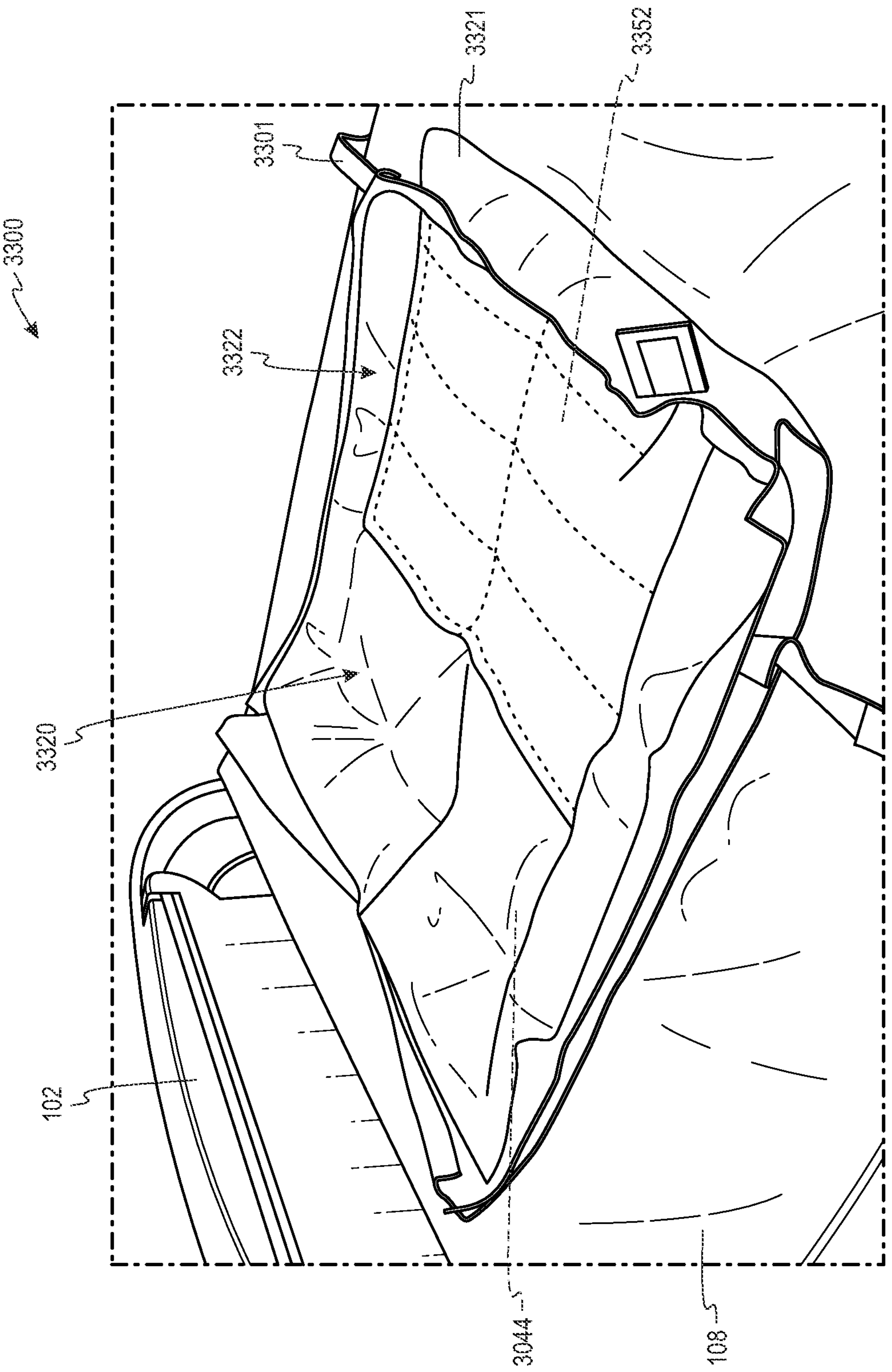
FIG. 33A illustrates a first perspective view of a bed exercise system, according to another example.
Figure 33B:
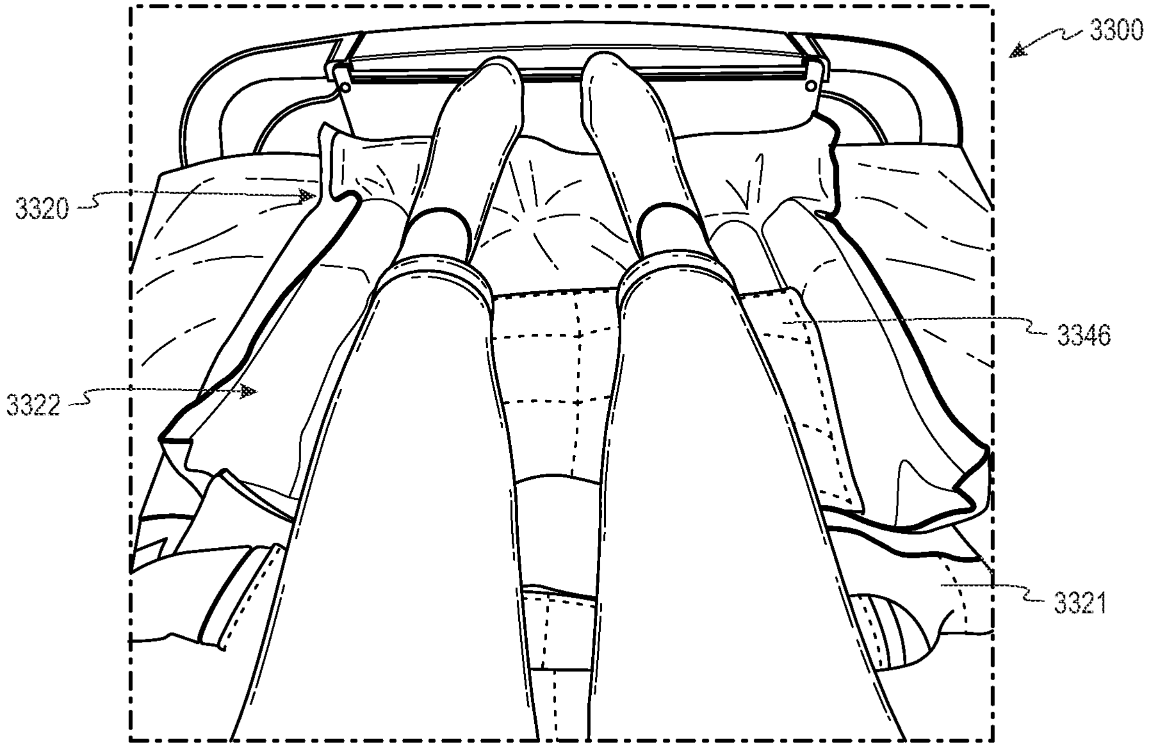
FIG. 33B illustrates a second perspective view of the bed exercise system shown in FIG. 33A, according to an example.
Figure 33C:
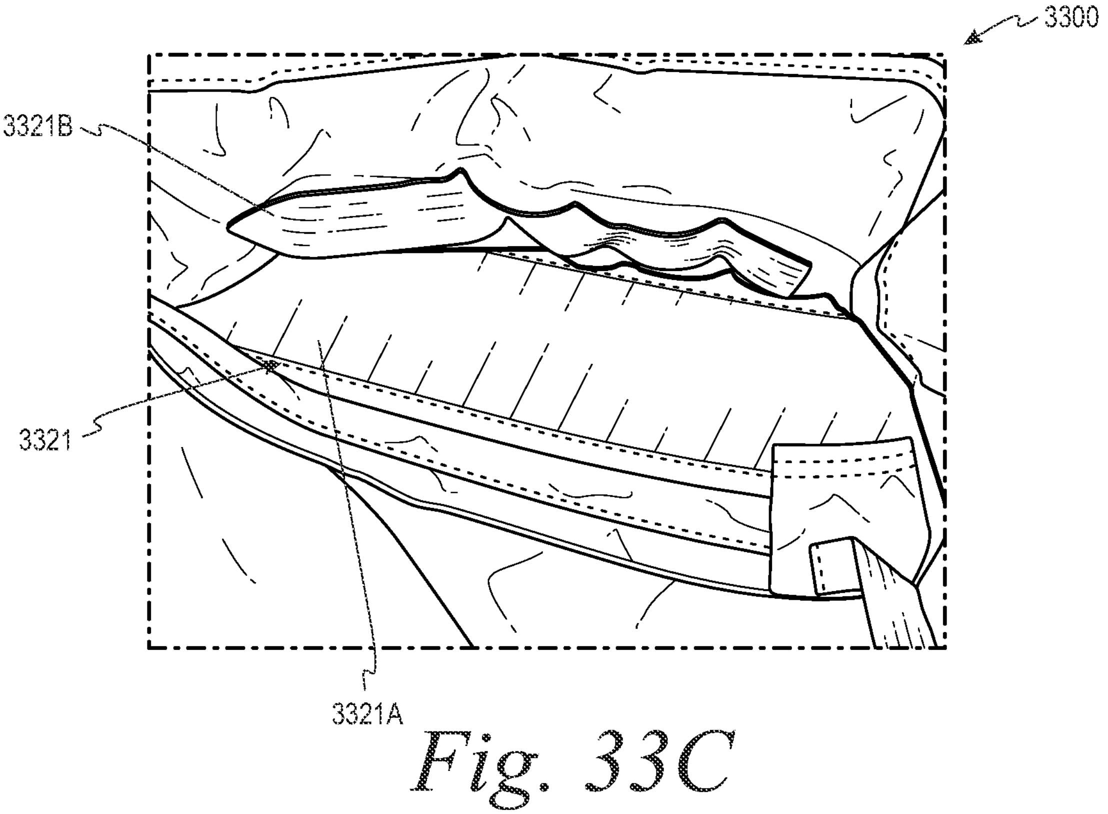
FIG. 33C illustrates a tube of the bed exercise system shown in FIGS. 33A-33B, according to an example.

As described above, one or more features of the various bed exercise systems described above can be combined according to further examples. For instance, FIGS. 33A-33C depict a bed exercise system 3300 according to another example. FIG. 33A shows a perspective view of the bed exercise system 3300 coupled to the bed 102, FIG. 33B depicts feet and legs of the operator on the bed exercise system 3300, and FIG. 33C depicts a side view of a portion of the bed exercise system 3300, according to the example.

As shown in FIGS. 33A-33C, the bed exercise system 3300 includes a foot pad 3320, a leg support member 3322, a tube 3321, and an anchor 3301. The anchor 3301 is substantially similar or identical to the anchor 1901 of FIGS. 19A-19E, but the anchor 3301 can be coupled to the tube 3321 by a plurality of inelastic connectors 3324.

The foot pad 3320 and the leg support member 3322 can be coupled to each other. Additionally, the foot pad 3320 can include a foot cushion 3444 and the leg support member 3322 can include a leg cushion 3452. In FIGS. 33A-33C, the foot cushion 3344 and the leg cushion 3452 include respective air bladders, as described above for the foot cushion 3044 and the leg cushion 3052 of FIGS. 30A-30C. In other examples, the foot cushion 3344 and/or the leg cushion 3052 can additionally or alternatively include one or more foam members, feathers, and/or a fibrous material.

The tube 3321 is substantially similar or identical to the tubes 1021, 1321 described above. As such, the tube 3321 can include an interior surface and an exterior surface. As described above, the tube 3321 can be configured such that a first portion 3321A of the interior surface can contact a second portion 3321B of the tube 3321 when the foot pad 3320 is moved between the first, retracted position and the second, extended position. As shown in FIG. 33C, the first portion 3321A of the interior surface includes a loop material and the second portion 3321B of the interior surface includes a material with directional friction properties. For instance, the material with directional friction properties can be configured to (i) have a first coefficient of friction when the second portion 3321B moves in a distal direction relative to the first portion 3321A, (ii) have a second coefficient of friction when the second portion 3321B moves in a proximal direction relative to the first portion 3321A, and (iii) the first coefficient of friction can be greater than the second coefficient of friction. This can provide for increased resistance to movement of the foot pad 3320 and the leg support member 3322 when moving from the first, retracted position to the second, extended position, and decreased resistance to movement of the foot pad 3320 and the leg support member 3322 when moving from the second, extended position to the first, retracted position.

As examples, the material with directional friction properties can include a directional TDL polyester.

As shown in FIGS. 33A-33B, an upper exterior surface 3346 of the leg support member 3322 can include the relatively-high resistance material as described above for the upper exterior surface 3046. This can help to move the first portion 3321A and the second portion 3321B of the tube relative to each other during operation of the bed exercise system 3300.

Figure 34:
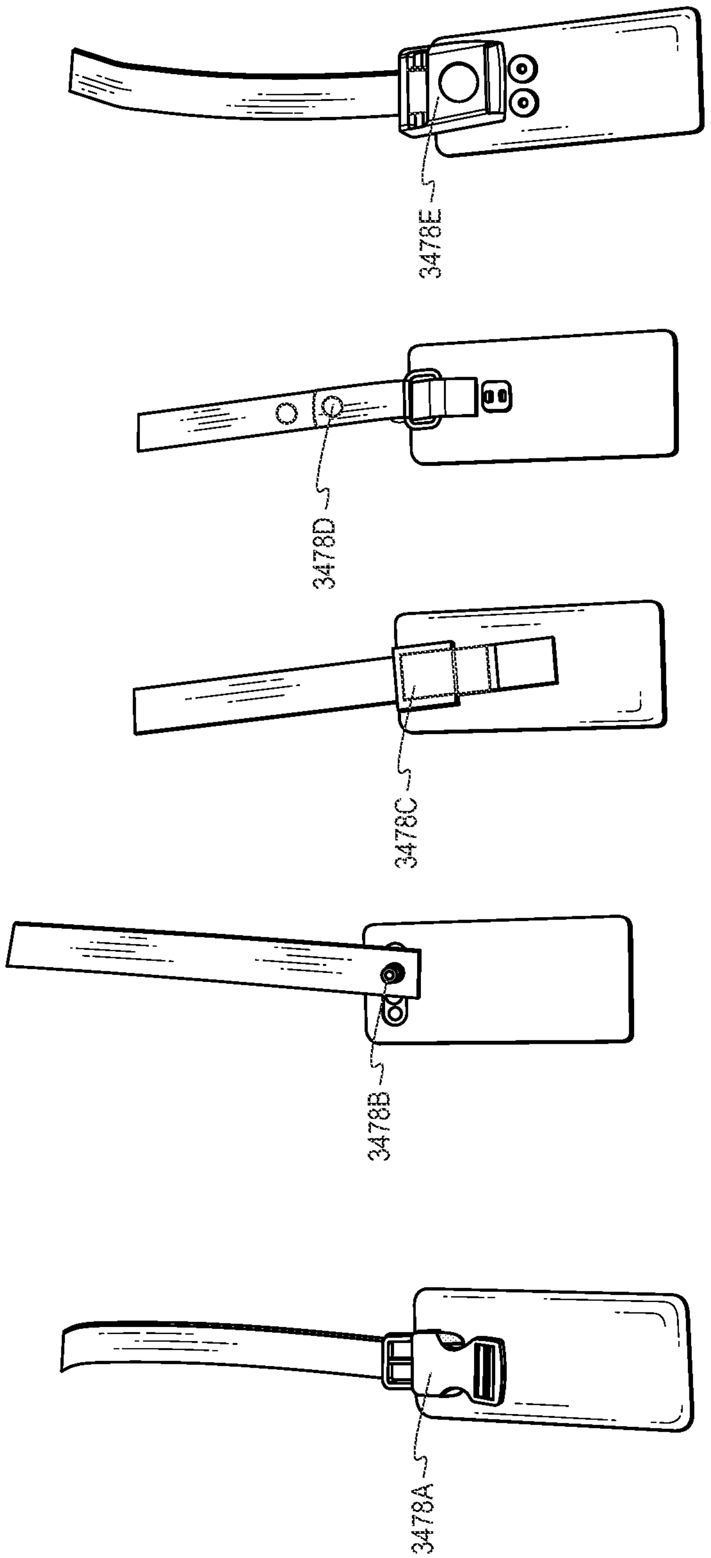
FIG. 34 illustrates a plurality of releasable fasteners, according to examples.

FIG. 34 depicts a plurality of alternative releasable fasteners 3478A-3478E are shown for the first releasable fastener 178, the second releasable fastener 182, and/or the buckles 1878, 1978 described above. Within examples, one or more of the releasable fasteners 3478A-3478E can be used couple any of the elastic connectors to the anchors described above.

Figure 35:
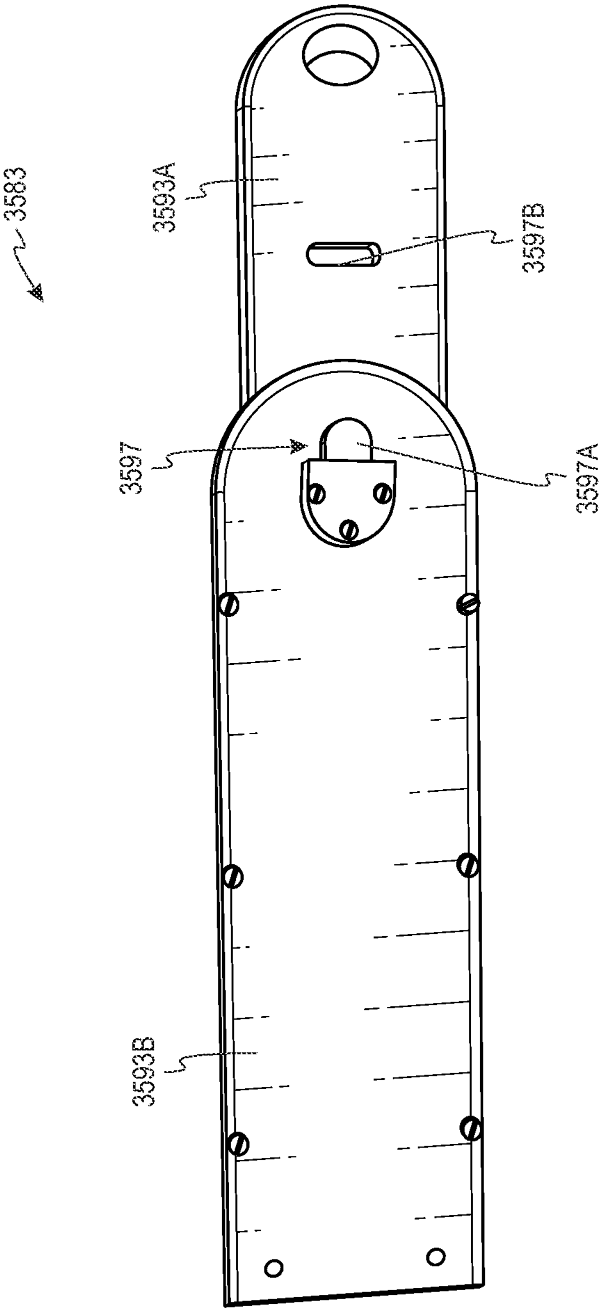
FIG. 35 illustrates a bracket of an anchor, according to an example.

FIG. 35 depicts a bracket 3583 that can be used with the anchor 2601, 3001 as an alternative to the first bracket 2683A, 3083A and/or the second bracket 2683B, 3083B according to another example. The bracket 3583 includes a distal portion 3593A and a proximal portion 3593B that are movable relative to each other to adjust a length (e.g., in a dimension extending between the head end and the foot end of the mattress 108) of the bracket 3583. Adjusting the length of the bracket 3583 can help to accommodate operators of different heights.

The anchor includes a position selector 3597 that can be actuated between (i) a first state that allows for movement of the proximal portion 3593B relative to the distal portion 3593A of the bracket 3583 of the anchor 3501, and (ii) a second state that inhibits or prevents movement of the proximal portion 3593B relative to the distal portion 3593A. In FIG. 35, the position selector 3597 includes (i) a pin 3597A on one of the proximal portion 3593B and the distal portion 3593A that is spring biased towards (ii) a plurality of slots 3597B on the other one of the proximal portion 3593B and the distal portion 3593A. Each slot 3597B is configured to receive the pin 3597A. Each of the slot 3597B corresponds to a respective position of the proximal portion 3593B relative to the distal portion 3593A.

When the pin 3597A is in one of the slots 3597B, the position selector 3597 is in the second state. When the pin 3597A is actuated away from the slot 3597B (e.g., against a spring force), the position selector 3597 is in the first state. In this way, the position selector 3597 can be operated to adjust the bracket 3583 in at least one dimension to help tailor a setup of the bed exercise system to a particular user, bed frame, and/or mattress.

In FIG. 35, the pin 3597A includes a push button that is configured to actuate the pin 3597A against the spring force and away from the slots 3597B. As shown in FIG. 35, the push button is positioned at a center region of the proximal portion 3593B of the bracket 3583. In other examples, the pin 3597A and the push button can be at a different positions on the proximal portion 3593B. In still other examples, the pin 3597A can be positioned on the distal portion 3593A and the slots 3597B can be positioned on the proximal portion 3593B.

Figure 36A:
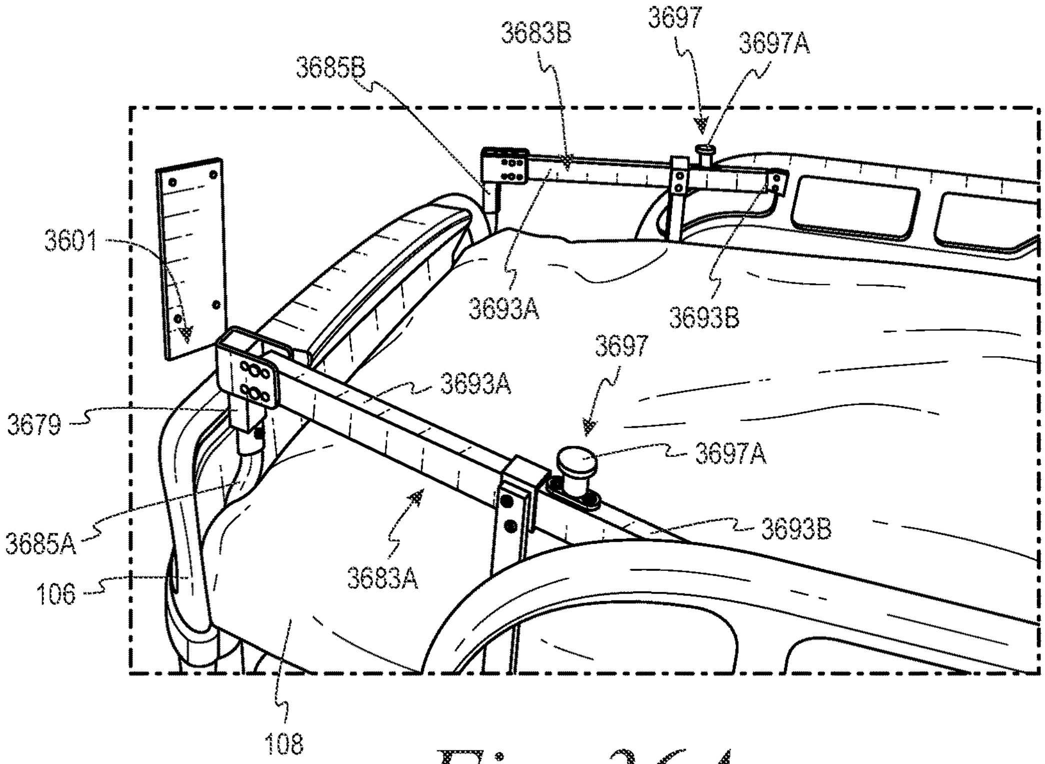
FIG. 36A illustrates an anchor coupled to a bed frame, according to another example.
Figure 36B:
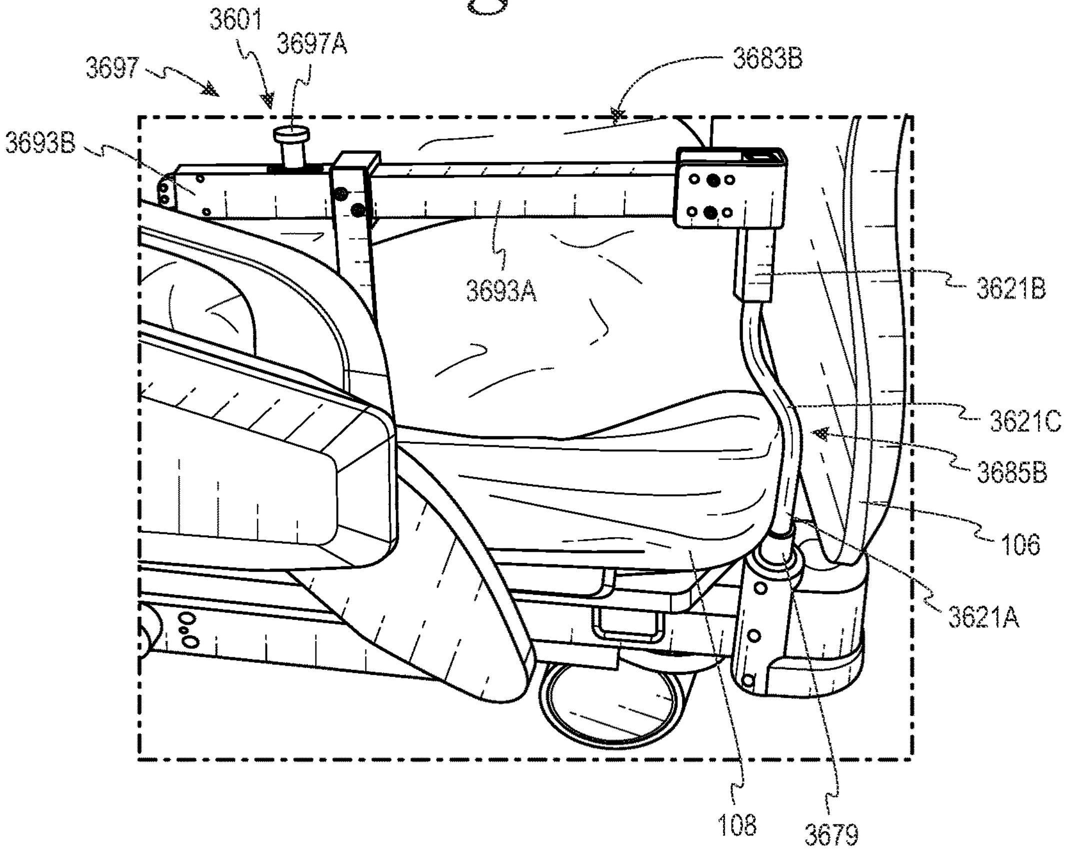
FIG. 36B illustrates a second bracket of the anchor shown in FIG. 36A coupled to the bed frame, according to an example.

Referring now to FIGS. 36A-36B, an anchor 3601 is shown according to another example. FIG. 36A depicts the anchor 3601 coupled to a bed frame 106, and FIG. 36B depicts a second bracket 3683B of the anchor 3601 coupled to the bed frame 106, according to the example. The anchor 3601 is substantially similar or identical to the anchor 2601 and the anchor 3001 described above, except (i) the anchor 3601 includes a position selector 3697 with an alternative configuration, (ii) the anchor 3601 includes a first pole 3685A and a second pole 3685B having an alternative shape, and (iii) the anchor 3601 includes a sensor 3679 according to another example.

The position selector 3697 can be actuated between (i) a first state that allows for movement of a proximal portion 3693B relative to a distal portion 3693A of a first bracket 3683A and a second bracket 3683B of the anchor 3601, and (ii) a second state that inhibits or prevents movement of the proximal portion 3693B relative to the distal portion 3693A. In FIGS. 36A-36B, the position selector 3697 includes (i) a knob 3697A including a downwardly extending pin (not shown) on a top surface of one of the proximal portion 3693B and the distal portion 3093A that is spring biased towards (ii) a plurality of slots (not shown) on a top surface of the other one of the proximal portion 3093B and the distal portion 3093A. Each slot is configured to receive the pin extending from the knob 3697A. Each of the slot corresponds to a respective position of the proximal portion 3093B relative to the distal portion 3093A.

When the pin extending from the knob 3697A is in one of the slots, the position selector 3697 is in the second state. When the knob 3697A and pin are actuated upwardly away from the slot (e.g., against a spring force), the position selector 3697 is in the first state. In this way, the position selector 3697 can be operated to adjust the first bracket 3683A and/or the second bracket 3683B in at least one dimension to help tailor a setup of the bed exercise systems described herein to a particular user, bed frame 106, and/or mattress 108.

As shown in FIGS. 36A-36B, the first pole 3685A and the second pole 3685B can be curved. For example, the first pole 3685A and the second pole 3685B can each include a lower segment 3621A, an upper segment 3621B, and a curved segment 3621C between the lower segment 3621A and the upper segment 3621B. In the example shown in FIGS. 36A-36B, the curved segment 3621C is configured such that the upper segment 3621B is proximal of the lower segment 3621A. As such, the curved segment 3621C can be angled proximally along a dimension extending from the lower segment to the upper segment 3621B (e.g., a vertical dimension). The lower segment 3621A can have a height that is approximately equal to or greater than a thickness of the mattress 108. In this arrangement, the upper segments 3621B of the first pole 3685A and the second pole 3685B can be spaced apart from a footboard of the bed frame 106. This can provide space for rotating the first bracket 3683A and/or the second bracket 3683B toward the footboard while mitigating contact between these components (e.g., collisions).

The sensor 3679 is configured to sense an operational parameter related to operation of any of the bed exercise systems described herein. For example, the sensor 3679 can be a force sensor that can sense a force applied to the anchor 3601 by any one of the foot pads and/or elastic connectors described herein during operation of the bed exercise systems. The sensor 3679 can also be configured to generate a signal indicative of the force sensed by the sensor 3679. As described in further detail below, the sensor 3679 can be in communication with at least one processor that can receive the signal from the sensor 3679 and output information (e.g., on a display) based on the signal received from the sensor 3679. As examples, the sensor 3679 can be at least one device selected from among a group consisting of: one or more load cells, one or more accelerometers, one or more stain gages, one or more Hall Effect sensors, one or more piezoelectric devices, and one or more optical sensors.

In one example, the sensor 3679 can be located at the upper segment 3621B of the first pole 3685A and/or the upper segment 3621B of the second pole 3685B. For instance, in FIG. 36A, the sensor 3679 is located in the upper segment 3621B of the first pole 3685A near an interface with the distal portion 3693A of the first bracket 3683A. In another example, the sensor 3679 can be additionally or alternatively located at the lower segment 3621A of the first pole 3685A and/or the lower segment 3621A of the second pole 3685B. For instance, in FIG. 36B, the sensor 3679 is located in the lower segment 3621A of the second pole 3685B near a coupling with the bed frame 106 (e.g., the IV pole slot of the bed frame 106).

Figure 37A:
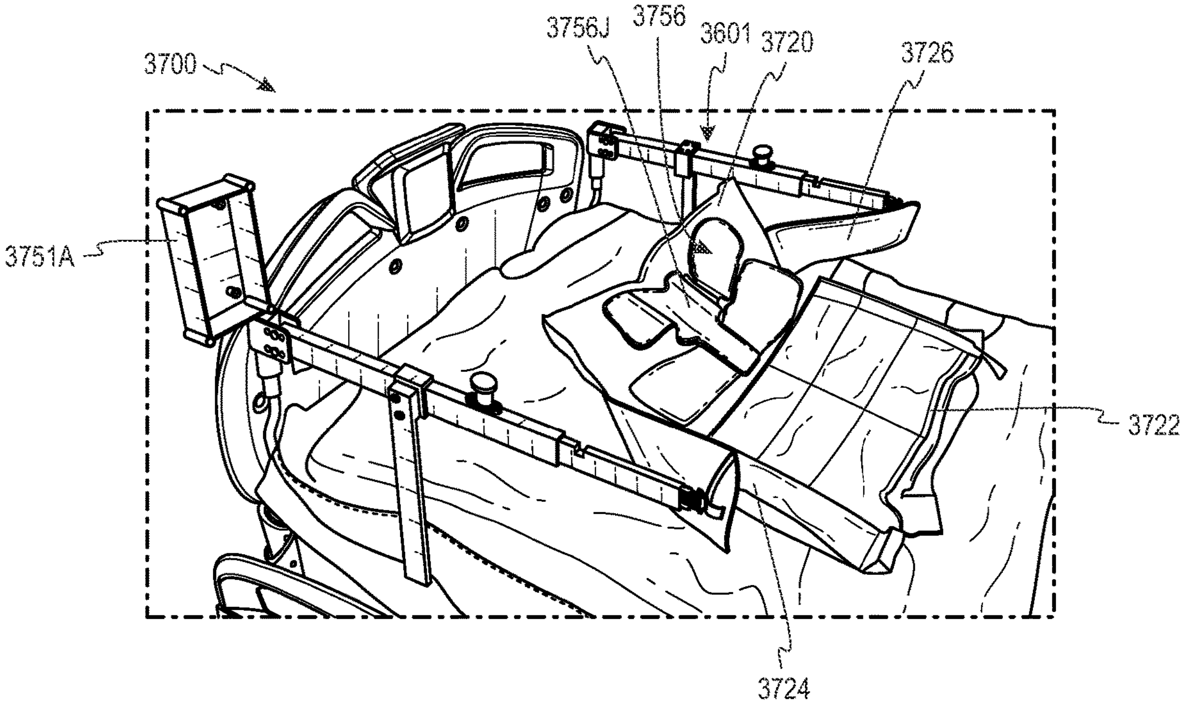
FIG. 37A illustrates a first view of a bed exercise system, according to another example.
Figure 37B:
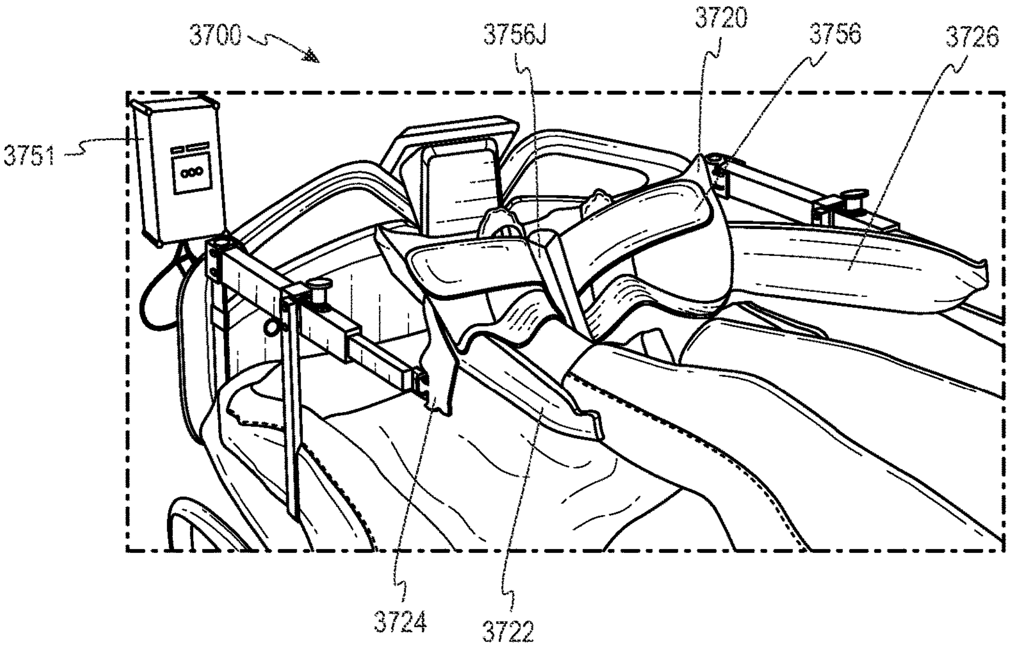
FIG. 37B illustrates a second view of a bed exercise system, according to another example.

FIGS. 37A-37B depict a bed exercise system 3700 coupled to a bed 102 by the anchor 3601 shown in FIGS. 36A-36B. The bed exercise system 3700 includes a foot pad 3720, a leg support member 3722, and a plurality of elastic connectors 3724, 3726 that are substantially similar or identical to the foot pad 3020, the leg support member 3022, and the elastic connectors 3024, 23026 described above for FIGS. 30A-30D, except the elastic connectors 3724, 3726 are wider than the elastic connectors 3024, 3026 and are coupled to a central region of the foot pad 3720 as opposed to a top region of the foot pad 3720. In this arrangement, the elastic connectors 3724, 3726 can be positioned along an arch of the feet of the operator to enhance support of the feet during operation.

Additionally, the foot pad 3720 differs from the foot pad 3020 in that at least a central portion of a proximal surface of the foot strap 3756 includes the second hook-and-loop material described above with respect to the foot strap 3056 and the foot pad 3020. In this arrangement, the ends of the foot straps 3056 can be removably coupled to the central portion of the proximal surface of the foot strap 3756 by engaging the first hook-and-loop material of the ends of the foot strap 3756 to the second hook-and-loop material of the central portion of the proximal surface of the foot strap 3756. This can help to mitigate inadvertent coupling of the first hook-and-loop material of the foot strap 3756 to socks or other fabrics while coupling and decoupling the feet of the operator to the foot pad 3720.

Additionally, as shown in FIG. 37B, the bed exercise system 3700 can include a computing device 3751 that is configured to display information based on the signal provided by the sensor 3679. The computing device 3751 can include a display device and a processor. Within examples, the processor can be implemented using hardware, software, and/or firmware. For instance, the processor can include one or more processors and a non-transitory computer readable medium (e.g., volatile and/or non-volatile memory) that stores machine language instructions or other executable instructions. The instructions, when executed by the one or more processors, cause the out device 3751 to carry out the various operations described herein. The processor, thus, can receive data and store the data in the memory as well.

As shown noted above, the processor can be communicatively coupled with the sensor 3679. In one example, the processor can receive the signal from the sensor 3679 and determine, based on the sensor signal, a number of repetitions that have been performed using the foot pad 3720. The processor can further cause the display device to output a visual indication of the number of repetitions (e.g., a rep count). As another example, the processor can additionally or alternatively determine, based on the sensor signal, an amount of a repetition that has been performed or remains to be performed to complete the repetition. The processor can responsively cause the display device to output a visual indication of the amount determined by the processor (e.g., by displaying a percentage of a repetition completed, a percentage of a repetition remaining, a distance of a repetition traveled, and/or a distance of a repetition remaining for completion of the repetition). In this arrangement, the sensor 3679 and the computing device 3751 can provide information to the operator and/or a clinician related to the quality and/or quantity of exercise being performed using the bed exercise system 3700.

As shown in FIG. 37A, the computing device 3751 can be coupled to the anchor 3601 by a mount 3751A. Additionally, in this example, the computing device 3751 can be communicatively coupled to the sensor 3679 by one or more wires. However, in other examples, the computing device 3751 can be communicatively coupled to the sensor 3679 wirelessly.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A bed exercise system, comprising:

an anchor configured to couple to a bed frame of a bed, wherein the anchor comprises:

a first pole configured to couple to a first slot of the bed frame, a first bracket coupled to the first pole, a first brace coupled to the first bracket, a second pole configured to couple to a second slot of the bed frame, a second bracket coupled to the second pole, and a second brace coupled to the second bracket, wherein the bed comprises a foot end and a head end, and wherein when the anchor is in a deployed state:

(i) the first bracket extends from the first pole in a proximal direction from the foot end toward the head end, (ii) the second bracket extends from the second pole in the proximal direction from the foot end toward the head end, (iii) the first brace extends downward from the first bracket toward the bed frame, and (iv) the second brace extends downward from the second bracket toward the bed frame, wherein the anchor is configured to transition between the deployed state and a storage state, wherein the first brace is rotatably coupled to the first bracket and the second brace is rotatably coupled to the second bracket, wherein, to transition from the deployed state to the storage state, the first brace is rotated towards the first bracket and the second brace is rotated towards the second bracket, and wherein, in the storage state, the first bracket and the second bracket extend toward each other at the foot end of the bed;

an exercise attachment; and a first elastic connector having a first end coupled to the exercise attachment and a second end coupled to the anchor.

2. The bed exercise system of claim 1, wherein a length of the first bracket is adjustable and a length of the second bracket is adjustable.

3. The bed exercise system of claim 2, wherein the first bracket comprises a distal portion and a proximal portion that are movable relative to each other to adjust the length of the first bracket, and wherein the second bracket comprises a distal portion and a proximal portion that are movable relative to each other to adjust the length of the second bracket.

4. The bed exercise system of claim 3, wherein the first bracket comprises a first position selector that can be actuated between (i) a first state that allows for movement of the proximal portion of the first bracket relative to the distal portion of the first bracket, and (ii) a second state that prevents movement of the proximal portion of the first bracket relative to the distal portion of the first bracket, and wherein the second bracket comprises a second position selector that can be actuated between (i) a first state that allows for movement of the proximal portion of the second bracket relative to the distal portion of the second bracket, and (ii) a second state that prevents movement of the proximal portion of the second bracket relative to the distal portion of the second bracket.

5. The bed exercise system of claim 4, wherein the first position selector comprises a pin on one of the proximal portion and the distal portion that is biased towards a plurality of slots on the other one of the proximal portion and the distal portion, wherein each slot of the plurality of slots is configured to receive the pin, and wherein each slot of the plurality of slots corresponds to a respective position of the proximal portion relative to the distal portion.

6. The bed exercise system of claim 1, wherein the first pole and the second pole each include a lower segment, an upper segment, and a curved segment between the lower segment and the upper segment.

7. The bed exercise system of claim 6, wherein the curved segment is configured such that the upper segment is proximal of the lower segment.

8. The bed exercise system of claim 7, wherein the lower segment has a height that is equal to or greater than a thickness of a mattress positioned on the bed frame.

9. The bed exercise system of claim 1, further comprising a second elastic connector having a first end coupled to the exercise attachment and a second end coupled to the anchor.

10. The bed exercise system of claim 9, wherein the exercise attachment is a foot pad that is configured to be moved by one or more legs of an operator.

11. The bed exercise system of claim 9, wherein the exercise attachment comprises a first handle coupled to the first end of the first elastic connector and a second handle coupled to the first end of the second elastic connector.

12. The bed exercise system of claim 9, wherein the second end of the first elastic connector is coupled to the first bracket, and the second end of the second elastic connector is coupled to the second bracket.

13. The bed exercise system of claim 1, further comprising a sensor that is configured to sense an operational parameter related to operation of the exercise attachment, wherein the sensor comprises at least one device selected from among a group consisting of: one or more load cells, one or more accelerometers, one or more stain strain gages, one or more Hall Effect sensors, one or more piezoelectric devices, and one or more optical sensors.

14. The bed exercise system of claim 13, wherein the first pole comprises an upper segment and a lower segment, wherein the lower segment couples the first pole to the first slot of the bed frame, and wherein the sensor is located in the upper segment.

15. The bed exercise system of claim 13, wherein the first pole comprises an upper segment and a lower segment, wherein the lower segment couples the first pole to the first slot of the bed frame, and wherein the sensor is located in the lower segment.

16. The bed exercise system of claim 1, wherein the first slot is a first intravenous (IV) pole slot and the second slot is a second IV pole slot on the bed frame.

17. The bed exercise system of claim 1, wherein the first pole and the second pole extend vertically in a direction that is perpendicular to a ground floor upon which the bed frame is positioned.

18. The bed exercise system of claim 1, wherein, when the anchor is in the deployed state, the first brace and the second brace extend downwards from the first bracket and the second bracket to respective positions on opposing sides of a mattress positioned on the bed frame to lock the anchor in the deployed state.

19. The bed exercise system of claim 1, wherein a size of the first pole is adjustable to adjust a height of the first bracket relative to an upper surface of a mattress on the bed frame, and wherein a size of the second pole is adjustable to adjust a height of the second bracket relative to the upper surface of a mattress on the bed frame.

20. The bed exercise system of claim 1, wherein the first bracket is configured to rotate about the first pole and the second bracket is configured to rotate about the second pole.

* * * * *